(12) United States Patent
Wakabayashi et al.

(10) Patent No.: US 7,393,612 B2
(45) Date of Patent: Jul. 1, 2008

(54) ELECTRODES, ALKALINE SECONDARY BATTERY, AND METHOD FOR MANUFACTURING ALKALINE SECONDARY BATTERY

(75) Inventors: Makoto Wakabayashi, Narashino (JP); Kunihiko Miyamoto, Tokyo (JP); Tetsuya Yamane, Kawasaki (JP); Naomi Bando, Kawasaki (JP); Kiyoshi Ishitsuka, Yokohama (JP); Ken-ichi Kanno, Yokohama (JP); Hidekazu Oppata, Tokyo (JP)

(73) Assignee: Toshiba Battery Co., Ltd., Tokyo (JP)

( * ) Notice: Subject to any disclaimer, the term of this patent is extended or adjusted under 35 U.S.C. 154(b) by 357 days.

(21) Appl. No.: 10/335,869

(22) Filed: Jan. 3, 2003

(65) Prior Publication Data
US 2003/0140483 A1 Jul. 31, 2003

Related U.S. Application Data
(62) Division of application No. 08/989,163, filed on Dec. 11, 1997, now abandoned.

(30) Foreign Application Priority Data
Dec. 17, 1996 (JP) ............................ 8-336855
Dec. 20, 1996 (JP) ............................ 8-341829
Jan. 31, 1997 (JP) ............................ 9-019273
Mar. 13, 1997 (JP) ............................ 9-059376
Mar. 21, 1997 (JP) ............................ 9-067932

(51) Int. Cl.
*H01M 4/26* (2006.01)
*H01M 4/52* (2006.01)
(52) U.S. Cl. .................. 429/223; 429/225; 429/229
(58) Field of Classification Search ................ 429/231, 429/232, 218.1, 229, 223; 29/623.1
See application file for complete search history.

(56) References Cited

U.S. PATENT DOCUMENTS 4,481,128 A 11/1984 Jackovitz et al.

(Continued)

FOREIGN PATENT DOCUMENTS

DE 44 29 273 2/1995

(Continued)

OTHER PUBLICATIONS http://www.dictionary.com/cgi-bin/dict.pl?term=solid+solution (online definition for "solid solution" from dictionary.com website cited by Examiner in Form PTO-892 in parent case).

(Continued)

*Primary Examiner*—Mark Ruthkosky
*Assistant Examiner*—Keith Walker
(74) *Attorney, Agent, or Firm*—Oblon, Spivak, McClelland, Maier & Neustadt, P.C.

(57) ABSTRACT

An alkaline secondary battery which is characterized in that it comprises, a positive electrode containing nickel hydroxide having a value of 0.8° or more in the half-width of a peak in the (101) plane thereof as measured by X-ray powder diffraction (2θ) using Cu—Kα ray, and 4.0 to 15% by weight of at least one material selected from the group consisting of zinc and zinc compounds, and an alkali electrolyte, the ratio of which to theoretical capacity of the positive electrode being 0.7 to 2.0 cm³/Ah, the weight of the at least one material being one calculated as zinc element and based on the weight of the nickel hydroxide.

12 Claims, 6 Drawing Sheets

U.S. PATENT DOCUMENTS

| | | | |
|---|---|---|---|
| 5,344,728 A | | 9/1994 | Ovshinsky et al. |
| 5,384,216 A | | 1/1995 | Teraoka |
| 5,498,403 A | | 3/1996 | Shin |
| 5,506,076 A | * | 4/1996 | Miyamoto et al. .......... 429/223 |
| 5,523,182 A | * | 6/1996 | Ovshinsky et al. .......... 429/223 |
| 5,571,636 A | | 11/1996 | Ohta et al. |
| 5,654,115 A | | 8/1997 | Hasebe et al. |
| 5,700,596 A | | 12/1997 | Ikoma et al. |
| 5,707,764 A | | 1/1998 | Miyamoto et al. |
| 5,744,259 A | * | 4/1998 | Ohta et al. .................... 429/59 |
| 5,788,943 A | | 8/1998 | Aladjov |
| 5,814,108 A | * | 9/1998 | Nanamoto et al. ......... 29/623.1 |
| 5,843,372 A | * | 12/1998 | Hasebe et al. .............. 29/623.1 |
| 5,876,874 A | * | 3/1999 | Furukawa ................... 429/223 |
| 5,965,295 A | | 10/1999 | Bando et al. |
| 6,083,642 A | * | 7/2000 | Kato et al. ............... 429/218.1 |
| 6,268,082 B1 | | 7/2001 | Hiruma et al. |

FOREIGN PATENT DOCUMENTS

| | | |
|---|---|---|
| EP | 0 557 522 | 9/1993 |
| EP | 0 727 835 | 8/1996 |
| EP | 0 727 835 A1 | 8/1996 |
| JP | 51-045738 A | 4/1976 |
| JP | 2-30061 | 1/1990 |
| JP | 2-47824 | 10/1990 |
| JP | 3-77273 | 4/1991 |
| JP | 05041212 | 2/1993 |
| JP | 5-174867 | 7/1993 |
| JP | 05290841 | 11/1993 |
| JP | 6-52857 | 2/1994 |
| JP | 6-101332 | 12/1994 |
| JP | 2512076 | 4/1996 |
| JP | 8-236145 | 9/1996 |
| JP | 09082323 A * | 3/1997 |
| JP | 9-171835 | 6/1997 |
| JP | 9-213363 | 8/1997 |
| WO | WO 94/11910 | 5/1994 |

OTHER PUBLICATIONS http://www.bartleby.com/61/44/E0244400.html (online definition for "eutectic" from American Heritage Dictionary of the English Language website, cited by Examiner in parent case).

Patent Abstracts of Japan, vol. 18, No. 77 (E-1504), Feb. 8, 1994, JP 5 290841, Nov. 11, 1993.

Patent Abstracts of Japan, vol. 97, No. 12, Dec. 25, 1997, JP 9 213325, Aug. 15, 1997.

* cited by examiner

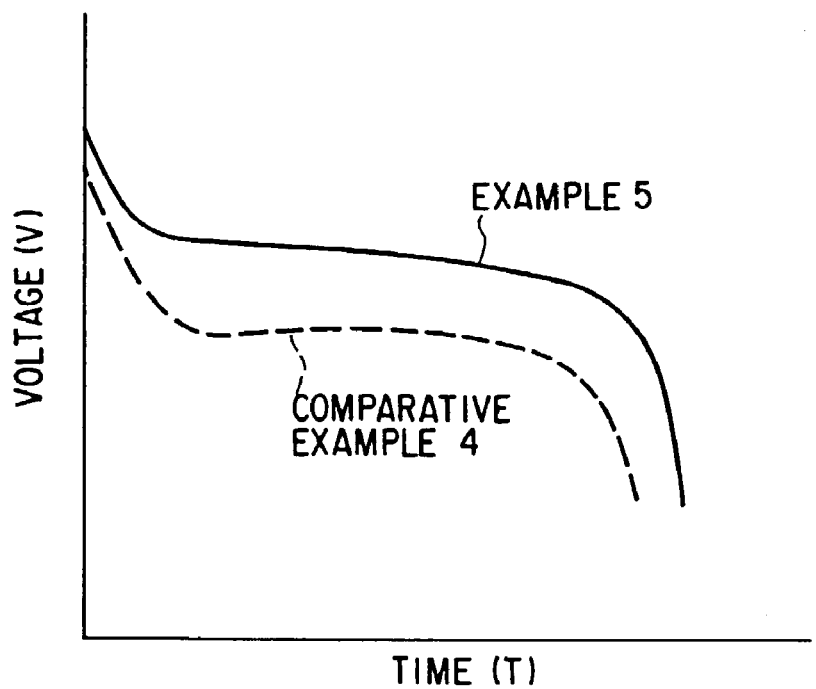
F I G. 4
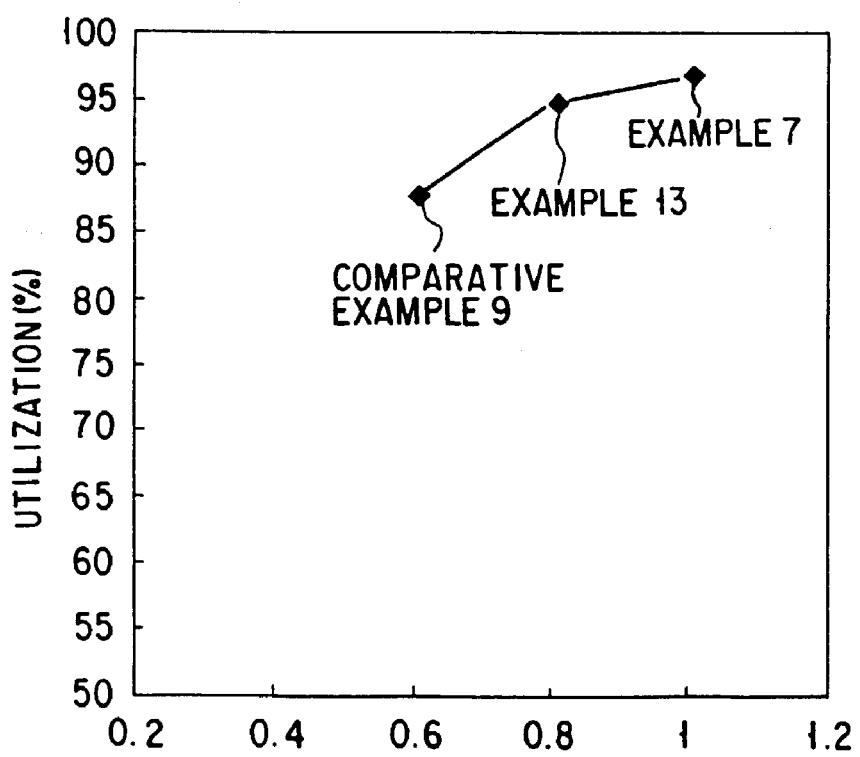
F I G. 5

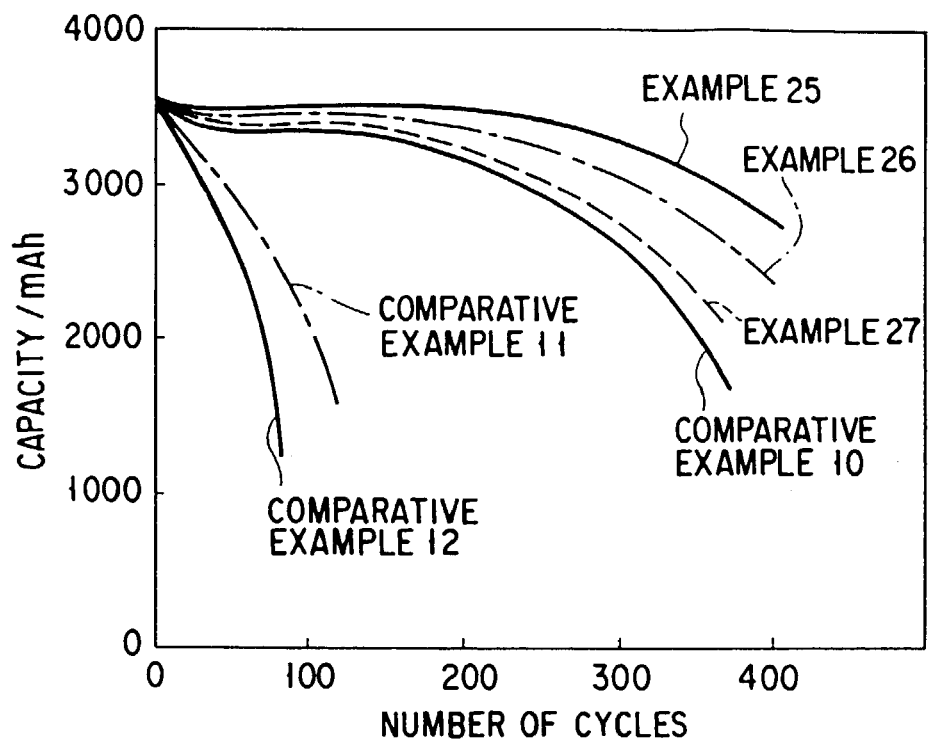
F I G. 6
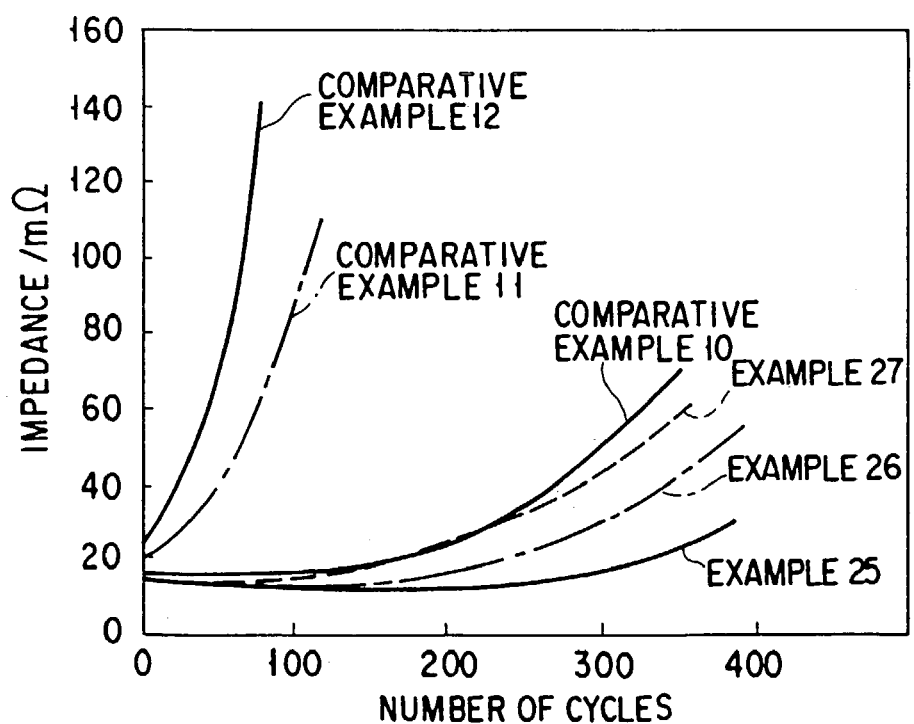
F I G. 7

ELECTRODES, ALKALINE SECONDARY BATTERY, AND METHOD FOR MANUFACTURING ALKALINE SECONDARY BATTERY

This application is a divisional application of application Ser. No. 08/989,163, filed Dec. 11, 1997, abandoned.

BACKGROUND OF THE INVENTION

This invention relates to electrodes, an alkaline secondary battery, and a method for manufacturing an alkaline secondary battery.

As a positive electrode to be employed for an alkaline secondary battery, a sintered type positive electrode has been employed. This sintered type positive electrode has been manufactured by a process wherein nickel particles are attached to a two-dimensional substrate such as a punched steel body or a nickel mesh and then sintered to obtain a porous plate having openings of several tens microns in pore size, which is then impregnated with an aqueous solution of a nickel salt and subjected to an alkaline treatment thereby to turn the nickel salt impregnated in the porous body into nickel hydroxide.

However, the manufacture of the sintered type positive electrode involves complicated procedures for impregnating a nickel salt and an alkaline treatment. In order to impregnate the substrate with a predetermined amount of an active material, the aforementioned procedures are required to be repeated 4 to 10 times. As a result, the manufacturing cost would be increased by such complicated procedures. Moreover, since the sintered type positive electrode to be obtained by the aforementioned procedures is accompanied with a problem that if the porosity thereof exceeds over 80%, it is difficult to assure the mechanical strength thereof, it is impossible to further increase the filling ratio of the active material.

Under the circumstances, it is now studied to manufacture a positive electrode by a different method wherein nickel hydroxide particles are mixed with a conductive material, a binder and water to prepare a paste, which is then filled into a metallic porous body having a three-dimensional structure such as a sponge-like porous metallic body having an average porosity of 95% or more and an average pore diameter of several tens to several hundreds microns, and a metallic fiber mat. The positive electrode manufactured in this manner is called a non-sintered type positive electrode (or a pasted type positive electrode) in contrast to the aforementioned sintered type positive electrode. This a paste type positive electrode is advantageous in that the porosity and average pore size of the metallic porous body are relatively large as compared with those of the aforementioned sintered type positive electrode, so that an active material can be more easily filled into the substrate and the filling ratio of an active material can be increased.

Accordingly, it has been possible with the employment of this paste type positive electrode and improvements on the quality of this paste type positive electrode to further increase the capacity of alkaline secondary battery. By the way, due to an increasing propagation and high performance of potable electric equipments in recent years, it is still demanded to further improve the density of capacity of a secondary battery.

It is imperative in order to meet such a demand to increase the positive electrode or the negative electrode. In the case of a nickel-hydrogen secondary battery, which is one of an alkaline secondary battery, the electrode which regulates the capacity of the battery is generally constituted by a positive electrode. Therefore, it is imperative in order to increase the capacity of battery to increase the ratio of an active material for the positive electrode. By the way, the nickel-hydrogen secondary battery is generally constructed in such a manner that an electrode group comprising a paste type positive electrode containing nickel hydroxide as an active material, a paste type negative electrode containing a hydrogen absorbing alloy, and a separator interposed between the positive electrode and the negative electrode is housed together with an alkali electrolyte in a case (or vessel). There is a limitation on the volume of the electrode group to be accommodated in the case. Therefore, as a means for increasing the quantity of an active material, it is conceivable to decrease the ratio in capacity between the positive electrode and the negative electrode, i.e. to decrease the capacity of the negative electrode, or to make the thickness of the separator thinner, thereby decreasing the volume of the electrode group. In this case, whichever method it is adopted, some decrease in quantity of alkali electrolyte in relative to a capacity of the positive electrode cannot be avoided. If the quantity of alkali electrolyte in relative to the capacity is decreased, the inner resistance would be increased to lower the operating voltage, thus raising the problems that the discharge capacity is lowered and the utilization of the positive electrode would be lowered.

Meanwhile, Japanese Patent Unexamined Publication H/2-30061 discloses a positive electrode containing nickel hydroxide particles to which zinc is added. Japanese Patent Unexamined Publication H/3-77273 discloses a positive electrode containing nickel hydroxide particles whose surfaces are adhered with zinc hydroxide particles. However; it is still difficult to avoid the lowering of the utilization due to an increase in capacity of the battery.

BRIEF SUMMARY OF THE INVENTION

Accordingly, an object of the present invention is to provide an alkaline secondary battery which is capable of avoiding the lowering of the utilization of active material of the positive electrode as the quantity of electrolyte is limited, on the account both of the crystalline distortion of nickel hydroxide and of the inclusion of zinc, and hence to increase the capacity thereof, and to provide a method for manufacturing such an alkaline secondary battery.

Another object of the present invention is to provide an electrode, which makes it possible to improve the distribution of electrolyte at the initial stage of charging/discharging cycle and at the same time, to inhibit an increase of impedance in the charging/discharging cycle, whereby improving the initial capacity and the capacity maintenance factor during the charging/discharging cycle.

Another object of the present invention is to provide an alkaline secondary battery, which makes it possible to improve the distribution of electrolyte at the initial stage of charging/discharging cycle as the ratio in quantity of electrolyte to the theoretical capacity is relatively low and at the same time, to inhibit an increase of impedance in the charging/discharging cycle, whereby improving the initial capacity and, in particular, the capacity maintenance factor during the charging/discharging cycle, and to provide a method of manufacturing such an alkaline secondary battery.

Another object of the present invention is to provide an alkaline secondary battery which is capable of inhibiting a decrease of capacity after being left for a long period of time and improving the discharge property of large current without increasing the content of a cobalt compound in the positive electrode.

Another object of the present invention is to provide an electrode which is capable of enhancing the utilization of an active material and inhibiting the lowering of capacity due to over-discharging without increasing the content of a cobalt compound in the electrode.

Another object of the present invention is to provide an alkaline secondary battery which is capable of enhancing the utilization of the positive electrode and inhibiting the lowering of capacity due to an over-discharging without increasing the content of a cobalt compound in the positive electrode, and to provide a method of manufacturing such an alkaline secondary battery.

Further object of the present invention is to provide a method of manufacturing an alkaline secondary battery which is capable of solving a problem which has been disregarded in the conventional low rate charging, but has become prominent today in an ordinary quick charge controlling system, i.e. a problem of improving the start-up property in voltage thereof at the occasion of re-charging, in particular re-charging with a low-current, of the battery after being left for a long period of time.

Namely, according to the present invention, there is provided an alkaline secondary battery comprising;

a positive electrode containing nickel hydroxide having a value of 0.8° or more in the half-width of a peak in the (101) plane thereof as measured by X-ray. powder diffraction (2θ) using Cu—Kα ray, and 4.0 to 15% by weight of at least one material selected from the group consisting of zinc and zinc compounds, the weight of the at least one material being one calculated as zinc element and based on the weight of the nickel hydroxide; and an alkali electrolyte, the ratio of which to theoretical capacity of the positive electrode being 0.7 to 2.0 cm$^3$/Ah.

According to the present invention, there is further provided a method of manufacturing an alkaline secondary battery comprising the steps of;

assembling a battery unit comprising (a) a positive electrode containing nickel hydroxide having a value of 0.8° or more in the half-width of a peak in the (101) plane thereof as measured by X-ray powder diffraction (2θ) using Cu—Kα ray, at least one of a first material selected from the group consisting of cobalt and cobalt compounds, and 4.0 to 15% by weight of at least one of a second material selected from the group consisting of zinc and zinc compounds, the weight of the at least one of a second material being one calculated as zinc element and based on the weight of the nickel hydroxide, and (b) an alkali electrolyte, the ratio of which to theoretical capacity of the positive electrode being 0.7 to 2.0 cm$^3$/Ah; and subjecting the battery unit to an initial charging at a temperature of 40 to 100° C.

According to the present invention, there is further provided a method of manufacturing an alkaline secondary battery comprising the steps of;

assembling a battery unit comprising (a) a positive electrode containing nickel hydroxide having a value of 0.8° or more in the half-width of a peak in the (101) plane thereof as measured by X-ray powder diffraction (2θ) using Cu—Kα ray, at least one of a first material selected from the group consisting of cobalt and cobalt compounds, and 4.0 to 15% by weight of at least one of a second material selected from the group consisting of zinc and zinc compounds, the weight of the at least one of a second material being one calculated as zinc element and based on the weight of the nickel hydroxide, and (b) an alkali electrolyte, the ratio of which to theoretical capacity of the positive electrode being 0.7 to 2.0 cm$^3$/Ah;

subjecting the battery unit to a partial charging which is 5 to 20% of the full charging of the battery unit; and subjecting the battery unit to an aging.

According to the present invention, there is further provided an alkaline secondary battery comprising;

a positive electrode containing nickel hydroxide having a value of 0.8° or more in the half-width of a peak in the (101) plane thereof as measured by X-ray powder diffraction (2θ) using Cu—Kα ray and at least one alkali metal selected from the group consisting of cesium, rubidium and potassium; and an alkali electrolyte, the ratio of which to theoretical capacity of the positive electrode being 0.7 to 1.3 cm$^3$/Ah.

According to the present invention, there is further provided an electrode comprising;

nickel hydroxide having a value of 0.8° or more in the half-width of a peak in the (101) plane thereof as measured by X-ray powder diffraction (2θ) using Cu—K α ray and at least one alkali metal selected from the group consisting of cesium, rubidium and potassium.

According to the present invention, there is further provided a method of manufacturing an alkaline secondary battery comprising the steps of;

assembling a battery unit comprising (a) a positive electrode containing nickel hydroxide having a value of 0.8° or more in the half-width of a peak in the (101) plane thereof as measured by X-ray powder diffraction (2θ) using Cu—Kα ray, at least one alkali metal selected from the group consisting of cesium, rubidium and potassium and at least one of a first material selected from the group consisting of cobalt and cobalt compounds, and (b) an alkali electrolyte, the ratio of which to theoretical capacity of the positive electrode being 0.7 to 1.3 cm$^3$/Ah; and subjecting the battery unit to an initial charging at a temperature of 40 to 100° C.

According to the present invention, there is further provided a method of manufacturing an alkaline secondary battery comprising the steps of;

assembling a battery unit comprising (a) a positive electrode containing nickel hydroxide having a value of 0.8° or more in the half-width of a peak in the (101) plane thereof as measured by X-ray powder diffraction (2θ) using Cu—Kα ray, at least one alkali metal selected from the group consisting of cesium, rubidium and potassium and at least one of a first material selected from the group consisting of cobalt and cobalt compounds, and (b) an alkali electrolyte, the ratio of which to theoretical capacity of the positive electrode being 0.7 to 1.3 cm$^3$/Ah;

subjecting the battery unit to a partial charging which is 5 to 20% of the full charging of the battery unit; and subjecting the battery unit to an aging.

According to the present invention, there is further provided an alkaline secondary battery comprising;

a positive electrode which contains nickel hydroxide and particles containing cobalt hydroxide and having a tap density of 0.4 to 1.15 g/cm$^3$.

According to the present invention, there is further provided an electrode which contains nickel hydroxide and particles containing cobalt hydroxide and having a tap density of 0.4 to 1.15 g/cm$^3$.

According to the present invention, there is further provided a method of manufacturing an alkaline secondary battery comprising the steps of;

assembling a battery unit which comprises a positive electrode containing nickel hydroxide and particles, the particles containing cobalt hydroxide and having an average particle diameter ranging from 0.3 to 2.5 microns;

subjecting the battery unit to a partial charging which is 5 to 20% of the full charging of the battery unit; and subjecting the battery unit to an aging.

According to the present invention, there is further provided a method of manufacturing an alkaline secondary battery comprising the steps of;

assembling a battery unit which comprises a positive electrode containing nickel hydroxide and particles, the particles containing cobalt hydroxide and having a tap density ranging from 0.4 to 1.15 cm$^3$;

subjecting the battery unit to a partial charging which is 5 to 20% of the full charging of the battery unit; and subjecting the battery unit to an aging.

According to the present invention, there is further provided a method of manufacturing an alkaline secondary battery comprising the steps of;

assembling a battery unit which comprises a positive electrode containing nickel hydroxide and particles, the particles containing cobalt hydroxide and having a specific surface area ranging from 2.5 to 30 m$^2$/g;

subjecting the battery unit to a partial charging which is 5 to 20% of the full charging of the battery unit; and subjecting the battery unit to an aging.

According to the present invention, there is further provided a method of manufacturing an alkaline secondary battery comprising the steps of;

assembling a battery unit comprising a positive electrode which contains an active material containing nickel hydroxide, and not more than 6% by weight of at least one material selected from the group consisting of cobalt and cobalt compounds, the weight of the at least one material being one calculated as cobalt element and based on the weight of the active material; and subjecting the battery unit to an initial charging at a temperature of 40 to 100° C.

According to the present invention, there is further provided an alkaline secondary battery comprising;

a positive electrode containing particles containing nickel oxide, and a conductive layer formed at least partially on the surfaces of the particles, the layer containing cobalt compounds and having a conductive surface region on which free electrons function as an electric charge carrier.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a graph showing the changes with time of discharge voltage in the secondary batteries of Example 5 and Comparative Example 4;

FIG. 5 is a graph showing the relationship between the half-width of a peak in the (101) plane as measured by the X-ray powder diffraction (Cu—Kα, 2θ) of the nickel hydroxide and the utilization in the secondary batteries of Examples 7 and 13 and of Comparative Example 9;

FIG. 6 is a graph showing the relationship between the kinds of the alkali metal hydrate included in the positive electrode and the charging/discharging cycle in the secondary batteries of Examples 25 to 27 and of Comparative Examples 10 to 12;

FIG. 7 is a graph showing the relationship between the kinds of the alkali metal hydrate included in the positive electrode and the impedance in the secondary batteries of Examples 25 to 27 and of Comparative Examples 10 to 12;

DETAILED DESCRIPTION OF THE INVENTION (A First Alkaline Secondary Battery)

An a cylindrical alkaline secondary battery representing one embodiment of this invention will be explained with reference to FIG. 1 as follows.

Figure 1:
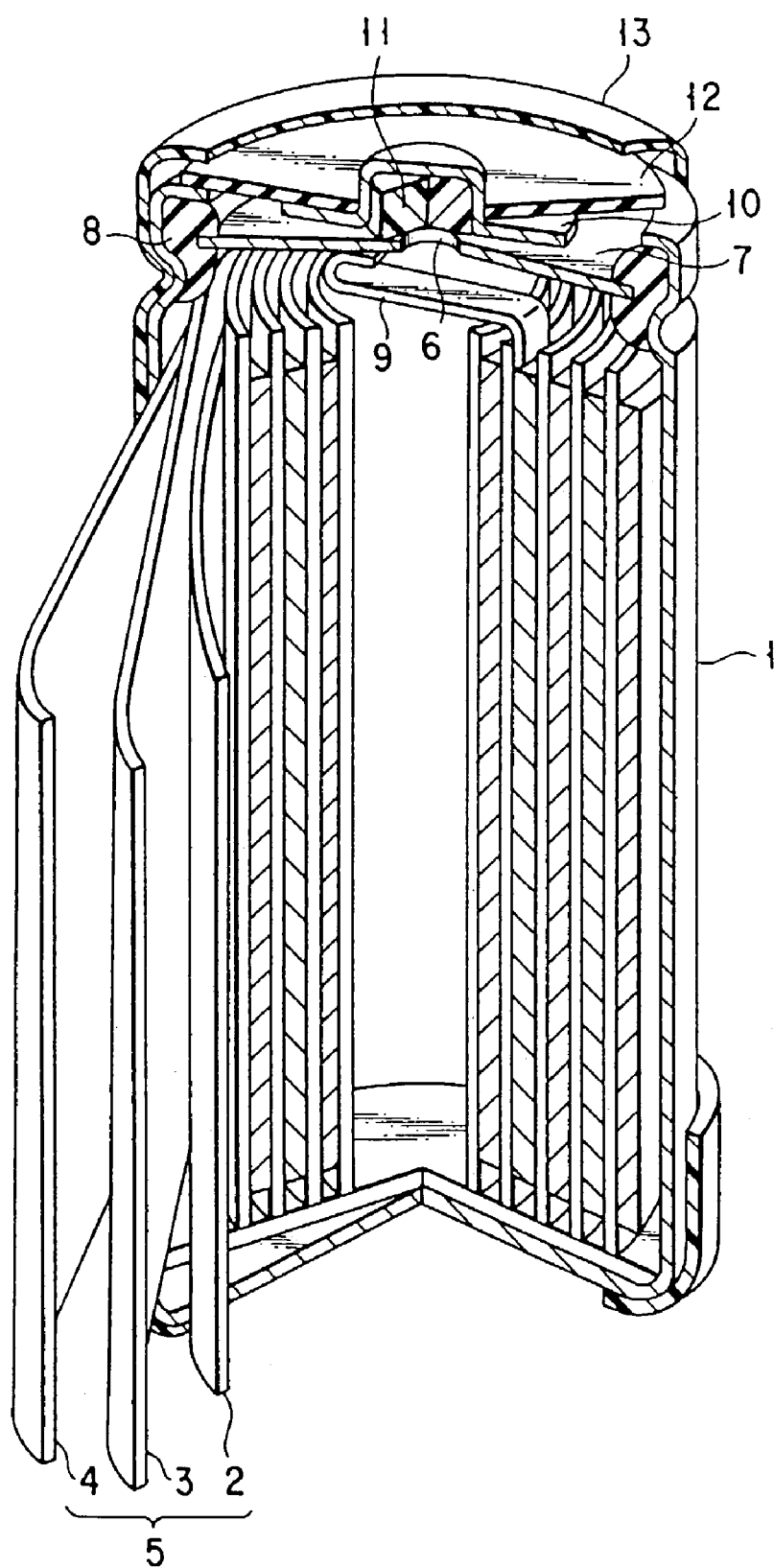
FIG. 1 is a partially sectioned perspective view of an alkaline secondary battery illustrating one embodiment of the present invention.

Referring to FIG. 1, a bottomed cylindrical case 1 is accommodated therein with an electrode group 5 which has been manufactured by spirally winding a positive electrode 2, a negative electrode 4 and a separator 3 which is interposed between the positive electrode 2 and the negative electrode 4. The negative electrode 4 is disposed at the outermost periphery of the electrode group 5 so as to electrically contact with the cylindrical case 1. The cylindrical case 1 is also filled with an alkali electrolyte. A first sealing plate 7 formed of a disk having an opening 6 at the center is disposed on the upper opening of the cylindrical case 1. An insulating gasket 8 having a ring-like shape is interposed between the periphery of the first sealing plate 7 and the inner wall of the opening of the cylindrical case 1. The peripheral fringe portion of the opening of the cylindrical case 1 is caulked inward so that the first sealing plate 7 is hermetically fixed via the gasket 8 to cylindrical case 1. The positive lead 9 is connected through its one end to the positive electrode 2 and through its other end to the lower surface of the first sealing plate 7. A positive terminal 10 having a hat-like shape is mounted over the sealing plate 7 in such a manner as to cover the opening 6. A rubber safety valve 11 is disposed in a space surrounded by the sealing plate 7 and the positive terminal 10 in such a manner as to seal the opening 6. A holding plate 12 formed of an insulating disk having an opening at the center is disposed over the positive electrode terminal 10 in such a manner that the projected portion of the positive terminal 10 is protruded out through the opening of the holding plate 12. An envelope tube 13 is disposed to cover all of the periphery of the holding plate 12, the side wall of the cylindrical case 1 and the periphery of the bottom of the cylindrical case 1.

Next, the details of the positive electrode 2, the negative electrode 4, the separator 3 and the electrolyte will be explained.

(1) The Positive Electrode 2

As for the positive electrode 2, three kinds of positive electrodes (A), (B) and (C) can be employed as explained below.

Followings are explanations on the positive electrode (A).

This positive electrode (A) comprises of particles (hereinafter referred to as nickel hydroxide particles A) which contain nickel hydroxide exhibiting a value of 0.8° or more in the half-width of a peak in the (101) plane thereof as measured by X-ray powder diffraction (Cu—K$\alpha$, 2$\theta$) and 4.0 to 15% by weight of at least one material selected from the group consisting of zinc and zinc compounds. The weight of said at least one material is one calculated as zinc element and based on the weight of the nickel hydroxide.

The reason for limiting the half-width of a peak in the (101) plane of the nickel hydroxide as measured by X-ray powder diffraction (2$\theta$) is as follows. Namely, if the half-width is less than 0.8°, the charge/discharge efficiency may be lowered, thus deteriorating the utilization of the active material (nickel hydroxide). Preferably, the half-width of the nickel hydroxide should be in the range of 0.9 to 1.1°. The measurement of the half-width of the peak can be performed by means of the X-ray powder diffraction (2$\theta$) using Cu—K$\alpha$ ray as a tube and by measuring, from the resultant diffraction diagram, the half-width of a peak existing in the vicinity of 38.7° which corresponds to (101) plane.

The reason for limiting the content of said at least one material in the nickel hydroxide particles A is as follows. If the content is less than 4.0% by weight, it may become difficult to maintain a high utilization of the active material for the positive electrode with a lesser quantity of electrolyte. On the other hand, if the content exceeds over 15% by weight, the purity of the particles A may be excessively deteriorated due to the inclusion of metals other than nickel, thus deteriorating the capacity of the positive electrode. Preferable range of the content of zinc is from 4 to 9% by weight.

The nickel hydroxide and the zinc should preferably form an eutectic compound in the nickel hydroxide particles A. The eutectic compound in this case means, for example, that the Ni of the nickel hydroxide (OH—Ni—OH) is substituted by Zn.

The nickel hydroxide particles A can further contain at least one material selected from the group consisting of cobalt and cobalt compound. The content of said at least one material in the nickel hydroxide particles A should preferably be in the range of 0.1 to 3.0% by weight based on nickel hydroxide in view of improving the utilization of the active material in the positive electrode where the quantity of the electrolyte is relatively small. The content of said at least one material is one calculated as cobalt element. The nickel hydroxide, the zinc and the cobalt should preferably form an eutectic compound in the nickel hydroxide particles A.

The nickel hydroxide particles A should preferably be spherical or nearly spherical in shape.

Further, the nickel hydroxide particles A should preferably be 5 to 30 µm in average particle diameter and 1.8 g/cm$^3$ or more in tap density.

Furthermore, the nickel hydroxide particles A should preferably have a specific surface area ranging from 3 to 25 m$^2$/g in view of improving the utilization of the active material in the positive electrode where the quantity of the electrolyte is relatively small.

The nickel hydroxide particles A can be manufactured by the following method. Namely, metallic nickel, cobalt and zinc are allowed to dissolve in an aqueous solution of sulfuric acid thereby to produce nickel complex ions, cobalt complex ions and zinc complex ions. Then, the solution is added dropwise to a mixed solution of sodium hydroxide and ammonia, whereby producing nickel hydroxide particles where the solid solution of cobalt and zinc is produced therein.

If the solution containing various complex ions as mentioned above is added dropwise to an aqueous solution of sodium hydroxide under convection in the neutralization step, the formation of crystalline nucleus as well as the growth of crystal of nickel hydroxide can be gradually proceeded. As a result, nickel hydroxide particles having a spherical or nearly spherical shape and being free from void, i.e. high in density can be obtained. Further, it is possible to enlarge the nickel hydroxide particles containing both cobalt and zinc by suitably controlling the temperature and pH at the step of neutralizing the complex ions of nickel, cobalt and zinc contained in the aqueous solution of sulfuric acid with an aqueous solution of sodium hydroxide. Specifically, it is possible to obtain large nickel hydroxide crystals by controlling the temperature to approximately the transition temperature (in this case, 40° C.) and controlling the pH to a weak base region thereby keeping the solution as neutral as possible, i.e. in a metastable state (for example, pH=11). Further, it is possible with this control of pH to obtain the nickel hydroxide particles exhibiting a value of 0.8° or more in the half-width of a peak in the (101) plane thereof as measured by X-ray powder diffraction (Cu—K$\alpha$, 2$\theta$).

This positive electrode (A) can be manufactured by the following method (a) or (b) explained below.

(a) A paste comprising the nickel hydroxide particles A, a conductive material, a binder and water is prepared at first, and then the paste is filled in or coated on a conductive substrate, the resultant conductive substrate being subsequently dried and press-molded to obtain the positive electrode (A).

As for the conductive materials, cobalt-based particles can be employed. Namely, the cobalt-based particles can be manufactured from cobalt hydroxide, cobalt monoxide, dicobalt trioxide, etc. Among them, particles consisting mainly of cobalt hydroxide and meeting at least one of the conditions: 0.3 to 2.5 µm in average particle diameter, 0.4 to 1.15 g/cm$^3$ in tap density and 2.5 to 30 m$^2$/g in specific surface area are more preferable for use.

The average particle diameter, tap density and specific surface area of the cobalt hydroxide containing-particles can be measured by the following methods.

(1) Average Particle Diameter

The average particle diameter of the cobalt hydroxide containing-particles can be determined by making use of a particle size analyzer (Seishin, SK-LMS Pro-7000S).

(2) Tap Density

The tap density can be determined by making use of a tap denser (Seishin tap denser, KYT-3000), wherein the tapping is repeated 200 times by making use of a 20 cm$^3$ cell.

(3) Specific Surface Area by Means of BET Method

The specific surface area can be measured by making use of Quantasorb 1 (Quanta Chrome Co., Ltd.).

The reasons for limiting the average particle diameter, tap density and specific surface area are as follows.

If the ratio of electrolyte to theoretical capacity of the positive electrode is in the range of 0.7 to 2.0 cm$^3$/Ah, the alkali electrolyte in the positive electrode may be unevenly distributed. If the average particle diameter of the particles containing the cobalt hydroxide is less than 0.35 μm, the specific surface area of the particles would be increased, decreasing the ratio of the surface contacting with the electrolyte and hence decreasing the dissolving ratio of the particles, thus making it impossible to sufficiently improve the utilization of the particles. On the other hand, if the average particle diameter of the particles exceeds over 2.5 μm, the dissolving ratio of the particles would be decreased, thus making it impossible to sufficiently improve the utilization of the particles. More preferably, the average particle diameter of the particles should be in the range of 0.7 to 2.2 μm.

If the tap density of the particles containing the cobalt hydroxide is confined to the aforementioned range, the ratio of surface to be contacted with the alkali electrolyte can be increased, thereby increasing the dissolving ratio of the particles, thus making it possible to improve the utilization of the particles. More preferably, the tap density should be confined to 0.8 to 1.1 g/cm$^3$.

If the specific surface area of the particles containing the cobalt hydroxide is confined to the aforementioned range, the ratio of surface to be contacted with the alkali electrolyte can be increased, thereby increasing the dissolving ratio of the particles, thus making it possible to improve the utilization of the particles. More preferably, the specific surface area should be confined to 3 to 20 m$^2$/g.

The cobalt hydroxide containing-particles can further contain cobalt monoxide, dicobalt trioxide.

The content of the cobalt-based particles should preferably be in the range of 3 to 10% by weight based on the nickel hydroxide particles.

As for the binder, fluorine resin (for example, polytetrafluoroethylene), carboxymethyl cellulose, methyl cellulose, polyacrylate (for example, sodium polyacrylate), hydroxymethyl cellulose or polyvinyl alcohol may be employed.

As for the conductive substrate, a sponge-like, net-like, fibrous or felt-like metallic porous body, a punching metal or a plate which is made from an alkali-resistive metal such as nickel and stainless steel, or nickel-coated resin may be employed.

(b) First of all, the surface of the aforementioned nickel hydroxide particles A is at least partially covered by at least one material selected from cobalt and cobalt compounds, thereby manufacturing a first composite particle. Then, a paste comprising the first composite particle, a binder and water is prepared, and then the paste is filled in or coated on a conductive substrate, the resultant conductive substrate being subsequently dried and press-molded to obtain the positive electrode (A).

As for the cobalt compound, cobalt hydroxide, cobalt monoxide, dicobalt trioxide, etc. may be employed.

As for the binder and the conductive substrate, the same kinds of materials as mentioned above may be employed.

The specific surface area of the first composite particle should preferably be confined to 50 m$^2$/g or less. Since the ratio of alkali electrolyte to theoretical capacity is restricted to the aforementioned range, the ratio of the surface of the first composite particle to be contacted with the alkali electrolyte would be decreased, if the specific surface area of the first composite particle exceeds over 50 m$^2$/g, thereby decreasing the dissolving ratio of the material, thus making it difficult to improve the utilization of the particles. The lower limit of the specific surface in this case may preferably be 3 m$^2$/g. More preferably, this specific surface area should be confined to 3 to 25 m$^2$/g.

Followings are explanations on the positive electrode (B).

This positive electrode (B) contains particles (hereinafter referred to as nickel hydroxide particles B) containing nickel hydroxide exhibiting a value of 0.8° or more in the half-width of a peak in the (101) plane thereof as measured by X-ray powder diffraction (Cu—Kα, 2θ), and at least one kind of particles (hereinafter referred to as zinc particles α) selected from zinc particles and zinc compound particles. The content of the zinc particles α in the positive electrode should preferably be in the range of 4.0 to 15% by weight based on the nickel hydroxide. The weight of the zinc particles α is one calculated as zinc element.

The reason for limiting the half-width of the nickel hydroxide is the same as explained with reference to the aforementioned positive electrode (A). More preferable range of the half-width is 0.9 to 1.1°.

As for the zinc compound, zinc oxide (ZnO), Zn(OH)$_2$, ZnF$_2$, ZnCl$_2$, Zn(PH$_2$O$_2$)$_2$.H$_2$O, Zn(C$_2$O$_4$).2H$_2$O, etc. may be employed.

The reason for limiting the content of zinc particles α is the same as explained with reference to the aforementioned positive electrode (A). Preferable range of the content of zinc particles α is from 4 to 9% by weight.

It is preferable to add at least one material selected from the group consisting of cobalt and cobalt compound to the nickel hydroxide particles B in the range of 0.1 to 3.0% by weight based on nickel hydroxide in view of improving the utilization of the active material in the positive electrode where the quantity of the electrolyte is relatively small. The content of said at least one material is one calculated as cobalt element. It is also more preferable in this nickel hydroxide particles B to contain an eutectic substance made from the cobalt and the nickel hydroxide.

The nickel hydroxide particles B should preferably be spherical or nearly spherical in shape.

Further, the nickel hydroxide particles B should preferably be 5 to 30 μm in average particle diameter and 1.8 g/cm$^3$ or more in tap density.

Furthermore, the nickel hydroxide particles B should preferably have a specific surface area ranging from 3 to 25 m$^2$/g in view of improving the utilization of the active material in the positive electrode where the quantity of the electrolyte is relatively small.

This positive electrode (B) can be manufactured by the following method (a) or (b) explained below.

(a) A paste comprising the nickel hydroxide particles B, cobalt-based particles, the aforementioned zinc particles α, a binder and water is prepared at first, and then the paste is filled in or coated on a conductive substrate, the resultant conductive substrate being subsequently dried and press-molded to obtain the positive electrode (B).

As for the cobalt-based particles, the same kinds of material as explained with reference to the positive electrode (A) can be employed. Among them, particles consisting mainly of cobalt hydroxide and meeting at least one of the conditions: 0.3 to 2.5 μm in average particle diameter, 0.4 to 1.15 g/cm$^3$ in tap density and 2.5 to 30 m$^2$/g in specific surface area are more preferable for use.

(b) First of all, the surface of the aforementioned nickel hydroxide particles B is at least partially covered by at least one material selected from cobalt and cobalt compounds, thereby manufacturing a second composite particle. Then, a paste comprising the second composite particle, the aforementioned zinc particles α, a binder and water is prepared, and then the paste is filled in or coated on a conductive substrate, the resultant conductive substrate being subsequently dried and press-molded to obtain the positive electrode (B).

The specific surface area of the second composite particle should preferably be confined to 50 m$^2$/g or less. The reason for limiting the specific surface area of the second composite particle is the same as explained with reference to the aforementioned positive electrode (A).

As for the binder and conductive substrate, the same kinds of materials as explained with reference to the aforementioned positive electrode (A) can be employed.

Followings are explanations on the positive electrode (C).

This positive electrode (C) contains particles (hereinafter referred to as nickel hydroxide particles C) containing nickel hydroxide exhibiting a value of 0.8° or more in the half-width of a peak in the (101) plane thereof as measured by X-ray powder diffraction (Cu—Kα, 2θ) and at least one material selected from the group consisting of zinc and zinc compounds, and the aforementioned zinc particles α. The total content of said at least one material contained in the nickel hydroxide particles C and the zinc particles α in the positive electrode should preferably be in the range of 4.0 to 15% by weight based on the nickel hydroxide. The total weight of said at least one material and the zinc particles α is one calculated as zinc element.

The reason for limiting the half-width of the nickel hydroxide is the same as explained with reference to the aforementioned positive electrode (A). More preferable range of the half-width is 0.9 to 1.1°.

As for the zinc compound, the same materials as explained with reference to the aforementioned positive electrode (B) may be employed.

The reason for limiting the total content of zinc element to be included in the positive electrode is the same as explained with reference to the aforementioned positive electrode (A). Preferable range of the total content of zinc element is from 4 to 9% by weight.

It is preferable to add at least one material selected from the group consisting of cobalt and cobalt compound to the nickel hydroxide particles C in the range of 0.1 to 3.0% by weight based on nickel hydroxide in view of improving the utilization of the active material in the positive electrode where the quantity of the electrolyte is relatively small. The content of said at least one material is one calculated as cobalt element. It is also more preferable in this nickel hydroxide particles C to contain an eutectic substance made from the cobalt and the nickel hydroxide.

The nickel hydroxide particles C should preferably be spherical or nearly spherical in shape.

Further, the nickel hydroxide particles C should preferably be 5 to 30 μm in average particle diameter and 1.8 g/cm$^3$ or more in tap density.

Furthermore, the nickel hydroxide particles C should preferably have a specific surface area ranging from 3 to 25 m$^2$/g in view of improving the utilization of the active material in the positive electrode where the quantity of the electrolyte is relatively small.

This positive electrode (C) can be manufactured by the following method (a) or (b) explained below.

(a) A paste comprising the nickel hydroxide particles C, cobalt-based particles, the aforementioned zinc particles α, a binder and water is prepared at first, and then the paste is filled in or coated on a conductive substrate, the resultant conductive substrate being subsequently dried and press-molded to obtain the positive electrode (C).

As for the cobalt-based particles, the same kinds of material as explained with reference to the positive electrode (A) can be employed. Among them, particles consisting mainly of cobalt hydroxide and meeting at least one of the conditions: 0.3 to 2.5 μm in average particle diameter, 0.4 to 1.15 g/cm$^3$ in tap density and 2.5 to 30 m$^2$/g in specific surface area are more preferable for use.

(b) First of all, the surface of the aforementioned nickel hydroxide particles C is at least partially covered by at least one material selected from cobalt and cobalt compounds, thereby manufacturing a third composite particle. Then, a paste comprising the third composite particle, the aforementioned zinc particles α, a binder and water is prepared, and then the paste is filled in or coated on a conductive substrate, the resultant conductive substrate being subsequently dried and press-molded to obtain the positive electrode (C).

The specific surface area of the second composite particle should preferably be confined to 50 m$^2$/g or less. The reason for limiting the specific surface area of the second composite particle is the same as explained with reference to the aforementioned positive electrode (A).

As for the binder, the cobalt compounds and conductive substrate, the same kinds of materials as explained with reference to the aforementioned positive electrode (A) can be employed.

The positive electrodes (A), (B) and (C) may contain both of the cobalt-based particles and the composite particles, respectively.

(2) The Negative Electrode 4

This negative electrode 4 can be manufactured by a method wherein a paste comprising an active material for negative electrode, a conductive material, a binder and water is first prepared, and then the resultant paste is filled into an conductive substrate, the resultant conductive substrate being subsequently dried and press-molded into a predetermined shape.

As for the active material for the negative electrode, cadmium compounds such as metallic cadmium and cadmium hydroxide; and hydrogen can be employed. As for the host matrix for hydrogen, a hydrogen-absorbing alloy can be employed.

The employment of a hydrogen-absorbing alloy is more preferable than the cadmium compounds, since the capacity of the secondary battery can be improved by the employment of a hydrogen-absorbing alloy. As for the hydrogen-absorbing alloy, there is no limitation, and any kinds of hydrogen-absorbing alloy can be employed as far as it is capable of absorbing hydrogen gas generated electrochemically in an alkali electrolyte and readily releasing the hydrogen gas thus absorbed at the time of discharge. Examples of the hydrogen-absorbing alloy are $LaNi_5$, $MmNi_5$, (Mm is a misch metal), $LmNi_5$, (Lm represents at least one element selected from the rare earth elements including La), a multi-element system wherein a portion of Ni of the above mentioned compounds is substituted by an element such as Al, Mn, Co, Ti, Cu, Zn, Zr, Cr and B, or TiNi- or TiFe-based alloys. Among them, a hydrogen-absorbing alloy having a general formula, $LmNi_w Co_x Mn_y Al_z$ (wherein w, x, y and z are the numbers whose total value meets the equation of $5.00 \leq w+x+y+z \leq 5.50$) can be preferably employed, since it is capable of suppressing the pulverization thereof in the process of charge/discharge cycle thereby to improve the charge/discharge cycle life of the battery.

As for the conductive material, carbon black and graphite can be employed.

As for the binder, polyacrylate such as sodium polyacrylate and potassium polyacrylate; fluorine-based resin such as polytetrafluoroethylene (PTFE) and carboxymethyl cellulose (CMC) can be employed.

As for the conductive substrate, a two-dimensional substrate such as a punched metal, expanded metal, porous plate and a metal net or a three-dimensional substrate such as a felt-like porous metallic substrate and a sponge-like porous metallic substrate can be employed.

(3) The Separator 3

The separator 3 may be formed of a polyamide nonwoven fabric, or a polyolefin (such as polypropylene) nonwoven fabric attached with a hydrophilic functional group.

(4) Alkali Electrolyte

The alkali electrolyte should preferably be employed in such a manner that the ratio of alkali electrolyte (the quantity of alkali electrolyte ($cm^3$)/the theoretical capacity of the positive electrode (Ah)) at 25° C. is in the range of 0.7 to 2.0 $cm^3$/Ah. Because, if a secondary battery containing the alkali electrolyte at a ratio less than 0.7 $cm^3$/Ah is employed, it would be difficult to fully improve the utilization of active material of the positive electrode even if zinc is added thereto. On the other hand, if a secondary battery contains the alkali electrolyte at a ratio exceeding over 2.0 $cm^3$/Ah, it would be difficult to increase the content of active material of the positive electrode. More preferable ratio of alkali electrolyte is in the range of 0.9 to 1.4 $cm^3$/Ah.

As for the alkali electrolyte, an aqueous solution of sodium hydroxide (NaOH), lithium hydroxide (LiOH) or pottasium hydroxide (KOH); a mixed solution of NaOH and LiOH; a mixed solution of KOH and LiOH; or a mixed solution of (KOH), (NaOH) and (LiOH) may be employed.

In the embodiment shown in FIG. 1, a bottomed cylindrical case 1 is accommodated therein with a spirally wound a positive electrode 2 and a negative electrode 4 with a separator 3 being interposed between the positive electrode 2 and the negative electrode 4. However, it is also possible to employ a bottomed rectangular case in which a laminated body comprising positive electrodes and negative electrodes, superimposed alternately one upon another with a separator being interposed therebetween, is accommodated.

This alkaline secondary battery according to this invention is featured as explained above in that it comprises a positive electrode containing nickel hydroxide having a value of 0.8° or more in the half-width of a peak in the (101) plane thereof as measured by X-ray powder diffraction (2θ) using Cu—Kα ray and 4.0 to 15% by weight of at least one material selected from the group consisting of zinc and zinc compounds, the weight of the at least one material being one calculated as zinc element and based on the weight of the nickel hydroxide; and an alkali electrolyte, the ratio of which to theoretical capacity of the positive electrode being 0.7 to 2.0 $cm^3$/Ah.

Since it is possible according to this secondary battery to inhibit the deterioration of operating voltage resulting from the aforementioned limited range of the ratio of the electrolyte, the discharge capacity of the battery can be maintained at a high level and the utilization of active material for the positive electrode can be also maintained at a high level. Therefore, it is possible with this secondary battery to increase the filling ratio of paste in the positive electrode, and hence to assure a high capacity of the secondary battery.

When the aforementioned nickel hydroxide is distributed in the positive electrode in the form of particles, and the particles are formed in such manners that the surface thereof is at least partially coated with at least one material selected from cobalt and cobalt compounds and that the specific surface thereof is confined to 50 $m^2$/g or less, it is possible to increase the utilization of the secondary battery and to improve the discharge capacity and cycle life of the secondary battery. Furthermore, since this secondary battery is excellent in over-discharge property, it is possible to inhibit the deterioration of capacity even if the secondary battery is stored for a long period of time or in a high temperature environment.

When cobalt hydroxide containing-particles which meet at least one of the conditions: 0.3 to 2.5 μm in average particle diameter, 0.4 to 1.15 $g/cm^3$ in tap density and 2.5 to 30 $m^2$/g in specific surface area are employed, the utilization would be further improved, and at the same time the discharge capacity as well as the cycle life can be extremely improved. Additionally, since the secondary battery constructed in this manner is excellent in over-discharge property, it is possible to inhibit the deterioration of capacity even if the secondary battery is stored for a long period of time or in a high temperature environment.

(A First Method of Manufacturing an Alkaline Secondary Battery)

Next, the method of manufacturing a first alkaline secondary battery will be explained in details.

(A First Step)

First of all, an electrode group is manufactured by forming a stacked body consisting of a positive electrode, a negative electrode and a separator which is sandwiched between the positive electrode and the negative electrode, the positive electrode containing nickel hydroxide exhibiting a value of 0.8° or more in the half-width of a peak in the (101) plane thereof as measured by X-ray powder diffraction (2θ) using Cu—Kα ray, at least one of a first material selected from the group consisting of cobalt and cobalt compounds, and 4.0 to 15% by weight of at least one of a second material selected from the group consisting of zinc and zinc compounds. The weight of the at least one of a second material being one calculated as zinc element and based on the weight of the nickel hydroxide. Then, the electrode group is placed in a case, and an alkali electrolyte is charged into the case in such an amount that the ratio thereof to theoretical capacity of the positive electrode falls within the range of 0.7 to 2.0 $cm^3$/Ah. Thereafter, the case is sealed, thereby assembling a battery unit.

As for the specific materials for the positive electrode, negative electrode, separator and alkali electrolyte, the same materials as explained above in reference to the first secondary battery can be employed.

(A Second Step)

The battery unit thus assembled is then subjected to an initial charging at a temperature of 40 to 100° C.

The initial charging may be performed while maintaining the aforementioned range of temperature from the beginning to the end. Alternatively, the initial charging may be performed at first at a temperature of the aforementioned range until the charging of aforementioned first material is finished, and thereafter the charging may be continued at a desired temperature.

The reason for limiting the range of temperature for performing the initial charging is as follows. Namely, if the temperature for the initial charging is less than 40° C., it may become difficult to sufficiently improve the utilization. On the other hand, if the temperature for the initial charging exceeds over 100° C., the productivity may be deteriorated, or the negative electrode in the battery unit and other constituent members such as a safety valve may be thermally deteriorated. More preferable range of temperature for this initial charging is 60 to 90° C.

It is possible according to the first method of manufacturing the alkaline secondary battery of this invention to effectively promote the oxidation reaction of the aforementioned first material at the occasion of the initial charging when the ratio of the electrolyte to theoretical capacity of the positive electrode is confined to the range of 0.7 to 2.0 cm$^3$/Ah. Accordingly, it is possible to sufficiently make the most of the effects to be derived from the addition of specific nickel hydroxide and of specific amount of the zinc, and at the same time to improve the over-discharge property of the battery. As a result, it is possible to manufacture an alkaline secondary battery which is extremely excellent in discharge capacity and cycle life, and capable of inhibiting the deterioration in capacity thereof that might be resulted from a storage under a high temperature environment or from a storage for a long period of time.

When the aforementioned nickel hydroxide is distributed in the positive electrode in the form of particles, and the particles are formed in such manners that the surface thereof is at least partially coated with the at least one of a first material and that the specific surface thereof is confined to 50 m$^2$/g or less, it is possible to sufficiently secure the surface of the particles that can be contacted with the alkali electrolyte even if the distribution of the electrolyte at the positive electrode is non-uniform due to the limited ratio of the electrolyte. As a result, it is possible to increase the dissolution ratio of the aforementioned particles in the alkali electrolyte, thus making it possible to improve the utilization and the over-discharge property of the secondary battery. Therefore, it is possible to manufacture an alkaline secondary battery which is extremely excellent in discharge capacity and cycle life, and capable of effectively inhibiting the deterioration in capacity thereof during the storage.

When cobalt hydroxide containing-particles which meet at least one of the conditions: 0.3 to 2.5 µm in average particle diameter, 0.4 to 1.15 g/cm$^3$ in tap density and 2.5 to 30 m$^2$/g in specific surface area are employed as the aforementioned first material, it is possible to secure a sufficient dissolution ratio of the aforementioned particles in the alkali electrolyte even if the distribution of the electrolyte at the positive electrode is non-uniform due to the limited ratio of the electrolyte. As a result, it is possible to improve the utilization and the over-discharge property of the secondary battery, thus making it possible to manufacture an alkaline secondary battery which is extremely excellent in discharge capacity and cycle life, and capable of effectively inhibiting the deterioration in capacity thereof during the storage.

(A Second Method of Manufacturing an Alkaline Secondary Battery)

Next, another manufacturing method of the alkaline secondary battery will be explained in details.

(A First Step)

First of all, an electrode group is manufactured by forming a stacked body consisting of a positive electrode, a negative electrode and a separator which is sandwiched between the positive electrode and the negative electrode. The positive electrode contains nickel hydroxide exhibiting a value of 0.8° or more in the half-width of a peak in the (101) plane thereof as measured by X-ray powder diffraction (2θ) using Cu—Kα ray, at least one of a first material selected from the group consisting of cobalt and cobalt compounds, and 4.0 to 15% by weight of at least one of a second material selected from the group consisting of zinc and zinc compounds. The weight of the at least one of a second material is one calculated as zinc element and based on the weight of the nickel hydroxide. Then, the electrode group is placed in a case, and an alkali electrolyte is charged into the case in such an amount that the ratio thereof to theoretical capacity of the positive electrode falls within the range of 0.7 to 2.0 cm$^3$/Ah. Thereafter, the case is sealed, thereby assembling a battery unit.

As for the specific materials for the positive electrode, negative electrode, separator and alkali electrolyte, the same materials as explained above in reference to the first secondary battery can be employed.

(A Second Step)

The battery unit thus assembled is then subjected to a partial charging which corresponds to 5 to 20% of the full charging.

The full charging herein means a charging which is performed until the battery unit is charged up to the theoretical capacity of the secondary battery. If a battery unit having a theoretical capacity of 1200 mAh is to be performed to the full charging, the battery unit is charged for one hour with a current of 1200 mA. A partial charging corresponding to 5% of the full charging means that the charging is effected up to a capacity corresponding to 5% of the theoretical capacity of a secondary battery. Therefore, if this partial charging is to be performed on the aforementioned battery unit having a theoretical capacity of 1200 mAh, the battery unit is charged for one hour with a current of 60 mA.

If this partial charging is not performed within the range of 5 to 20% of the full charging, the polarization may become prominent during charging or most of the first material may be converted into a conductive cobalt compound under the condition where the distribution of electrolyte at the positive electrode is non-uniform. Therefore, it may become difficult to sufficiently improve the utilization. More preferably, the battery unit should be partially charged to an extent of 10 to 15% of the full charging.

The rate of the partial charging should preferably be controlled to the range of 0.05 to 0.5 C. 1 C herein means a value of current which enables the theoretical capacity of secondary battery to be charged or discharged in one hour. Therefore, 0.05 C means a charge rate wherein the capacity of 0.05 time the theoretical capacity of secondary battery is charged taking one hour.

The reason for limiting the charge rate is as follows. If the charge rate is less than 0.05 C, the time for the charging may become too long, so that it will not only badly affect the productivity but also give rise to the problem that the product generated through the charging of the first material may become inappropriate in form. On the other hand, if the charge rate exceeds over 0.5 C, it will give rise to the generation of a competing reaction involving the charging of the first material, the charging of nickel hydroxide and the generation of oxygen, thus deteriorating the charging efficiency. More preferably range of the charge rate is 0.05 to 0.2 C.

(A Third Step)

The battery unit thus partially charged is then subjected to an aging.

The aging should preferably be performed at a temperature of 40 to 90° C.

The reason for limiting the temperature for the aging is as follows. Namely, if the temperature for the aging is less than 40° C., the solubility of the first material would be decreased, so that it may become difficult to sufficiently improve the utilization. On the other hand, even if the temperature for the aging exceeds over 90° C., the solubility of the first material would not be substantially increased, so that any substantial advantage would not be obtained. More preferable temperature for this aging is 60 to 90° C.

(A Fourth Step)

The battery unit is then subjected to a charging/discharging step.

This charging/discharging step should preferably be performed by way of full charging/discharging.

As result of these steps (1) to (4), an alkaline secondary battery is manufactured.

It is possible according to the second method of manufacturing the alkaline secondary battery of this invention to improve the utilization of the secondary battery where the ratio of the electrolyte to theoretical capacity of the positive electrode is confined to the range of 0.7 to 2.0 cm$^3$/Ah. Further, since it is possible to improve the over-discharging property of the secondary battery, any deterioration in capacity thereof that might be resulted from a storage under a high temperature environment or from a storage for a long period of time can be inhibited.

When the quantity of alkali electrolyte is relatively small, the distribution of the alkali electrolyte at the positive electrode becomes uneven, so that the polarization may become prominent at the beginning of the initial charging or the dissolution ratio of the first material in the alkali electrolyte may be reduced. As a result, the distribution of conductive cobalt compound (for example, cobalt oxyhydroxide (CoOOH)) to be formed in the positive electrode by the initial charging may become non-uniform, thus inhibiting the improvement of utilization even if a specific kind of nickel hydroxide and a specific amount of zinc element are employed. However, if a partial charging corresponding to 5 to 20% of the full charging is performed, the oxidation of the first material can be performed in two or more steps. Further, when the aging is performed after this partial charging, the distribution of the alkali electrolyte at the positive electrode can be made uniform. When the first material is subsequently converted into a conductive cobalt compound by way of charging, the polarization during this charging can be alleviated, thus making it possible to uniformly forming the conductive cobalt compound throughout the positive electrode, and at the same time to enhance the anti-reducing property of this cobalt compound. As a result, the effects to be derived by the employment of nickel hydroxide of specific half-width and by the employment of specific amount of zinc can be fully utilized, thus making it possible to improve the utilization of the secondary battery containing the aforementioned limited ratio of alkali electrolyte.

Therefore, it is possible to manufacture an alkaline secondary battery which is extremely excellent in discharge capacity and cycle life, and capable of exhibiting an excellent recovery ratio after the storage thereof.

When the aforementioned nickel hydroxide is distributed in the positive electrode in the form of particles, and the particles are formed in such manners that the surface thereof is at least partially coated with the at least one of a first material and that the specific surface thereof is confined to 50 m$^2$/g or less, it is possible to sufficiently secure the surface of the particles that can be contacted with the alkali electrolyte even if the distribution of the electrolyte at the positive electrode is non-uniform due to the limited ratio of the electrolyte. As a result, it is possible to increase the dissolution ratio of the aforementioned first materials in the alkali electrolyte, thus making it possible to improve the utilization and the over-discharge property of the secondary battery. Therefore, it is possible to manufacture an alkaline secondary battery which is extremely excellent in discharge capacity and cycle life, and capable of effectively inhibiting the deterioration in capacity thereof during the storage.

When cobalt hydroxide containing-particles which meet at least one of the conditions: 0.3 to 2.5 μm in average particle diameter, 0.4 to 1.15 g/cm$^3$ in tap density and 2.5 to 30 m$^2$/g in specific surface area are employed as the aforementioned first material, it is possible to easily dissolve the aforementioned particles in the alkali electrolyte and at the same time to effectively utilize the aging for the oxidation of the aforementioned particles, even if the ratio of the electrolyte is confined to the aforementioned range. As a result, it is possible to improve the utilization and the over-discharge property of the secondary battery, thus making it possible to manufacture an alkaline secondary battery which is extremely excellent in discharge capacity and cycle life, and capable of effectively inhibiting the deterioration in capacity thereof during the storage.

(A Second Alkaline Secondary Battery)

This second alkaline secondary battery comprises;

a positive electrode containing nickel hydroxide exhibiting a value of 0.8° or more in the half-width of a peak in the (101) plane thereof as measured by X-ray powder diffraction (2θ) using Cu—Kα ray and at least one alkali metal selected from the group consisting of cesium, rubidium and potassium;

a negative electrode;

a separator interposed between the positive electrode and the negative electrode; and an alkali electrolyte, the ratio of which to theoretical capacity of the positive electrode being 0.7 to 1.3 cm$^3$/Ah.

As for the negative electrode and the separator, the same materials as explained with reference to the aforementioned first alkaline secondary battery can be employed.

Followings are explanations on the positive electrode and the alkali electrolyte.

(1) Positive Electrode

The positive electrode contains nickel hydroxide exhibiting a value of 0.8°/2θ (Cu—Kα) or more in the half-width of a peak in the (101) plane thereof as measured by X-ray powder diffraction and at least one alkali metal selected from the group consisting of cesium (Cs), rubidium (Rb) and potassium (K). Preferably, the alkali metal contained in the positive electrode should be in a form of hydrate.

This positive electrode can be manufactured by the following method (a) or (b) explained below.

(a) A paste comprising at least one alkali metal selected from the group consisting of cesium, rubidium and potassium (they may be in the form of compound), particles containing the nickel hydroxide exhibiting the aforementioned peak half-width, a conductive material, a binder and water is prepared at first, and then the paste is filled in or coated on a conductive substrate, the resultant conductive substrate being subsequently dried and press-molded to obtain the positive electrode.

(b) First of all, the surface of the aforementioned nickel hydroxide-containing particles is at least partially covered by at least one of a first material selected from cobalt and cobalt compounds, thereby manufacturing a fourth composite particle. Then, a paste comprising at least one alkali metal selected from the group consisting of cesium, rubidium and potassium (they may be in the form of compound), the fourth composite particle, a binder and water is prepared, and then the paste is filled in or coated on a conductive substrate, the resultant conductive substrate being subsequently dried and press-molded to obtain the positive electrode.

The reason for limiting the peak half-width to the aforementioned range as measured by X-ray powder diffraction is as follows. Namely, if the half-width is less than 0.8°/2θ, the charge/discharge cycle property of an alkaline secondary battery provided with a positive electrode containing such a nickel hydroxide may be deteriorated irrespective of the presence or absence of the alkali metals or compounds thereof. Preferable range of the half-width of the nickel hydroxide is in the range of 0.9 to 1.1°/2θ.

The alkali metals or the compounds thereof may be incorporated into the positive electrode in the form of powder or an aqueous solution. As for the compounds of the alkali metal, alkali metal hydroxides are more preferable for use.

The positive electrode should preferably contain 4.0 to 15% by weight, more preferably 4.0 to 9% by weight, of at least one of a second material selected from the group consisting of zinc and zinc compounds. The weight of the at least one of a second material is one calculated as zinc element and based on the weight of the nickel hydroxide. The zinc and zinc compounds may be added to the particles containing the nickel hydroxide or to the aforementioned paste. In the particles containing the nickel hydroxide and said at least one of a second material, the nickel hydroxide and the zinc should preferably form an eutectic compound. Zinc and zinc compounds can be added to the paste in the form of particle. As for the zinc compounds, the same kinds of compound as illustrated with reference to the first alkaline secondary battery may be employed.

The nickel hydroxide containing-particles can further contain at least one of a third material selected from the group consisting of cobalt and cobalt compound. The particles should preferably contain said at least one of a third material in the range of 0.1 to 3.0% by weight based on the nickel hydroxide in view of improving the utilization of the active material in the positive electrode where the quantity of the electrolyte is relatively small. The content of said at least one of a third material is one calculated as cobalt element. The nickel hydroxide and the cobalt should preferably form an eutectic compound in the particles. Said at least one of a second material should preferably be added to the particles containing the nickel hydroxide and the cobalt in view of improving the utilization where the quantity of the electrolyte is relatively small.

The nickel hydroxide containing-particles should preferably be spherical or nearly spherical in shape.

Further, the nickel hydroxide containing-particles should preferably be 5 to 30 μm in average particle diameter and 1.8 g/cm³ or more in tap density.

Furthermore, the nickel hydroxide containing-particles should preferably have a specific surface area ranging from 3 to 25 m²/g in view of improving the utilization of the active material in the positive electrode where the quantity of the electrolyte is relatively small.

As for the conductive materials, cobalt-based particles can be employed. Namely, the cobalt-based particles can be manufactured from cobalt hydroxide, cobalt monoxide, dicobalt trioxide, etc. Among them, particles consisting mainly of cobalt hydroxide and meeting at least one of the conditions: 0.3 to 2.5 μm in average particle diameter, 0.4 to 1.15 g/cm³ in tap density and 2.5 to 30 m²/g in specific surface area are more preferable for use, in view of improving the utilization thereof when the ratio of electrolyte to the theoretical capacity is restricted to the aforementioned range. More preferable range of the average particle diameter of the particles is 0.7 to 2.2 μm. More preferable range of the tap density is 0.8 to 1.1 g/cm³. More preferable range of the specific surface area is 3 to 20 m²/g.

The cobalt hydroxide containing-particles can further contain cobalt monoxide, dicobalt trioxide.

As for the cobalt compound, cobalt hydroxide, cobalt monoxide, dicobalt trioxide, etc. may be employed.

The specific surface area of the fourth composite particle should preferably be confined to 50 m²/g or less, in view of improving the utilization thereof when the ratio of electrolyte to the theoretical capacity is restricted to the aforementioned range. The lower limit of the specific surface in this case may preferably be 3 m²/g. More preferably, this specific surface area should be confined to 3 to 25 m²/g.

The quantity of cobalt or cobalt compounds to be adhered onto the surface of the fourth composite particles should preferably be in the range of 2 to 6% by weight based on the active material. The weight of the cobalt compounds is one calculated as cobalt element. If the amount of cobalt or cobalt compounds is less than 2% by weight, a sufficient effect as a conductive agent cannot be obtained, thus deteriorating the utilization or charging efficiency of the battery. On the other hand, if the amount of cobalt or cobalt compounds exceeds over 6% by weight, the ratio of the active material per unit volume would be decreased, thus lowering the capacity density. More preferable range of the amount of cobalt or cobalt compounds is 2 to 5% by weight.

As for the binder and the conductive substrate, the same materials as illustrated with reference to the first alkaline secondary battery may be employed.

The positive electrode may contain both of the cobalt-based particles and the composite particles.

(2) Alkali Electrolyte

This alkali electrolyte is an aqueous solution of alkali metal hydroxide. As for the alkali electrolyte, an aqueous solution of alkali metal, such as pottasium hydroxide (KOH), sodium hydroxide (NaOH), lithium hydroxide (LiOH), cesium hydroxide (CsOH), rubidium hydroxide (RbOH), or a mixture thereof may be employed.

The alkali electrolyte should preferably be employed in such a manner that the ratio between the quantity of alkali electrolyte at 25° C. and the theoretical capacity of the positive electrolyte falls within the range of 0.7 to 1.3 cm³/Ah. Because, if the ratio of the quantity of electrolyte to the theoretical capacity of the positive electrode is less than 0.7 cm³/Ah, the charging capacity would be extremely deteriorated, thus making it difficult to perform the discharging. On the other hand, if the aforementioned ratio of the quantity of electrolyte to the theoretical capacity exceeds over 1.3 cm³/Ah, it would be difficult to improve the charge/discharge cycle life even if a positive electrode containing nickel hydroxide of specific half-width and the at least one alkali metal is employed. More preferable ratio of the quantity of electrolyte to the theoretical capacity is in the range of 0.85 to 1.2 cm³/Ah.

As described above, the positive electrode of the alkaline secondary battery according to this invention contains nickel hydroxide having a value of 0.8°/2θ (Cu—Kα) or more in the half-width of a peak in the (101) plane thereof as measured by X-ray powder diffraction and at least one alkali metal selected from the group consisting of cesium, rubidium and potassium. The alkaline secondary battery provided with this positive electrode is capable of inhibiting any increase in impedance resulting from the repetition of charge/discharge cycles, so that the capacity retention during charge/discharge cycles can be improved. This improvement may be attributed to the mechanism as explained below.

Namely, when the active material {β-nickel hydroxide (β-Ni(OH)$_2$)} for the positive electrode is charged, it is ordinary turned into β-nickel oxyhydroxide (β-NiOOH). This is a reversible reaction, and the reverse reaction takes place at the occasion of discharging. The following chemical formula (1) illustrates a charge/discharge reaction formula of the active material for the positive electrode.

$$\beta\text{-Ni(OH)}_2 \rightleftharpoons \beta\text{-NiOOH} + H^+ + e^- \qquad (1)$$

However, if the quantity of electrolyte in the positive electrode is insufficient or if the filling density of the active material in the positive electrode is not uniform, electric current tends to concentrate locally to a portion of the positive electrode, whereby locally causing the charge reaction to proceed further, thus forming γ-nickel oxyhydroxide (γ-NiOOH), which is a high-order oxide. The reaction involving γ-NiOOH is suggested by H. Bode et al as shown below.

(Schematic diagram of Bode et al)

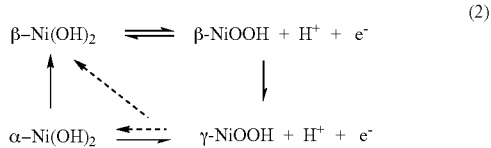

$$(2)$$

This γ-NiOOH is formed of a somewhat distorted crystal lattice (a large crystal lattice) as compared with β-NiOOH, and at the same time, tends to cause discharging to take place at a relatively low electric potential and hence is not easily discharged as compared with β-NiOOH. Accordingly, when this γ-NiOOH is generated in the positive electrode, the positive electrode is caused to swell, so that unbalance in the electrolyte is generated not only in the positive electrode but also in the secondary battery, thus increasing the inner impedance and making it impossible to charge the battery. Furthermore, since the operating voltage is decreased, the amount of energy that can be utilized by a machine mounted with such a battery would be decreased even if the battery is fully charged, i.e. the practical capacity would be decreased.

However, when one or more kinds of alkali metal selected from cesium, rubidium and pottasium are included in the positive electrode in a form of alkali metal hydrate (pottasium hydroxide, cesium hydroxide and rubidium hydroxide) as proposed by this invention, the positive electrode is provided with ions of alkali metal having a low viscosity and a high conductivity. At the same time, the water in the electrolyte is actively pulled by the positive electrode due to an osmotic pressure produced by a difference in concentration between the alkali metal hydrate in the positive electrode and the alkali metal hydrate in the alkali electrolyte. As a result, the distribution of electrolyte in the positive electrode would be uniform, and at the same time an alkaline secondary battery provided with this positive electrode would exhibit an improved operating voltage.

Therefore, it is possible, with the alkaline secondary battery provided with this positive electrode according to this invention, to make the distribution of electrolyte uniform immediately after the accomplishment of the battery, and to assure a stable charge/discharge cycle, whereby inhibiting the generation of γ-NiOOH. As a result, it is now possible with this secondary battery to inhibit the increase of impedance resulting from the repetition of charge/discharge cycles and to improve the capacity retention during the charge/discharge cycles.

In particular, when any of the aforementioned alkali metals are incorporated into the positive electrode of the alkaline secondary battery where the ratio of the quantity of alkali electrolyte (25° C.) to the theoretical capacity is limited to the range of 0.7 to 1.3 cm$^3$/Ah, any increase of impedance resulting from the repetition of charge/discharge cycles can be effectively inhibited. It is possible to prominently improve the capacity retention during the charge/discharge cycles of the battery.

It is possible, with the employment of the positive electrode of the secondary battery wherein 4.0 to 15% by weight of at least one material selected from zinc and zinc compounds is incorporated into the positive electrode, to improve the utilization and cycle life of the secondary battery.

When the aforementioned nickel hydroxide is distributed in the positive electrode in the form of particles, and the particles are formed in such manners that the surface thereof is at least partially coated with at least one material selected from cobalt and cobalt compounds and that the specific surface thereof is confined to 50 m$^2$/g or less, it is possible to improve the utilization, thus improving the charge/discharge cycle life. At the same time, it is possible to improve the over-discharge property of the secondary battery and to improve the capacity recovery factor after a storage under a high temperature environment or after a storage of long period of time.

When cobalt hydroxide containing-particles which meet at least one of the conditions: 0.3 to 2.5 μm in average particle diameter, 0.4 to 1.15 g/cm$^3$ in tap density and 2.5 to 30 m$^2$/g in specific surface area are added to the positive electrode, it is possible to improve the utilization of the secondary battery, thus prominently improving the charge/discharge cycle life. At the same time, it is possible to improve the over-discharge property of the secondary battery and to improve the capacity recovery factor after a storage under a high temperature environment or after a storage of long period of time.

When 4.0 to 15% by weight of at least one material selected from zinc and zinc compounds is incorporated into the positive electrode, and at the same time, when the aforementioned nickel hydroxide is distributed in the positive electrode in the form of particles, and the particles are formed in such manners that the surface thereof is at least partially coated with at least one material selected from cobalt and cobalt compounds and that the specific surface thereof is confined to 50 m$^2$/g or less, it is possible to further improve the utilization of the secondary battery, thus improving the charge/discharge cycle life. At the same time, it is possible to improve the over-discharge property of the secondary battery and to improve the capacity recovery factor after a storage under a high temperature environment or after a storage of long period of time.

When 4.0 to 15% by weight of at least one material selected from zinc and zinc compounds is incorporated into the positive electrode, and at the same time, when cobalt hydroxide containing-particles which meet at least one of the conditions: 0.3 to 2.5 μm in average particle diameter, 0.4 to 1.15 g/cm$^3$ in tap density and 2.5 to 30 m$^2$/g in specific surface area are added to the positive electrode, it is possible to further improve the utilization of the secondary battery, thus prominently improving the charge/discharge cycle life. At the same time, it is possible to improve the over-discharge property of the secondary battery and to improve the capacity recovery factor after a storage under a high temperature environment or after a storage of long period of time.

(A Third Method of Manufacturing an Alkaline Secondary Battery)

(A First Step)

A battery unit comprising (a) a positive electrode containing nickel hydroxide exhibiting a value of 0.8° or more in the half-width of a peak in the (101) plane thereof as measured by X-ray powder diffraction (2θ) using Cu—Kα ray, at least one alkali metal selected from cesium, rubidium and potassium, and at least one of a first material selected from cobalt and cobalt compounds; (b) a negative electrode; (c) a separator which is sandwiched between the positive electrode and the negative electrode; and (d) an alkali electrolyte, the ratio of which to theoretical capacity of the positive electrode falling within the range of 0.7 to 1.3 $cm^3$/Ah.

As for the specific materials for the positive electrode, negative electrode, separator and alkali electrolyte, the same materials as explained above in reference to the second secondary battery can be employed.

(A Second Step)

The battery unit thus assembled is then subjected to an initial charging at a temperature of 40 to 100° C.

The initial charging may be performed while maintaining the aforementioned range of temperature from the beginning to the end. Alternatively, the initial charging may be performed at first at a temperature of the aforementioned range until the charging of aforementioned material is finished, and thereafter the charging may be continued at a desired temperature.

The reason for limiting the range of temperature for performing the initial charging is as follows. Namely, if the temperature for the initial charging is less than 40° C., it may become difficult to sufficiently improve the utilization. On the other hand, if the temperature for the initial charging exceeds over 100° C., the productivity may be deteriorated, or the negative electrode in the battery unit and other constituent members such as a safety valve may be thermally deteriorated. More preferable range of temperature for this initial charging is 60 to 90° C.

It is possible according to this third method of manufacturing the alkaline secondary battery of this invention to effectively promote the oxidation reaction of the aforementioned first material at the occasion of the initial charging when the ratio of the electrolyte to theoretical capacity of the positive electrode is confined to the range of 0.7 to 1.3 $cm^3$/Ah. Accordingly, it is possible to sufficiently make the most of the effects to be derived from the addition of specific nickel hydroxide and of specific kinds of alkali metal, and at the same time to improve the over-discharge property of the battery. It is also possible according to this secondary battery to assure an excellent large current-discharging property. The mechanism for this property may be explained as follows.

Namely, when the initial charging is performed at a temperature of as high as 100° C. under the condition where the ratio of the electrolyte to the theoretical capacity is confined to the aforementioned range, the oxidation reaction of the aforementioned first material would be promoted to produce a conductive cobalt compound of optimum form in the positive electrode. However, there is a problem that the cations in the alkali electrolyte may be entrapped in this cobalt compound, thus decreasing the quantity of cations in the electrolyte, thus deteriorating the large current-discharging property of the battery. Whereas, when at least one kind of alkali metal selected from cesium, rubidium and pottasium is included in the positive electrode, cations can be supplemented to the electrolyte where cations are reduced due to the formation of the conductive cobalt compound as mentioned above, thus making it possible to maintain the excellent large current-discharging property.

As a result, it is possible to manufacture an alkaline secondary battery which is extremely excellent in discharge capacity, cycle life, storage property and large current-discharging property.

When the aforementioned nickel hydroxide is distributed in the positive electrode in the form of particles, and the particles are formed in such manners that the surface thereof is at least partially coated with at least one material selected from cobalt and cobalt compounds and that the specific surface thereof is confined to 50 $m^2$/g or less, it is possible to sufficiently secure the surface of the particles that can be contacted with the alkali electrolyte even if the distribution of the electrolyte at the positive electrode is uneven due to the limited ratio of the electrolyte. As a result, it is possible to increase the dissolution ratio of the aforementioned particles in the alkali electrolyte, thus making it possible to improve the utilization and the over-discharge property of the secondary battery. Therefore, it is possible to manufacture an alkaline secondary battery which is extremely excellent in discharge capacity and cycle life, capable of effectively inhibiting the deterioration in capacity thereof during the storage, and excellent in large current-discharging property.

When cobalt hydroxide containing-particles which meet at least one of the conditions: 0.3 to 2.5 μm in average particle diameter, 0.4 to 1.15 $g/cm^3$ in tap density and 2.5 to 30 $m^2$/g in specific surface area are employed as the aforementioned first material to be included in the positive electrode, it is possible to secure a sufficient dissolution ratio of the aforementioned particles in the alkali electrolyte even if the distribution of the electrolyte at the positive electrode is uneven due to the limited ratio of the electrolyte. As a result, it is possible to improve the utilization and the over-discharge property of the secondary battery, thus making it possible to manufacture an alkaline secondary battery which is extremely excellent in discharge capacity and cycle life, capable of effectively inhibiting the deterioration in capacity thereof during the storage, and excellent in large current-discharging property.

It is possible, by the addition of 4.0 to 15% by weight of at least one of a second material selected from zinc and zinc compounds to the positive electrode, to improve the utilization and cycle life of the secondary battery, while assuring an excellent large current-discharging property and over-discharging property of the battery. It is also possible, by the co-use of composite particles having a specific surface area as mentioned above or of specific cobalt hydroxide containing-particles as mentioned above, to further improve the utilization and over-discharging property, while assuring an excellent large current-discharging property of the battery.

(A Fourth Method of Manufacturing an Alkaline Secondary Battery)

Next, another manufacturing method of the alkaline secondary battery will be explained in details.

(A First Step)

A battery unit comprising (a) a positive electrode containing nickel hydroxide exhibiting a value of 0.8° or more in the half-width of a peak in the (101) plane thereof as measured by X-ray powder diffraction (2θ) using Cu—Kα ray, at least one alkali metal selected from cesium, rubidium and potassium, and at least one of a first material selected from cobalt and cobalt compounds; (b) a negative electrode; (c) a separator which is sandwiched between the positive electrode and the negative electrode; and (d) an alkali electrolyte, the ratio of which to theoretical capacity of the positive electrode falling within the range of 0.7 to 1.3 cm³/Ah.

As for the specific materials for the positive electrode, negative electrode, separator and alkali electrolyte, the same materials as explained above in reference to the second secondary battery can be employed.

(A Second Step)

The battery unit thus assembled is then subjected to a partial charging which corresponds to 5 to 20% of the full charging.

If this partial charging is not performed within the range of 5 to 20% of the full charging, the polarization may become prominent during charging or most of the first material may be converted into a conductive cobalt compound under the condition where the distribution of electrolyte at the positive electrode is non-uniform. Therefore, it may become difficult to sufficiently improve the utilization. More preferably, the battery unit should be partially charged to an extent of 10 to 15% of the full charging.

The rate of the partial charging should preferably be controlled to the range of 0.05 to 0.5 C.

The reason for limiting the charge rate is as follows. If the charge rate is less than 0.05 C, the time for the charging may become too long, so that it will not only badly affect the productivity but also give rise to the problem that the product generated through the charging of the first material may become inappropriate in form. On the other hand, if the charge rate exceeds over 0.5 C, it will give rise to the generation of a competing reaction involving the charging of the aforementioned first material, the charging of nickel hydroxide and the generation of oxygen, thus deteriorating the charging efficiency. More preferably range of the charge rate is 0.05 to 0.2 C.

(A Third Step)

The battery unit thus partially charged is then subjected to an aging.

The aging should preferably be performed at a temperature of 40 to 90° C. The reason for limiting the temperature for the aging is as follows. Namely, if the temperature for the aging is less than 40° C., the solubility of the first material would be decreased, so that it may become difficult to sufficiently improve the utilization. On the other hand, even if the temperature for the aging exceeds over 90° C., the solubility of the first material would not be substantially increased, so that any substantial advantage would not be obtained. More preferable temperature for this aging is 60 to 90° C.

(A Fourth Step)

The battery unit is then subjected to a charging/discharging step.

This charging/discharging step should preferably be performed by way of full charging/discharging.

As result of these steps (1) to (4), an alkaline secondary battery is manufactured.

It is possible according to the fourth method of manufacturing the alkaline secondary battery of this invention to improve the utilization of the secondary battery where the ratio of the electrolyte to theoretical capacity of the positive electrode is confined to the range of 0.7 to 1.3 cm³/Ah. Further, since it is possible to improve the over-discharging property of the secondary battery, any deterioration in capacity thereof that might be resulted from a storage under a high temperature environment or from a storage for a long period of time can be inhibited. It is also possible according to this secondary battery to assure an excellent large current-discharging property. The mechanism for this property may be explained as follows.

Namely, when the partial charging and the aging are performed under the condition where the ratio of the electrolyte to the theoretical capacity is confined to the aforementioned range, a conductive cobalt compound of optimum form would produced in the positive electrode according to the same mechanism as described above. However, there is a problem that the cations in the alkali electrolyte may be entrapped in this cobalt compound, thus decreasing the quantity of cations in the electrolyte. Whereas, when at least one kind of alkali metal selected from cesium, rubidium and pottasium is included in the positive electrode, cations can be supplemented to the electrolyte, thus making it possible to maintain the excellent large current-discharging property.

As a result, it is possible to manufacture an alkaline secondary battery which is extremely excellent in discharge capacity, cycle life, storage property and large current-discharging property.

When the aforementioned nickel hydroxide is distributed in the positive electrode in the form of particles, and the particles are formed in such manners that the surface thereof is at least partially coated with at least one of a first material selected from cobalt and cobalt compounds and that the specific surface thereof is confined to 50 m²/g or less, it is possible to sufficiently secure the surface of the particles that can be contacted with the alkali electrolyte even if the distribution of the electrolyte at the positive electrode is uneven due to the limited ratio of the electrolyte. As a result, it is possible to increase the dissolution ratio of the aforementioned first material in the alkali electrolyte, thus making it possible to improve the utilization and the over-discharge property of the secondary battery. Therefore, it is possible to manufacture an alkaline secondary battery which is extremely excellent in discharge capacity and cycle life, capable of effectively inhibiting the deterioration in capacity thereof during the storage, and excellent in large current-discharging property.

When cobalt hydroxide containing-particles which meet at least one of the conditions: 0.3 to 2.5 µm in average particle diameter, 0.4 to 1.15 g/cm³ in tap density and 2.5 to 30 m²/g in specific surface area are employed as the aforementioned first material to be included in the positive electrode, it is possible to secure a sufficient dissolution ratio of the aforementioned particles in the alkali electrolyte and at the same time to effectively utilize the aging for the oxidation of the aforementioned particles, even if the ratio of the electrolyte is confined to the aforementioned range. As a result, it is possible to improve the utilization and the over-discharge property of the secondary battery, thus making it possible to manufacture an alkaline secondary battery which is extremely excellent in discharge capacity and cycle life, capable of effectively inhibiting the deterioration in capacity thereof during the storage, and excellent in large current-discharging property.

It is possible, by the addition of 4.0 to 15% by weight of at least one of a second material selected from zinc and zinc compounds to the positive electrode, to improve the utilization and cycle life of the secondary battery, while assuring an excellent large current-discharging property and over-discharging property of the battery. It is also possible, by the co-use of composite particles having a specific surface area as mentioned above or of specific cobalt hydroxide containing-particles as mentioned above, to further improve the utilization and over-discharging property, while assuring an excellent large current-discharging property of the battery.

(A Third Alkaline Secondary Battery)

This third alkaline secondary battery comprises;

a positive electrode containing particles containing nickel oxide, and a conductive layer formed at least partially on the surfaces of the particles, the conductive layer containing cobalt compounds and having a conductive surface region on which free electrons function as an electric charge carrier;

a negative electrode;

a separator interposed between the positive electrode and the negative electrode; and an alkali electrolyte.

As for the negative electrode and the separator, the same materials as explained with reference to the aforementioned first alkaline secondary battery can be employed.

Followings are explanations on the positive electrode and the alkali electrolyte.

(1) Positive Electrode

The positive electrode contains a conductive substrate; (i) particles containing nickel oxide and carried by the substrate; (ii) a conductive layer containing cobalt compounds and formed at least partially on the surface of the particles; (iii) and a conductive region on which free electrons function as an electric charge carrier, the conductive region formed at least partially on the surface of the conductive layer. Preferably, the surface of the conductive layer should not be entirely covered by the conductive region. Because if the surface of the conductive layer is entirely covered by the conductive region consisting for instance of nickel, the passing of electrolyte into or out of the particles would become difficult.

As for the nickel oxide, nickel hydroxide may be employed.

As for the cobalt compounds, cobalt oxyhydroxide (CoOOH) for instance may be employed.

The conductive region can be formed by making use of a metal which is excellent in conductivity and resistive to alkali, or a metal which is covered by a metal having an excellent conductivity and an excellent resistance to alkali. One specific example of the former is nickel, and one specific example of the latter is metal plated with nickel.

As for the conductive substrate, the materials as explained with reference to the aforementioned first alkaline secondary battery can be employed.

The particles having the aforementioned features can be manufactured by the methods set forth below.

Figure 2:
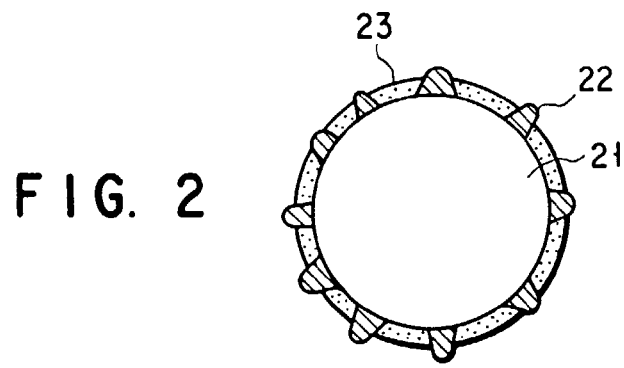
FIG. 2 is a cross-sectional view of a composite nickel hydroxide to be included in a positive electrode of an alkaline secondary battery of this invention.

Namely, particles containing nickel hydroxide and fine metallic particles having a smaller particle diameter than the first mentioned particles are mixed together whereby allowing the metallic particles to adhere onto the surfaces of the first mentioned particles. The resultant particles are then dipped in a solution of cobalt hydroxide and left to stand. Subsequently, the particles are taken up from the solution of cobalt hydroxide and allowed to dry, without removing the alkali attached to the surfaces of the particles, in the air at a temperature of 80 to 100° C., whereby obtaining composite particles having a structure shown for instance in FIG. 2. As shown in FIG. 2, metallic fine particles 22 functioning as a conductive region are attached to the surface of a particle 21 containing nickel hydroxide. A conductive layer 23 containing cobalt oxyhydroxide is formed on the surface of the particle 21. The thickness of the conductive layer 23 is set so as to allow the metallic fine particles 22 to protrude from the conductive layer 23. However, it is also possible to set the thickness of the conductive layer 23 to such that the metallic fine particles 22 are exposed at the same level as that of the conductive layer 23.

The particles containing the nickel hydroxide should preferably be 5 to 30 µm in average particle diameter, 1.8 g/cm$^3$ or more in tap density and 3 to 25 m$^2$/g in specific surface area. Furthermore, the nickel hydroxide containing-particles should preferably be spherical or nearly spherical in shape.

As for the metallic fine particles, nickel fine particles or metallic fine particles (for example, iron particles) having a nickel plating can be employed.

In the preparation of the positive electrode, a paste comprising the particles having the aforementioned features, a binder and water is prepared at first, then the paste is filled in or coated on a conductive substrate, and the resultant conductive substrate is allowed dried and press-molded to obtain the positive electrode.

As for the binder, the same materials as explained above with reference to the first alkaline secondary battery can be employed.

(2) Alkali Electrolyte

As for the alkali electrolyte, an aqueous solution of sodium hydroxide (NaOH), lithium hydroxide (LiOH) or pottasium hydroxide (KOH); a mixed solution of NaOH and LiOH; a mixed solution of KOH and LiOH; or a mixed solution of (KOH), (NaOH) and (LiOH) may be employed.

As explained above, the alkaline secondary battery according to this invention is provided with a positive electrode containing particles containing nickel oxide, and a conductive layer formed at least partially on the surfaces of the particles, the conductive layer containing cobalt compounds and having a conductive surface region on which free electrons function as an electric charge carrier. The positive electrode is capable of enhancing the conduction between nickel oxide materials constituting an active material so that the utilization can be improved. As a result, the alkaline secondary battery provided with this positive electrode is capable of improving the discharge capacity and large current-discharging property. The reason for achieving a high utilization of the active material in this positive electrode may be ascribed to the following mechanism.

Namely, it is assumed that the mechanism of electrical conduction of the conductive cobalt compound such as cobalt oxyhydroxide is not effected by a free electron as in the case of metal. In the case of metal, when metallic particles are contacted with each other, the electron clouds of the particle are overlapped with each other thereby forming a conduction path, thus ensuring a conduction. Whereas, in the case of the conductive cobalt compound such as cobalt oxyhydroxide, it is impossible to smoothly transfer electrons from one particle to the other particle by merely contacting the particles. Namely, it is impossible to sufficiently ensure the conduction through the contact between the particles. As a matter of fact, it is impossible to obtain a sufficient discharge capacity even with an alkaline secondary battery wherein the positive electrode thereof is produced by a process wherein nickel hydroxide containing-particles coated on their surfaces with a cobalt oxyhydroxide layer are kneaded together with a binder in the presence of water to prepare a paste, which is then filled into a conductive substrate. On the other hand, when a cobalt oxyhydroxide layer is formed on the surfaces of the nickel hydroxide containing-particles by means of the initial charging, it is possible to allow electrons to easily move within the cobalt oxyhydroxide layer thus ensuring the conduction between the active materials. The reason for this may be explained by the phenomenon that, due to the initial charging, the nickel hydroxide containing-particle disposed closer to the conductive substrate is first covered with a cobalt oxyhydroxide layer, and then the remaining nickel hydroxide containing-particles are successively covered with the cobalt oxyhydroxide layer in the order the closeness thereof to the substrate, i.e. the cobalt oxyhydroxide grows in a mesh-like manner starting from the substrate. Whereas, when the cobalt oxyhydroxide layer is formed in advance on the surfaces of the nickel hydroxide containing-particles as mentioned above, the adhesion between the cobalt oxyhydroxide layers or the adhesion between the cobalt oxyhydroxide layer and the substrate may become insufficient, thus deteriorating the utilization.

When a conductive surface region on which free electrons could function as an electric charge carrier is formed at least partially on the surface of the conductive layer as suggested by this invention, the movement of the electrons inside the conductive layer becomes easier, whereby ensuring the conduction between the particles through a contact between the conductive layers. As a result, it possible to improve the utilization.

Furthermore, it is possible according to the alkaline secondary battery to inhibit the deterioration of the utilization of the active material that might be resulted from a storage of long period of time or from a storage under a high temperature environment. The main cause of the deterioration of the utilization due to a storage under the conditions mentioned above may be ascribed to the phenomenon that the reduction of the cobalt oxyhydroxide is brought about by the progress of self-discharge, thereby losing the conductivity thereof and rendering the conduction between the active materials difficult to take place. The cobalt oxyhydroxide thus reduced can be converted again to cobalt oxyhydroxide by a re-charging after storage.

However, according to this invention, since the conductive layer is capable of maintaining a condition where the electrons can be easily moved even after the storage under the aforementioned conditions, it is possible by the re-charging to allow the conductive layer to regenerate and hence to realize a high utilization.

Moreover, since the conductive layer is not produced by the initial charging in this secondary battery, the capacity of the negative electrode can be decreased, and the capacity of the positive electrode can be increased correspondingly, thereby increasing the capacity of the secondary battery. Namely, if this conductive layer is produced by the initial charging, the capacity of the negative electrode charged by the initial charging cannot be utilized for discharging. Because, if this negative electrode is allowed to discharge, the cobalt compound of the layer may be reduced, thus deteriorating the utilization. Therefore, if the utilization is desired to be maintained, the extra capacity of the negative electrode can be utilized for the formation of the conductive layer. The capacity of the negative electrode which cannot be utilized for discharging is generally called a discharge reserve. Therefore, if this conductive layer is no more required to be produced at the initial charging as in the case of this invention, the discharge reserve can be minimized, whereby making it possible to decrease the capacity of the negative electrode and hence to correspondingly increase the capacity of the positive electrode. Because of this, it is possible, according to the alkaline secondary battery of this invention, to further improve the discharge capacity.

(A Fifth Method of Manufacturing an Alkaline Secondary Battery)

Next, a fifth method of manufacturing an alkaline secondary battery will be explained in details.

(1) First of all, an electrode group consisting of a positive electrode, a negative electrode and a separator which is sandwiched between the positive electrode and the negative electrode is prepared. Then, the electrode group is placed in a case, an alkali electrolyte is charged into the case, and the case is sealed, thereby assembling a battery unit.

As for the specific materials for the negative electrode and separator, the same materials as explained above in reference to the first secondary battery can be employed. As for the electrolyte, the same materials as explained above in reference to the third secondary battery can be employed.

With respect to the positive electrode, any one of the following positive electrodes, i.e. a fist positive electrode, a second positive electrode and a third positive electrode can be employed.

(A First Positive Electrode)

This positive electrode can be manufactured by the following method. Namely, a slurry comprising particles containing nickel hydroxide, particles having an average particle diameter of 0.3 to 2.5 µm and consisting mainly of cobalt hydroxide and a binder is prepared at first in the presence of a solvent (for example, water), and then the slurry is filled in a conductive substrate, dried and press-molded to obtain the positive electrode.

In view of improving the charging/discharging efficiency of the alkaline secondary battery, the nickel hydroxide should preferably exhibit a value of $0.8°/2\theta$ (Cu—K$\alpha$) or more, more preferably 0.9 to $1.1°/2\theta$ (Cu—K$\alpha$) in the half-width of a peak in the (101) plane thereof as measured by X-ray powder diffraction.

As for the binder and the conductive substrate, the same materials as illustrated with reference to the first alkaline secondary battery may be employed.

If the average particle diameter of the particles containing the cobalt hydroxide falls outside the aforementioned range, it may become difficult to uniformly disperse the cobalt hydroxide in relative to the nickel hydroxide, thus making it difficult to improve the utilization of the positive electrode and to inhibit the lowering of capacity resulting from an over-discharging. More preferably, the average particle diameter should be in the range of 0.7 to 2.2 µm.

In view of enhancing the contacting area of the particles comprising cobalt hydroxide to the particles containing nickel hydroxide, the tap density should preferably be limited to 0.4 to 1.15 g/cm$^3$, or otherwise, the specific surface area should preferably be limited to 2.5 to 30 m$^2$/g. It is also preferable to concurrently limit both tap density and specific surface area to the aforementioned ranges.

The cobalt hydroxide containing-particles can further contain cobalt monoxide, dicobalt trioxide.

(A Second Positive Electrode)

This positive electrode can be manufactured by the following method. Namely, a slurry comprising particles containing nickel hydroxide, particles consisting mainly of cobalt hydroxide and exhibiting a tap density of 0.4 to 1.15 g/cm$^3$, and a binder is prepared at first in the presence of a solvent, and then the slurry is filled in a conductive substrate, dried and press-molded to obtain the positive electrode.

The particles containing nickel hydroxide may be the same as explained in the above first positive electrode.

As for the binder and the conductive substrate, the same materials as illustrated with reference to the first alkaline secondary battery may be employed.

If the tap density of the particles containing the cobalt hydroxide falls outside the aforementioned range, the contacting area between the particles containing the cobalt hydroxide and the particles containing nickel hydroxide becomes too small, so that it may be difficult to improve the utilization of the positive electrode and to inhibit the lowering of capacity resulting from an over-discharging. More preferably, the tap density should be in the range of 0.8 to 1.1 g/cm$^3$.

In view of improving the dispersion of the particles comprising cobalt hydroxide in relative to the particles containing nickel hydroxide, the average particle diameter should preferably be limited to the range of 0.3 to 2.5 μm.

In view of enhancing the contacting area of the particles comprising cobalt hydroxide to the particles containing nickel hydroxide, the specific surface area as measured by means of BET method should preferably be limited to 2.5 to 30 m$^2$/g.

The cobalt hydroxide containing-particles can further contain cobalt monoxide, dicobalt trioxide.

(A Third Positive Electrode)

This positive electrode can be manufactured by the following method. Namely, a slurry comprising particles containing nickel hydroxide, particles consisting mainly of cobalt hydroxide and having a specific surface area ranging from 2.5 to 30 m$^2$/g as measured by means of BET method, and a binder is prepared at first in the presence of a solvent, and then the slurry is filled in a conductive substrate, dried and press-molded to obtain the positive electrode.

The particles containing nickel hydroxide may be the same as explained in the above first positive electrode.

As for the binder and the conductive substrate, the same materials as illustrated with reference to the first alkaline secondary battery may be employed.

If the specific surface area of the particles containing the cobalt hydroxide falls outside the aforementioned range, the contacting area between the particles containing the cobalt hydroxide and the particles containing nickel hydroxide becomes too small, so that it may be difficult to improve the utilization of the positive electrode and to inhibit the lowering of capacity resulting from an over-discharging. More preferably, the specific surface area should be in the range of 3 to 20 m$^2$/g.

In view of improving the dispersion of the particles comprising cobalt hydroxide in relative to the particles containing nickel hydroxide, the average particle diameter should preferably be limited to the range of 0.3 to 2.5 μm.

In view of enhancing the contacting area of the particles comprising cobalt hydroxide to the particles containing nickel hydroxide, the tap density should preferably be limited to 0.4 to 1.15 g/cm$^3$.

The cobalt hydroxide containing-particles can further contain cobalt monoxide, dicobalt trioxide.

(2) The battery unit thus assembled is then subjected to a partial charging which corresponds to 5 to 20% of the full charging.

If this partial charging performed is less than 5% of the full charging, it may become difficult to sufficiently improve the utilization and over-discharging property. If this partial charging performed is more than 20% of the full charging, the cobalt hydroxide would be completely charged so that it may become difficult to expect the effect of oxidation by the subsequent aging. More preferably, the battery unit should be partially charged to an extent of 10 to 15% of the full charging.

The rate of the partial charging should preferably be controlled to the range of 0.05 to 0.5 C.

The reason for limiting the charge rate is as follows. If the charge rate is less than 0.05 C, the time for the charging may become too long, so that it will not only badly affect the productivity but also give rise to the problem that the product generated through the charging of the cobalt hydroxide containing-particles may become inappropriate in form. On the other hand, if the charge rate exceeds over 0.5 C, it will give rise to the generation of a competing reaction involving the charging of the aforementioned particles, the charging of nickel hydroxide and the generation of oxygen, thus deteriorating the charging efficiency. More preferably range of the charge rate is 0.05 to 0.2 C.

(3) The battery unit thus partially charged is then subjected to an aging.

The aging should preferably be performed at a temperature of 40 to 90° C. The reason for limiting the temperature for the aging is as follows. Namely, if the temperature for the aging is less than 40° C., the solubility of the cobalt hydroxide containing-particles would become insufficient, so that it may become difficult to sufficiently produce the cobalt oxyhydroxide to be functioned as a conductive agent. On the other hand, even if the temperature for the aging exceeds over 90° C., the solubility of the cobalt hydroxide containing-particles would not be substantially increased, so that any substantial advantage would not be obtained. More preferable temperature for this aging is 60 to 90° C.

(4) The battery unit is then subjected to a charging/discharging step.

This charging/discharging step should preferably be performed by way of full charging/discharging.

As result of these steps (1) to (4), an alkaline secondary battery is manufactured.

The positive electrode for the alkaline secondary battery of this invention contains particles containing nickel hydroxide and the particles containing nickel hydroxide and having a tap density of 0.4 to 1.15 g/cm$^3$. It is possible with this cobalt hydroxide particles to enhance the contacting area thereof to the nickel hydroxide particles. Accordingly, if the battery is assembled together with this positive electrode, the conductive matrix could be sufficiently contacted with the surface of the nickel hydroxide particles in the positive electrode. It is possible to provide an alkaline secondary battery which is featured in that the utilization of the active material of the positive electrode would be improved, and in that any deterioration of capacity resulting from a storage of a long period of time or a high temperature environment would be inhibited.

As described above, the method of manufacturing an alkaline secondary battery according to this invention comprises the steps of; assembling a battery unit comprising a positive electrode which contains first particles containing nickel hydroxide and second particles containing cobalt hydroxide, the second particles having features which meet at least one condition selected from conditions which are specified in terms of average particle diameter, tap density and specific surface area; subjecting the battery unit to a partial charging which is 5 to 20% of the full charging of the battery unit; and subjecting the battery unit to an aging. According to this method, it is possible to improve the utilization of nickel hydroxide active material, and at the same time to improve the capacity recovery factor after an over-discharging resulting from a storage of a long period of time or under a high temperature environment. The mechanism which enables the aforementioned effects to realize by this manufacturing method may be explained as follows.

Namely, since the cobalt hydroxide is relatively low in solubility at room temperature and not so reactive as compared with the cobalt oxide, when the battery unit is subjected to the aforementioned partial charging, only part of the second particles is converted into a conductive cobalt compound such as cobalt oxyhydroxide by the partial charging, thus forming a conductive cobalt compound layer on only a portion of the first particles. At the same time, the first particles can be partially or entirely converted into nickel oxyhydroxide.

When this battery unit is subsequently subjected to an aging, the nickel oxyhydroxide existing on the surface of the first particles attracts unoxidized bivalent cobalt compound, whereby giving rise to a redox reaction between the nickel oxyhydroxide and the cobalt compound. As a result, the nickel oxyhydroxide is converted into nickel hydroxide, and at the same time, a high-order (i.e. more activated) cobalt compound layer is formed on the surface of first particles. Since this cobalt compound layer is formed via the redox reaction with the nickel oxyhydroxide, the adhesivity of the cobalt compound layer to the surface of the first particles is extremely high and at the same time, this cobalt compound layer is uniformly dispersed throughout the first particles. Moreover, since this conductive matrix is formed via the redox reaction, it can be hardly reduced even if the secondary battery is left for a long period of time or left under a high temperature environment.

Therefore, it is now possible, with the formation of the conductive matrix in the positive electrode by the aforementioned method, to improve the utilization of the nickel hydroxide active material and at the same time, to inhibit the deterioration of capacity resulting from a storage of long period of time or high temperature environment.

Further, when the temperature of the aging is the range of 40 to 90° C. (more preferably, 60 to 90° C.) in the aforementioned method, the solubility of the cobalt hydroxide in an alkali electrolyte can be enhanced. So that the distribution of the high-order cobalt compound layer on the surface of the first particles can be made more uniform. At the same time, it is possible to further enhance the adhesion between the first particles and the high-order cobalt compound layer. As a result, it is possible to prominently improve the utilization and the capacity recovery factor after being left unused.

(A Sixth Method of Manufacturing an Alkaline Secondary Battery)

Next, a sixth method of manufacturing an alkaline secondary battery will be explained in details.

(A First Step)

First of all, an electrode group consisting of; a positive electrode which contains an active material containing nickel hydroxide, and not more than 6% by weight of at least one of a first material selected from cobalt and cobalt compounds. The weight of the at least one of a first material is one calculated as cobalt element and based on the weight of the active material; a negative electrode; and a separator which is sandwiched between the positive electrode and the negative electrode is prepared. Then, the electrode group and an alkali electrolyte are placed in a case and then the case is sealed, thereby assembling a battery unit.

As for the specific materials for the negative electrode and separator, the same materials as explained above in reference to the first secondary battery can be employed. As for the electrolyte, the same materials as explained above in reference to the third secondary battery can be employed.

Next, this positive electrode will be further explained below. This positive electrode can be manufactured by the following methods (a) and (b).

(a) First of all, particles containing nickel hydroxide as an active material are mixed with cobalt-based particles, a binder and water to obtain a mixture, which is then kneaded to prepare a paste. Then, the paste is filled in a conductive substrate, dried and press-molded to obtain the positive electrode.

(b) First of all, at least a portion of the surface of particles containing nickel hydroxide is covered by a layer consisting of said at least one of a first material, thereby manufacturing a composite particle. Then, a paste comprising this composite particle, a binder and water is prepared, and then the paste is filled in a conductive substrate. Finally, the resultant conductive substrate is dried and press-molded to obtain the positive electrode.

The positive electrode may contain both of the cobalt-based particles and the composite particles.

As for the particles containing nickel hydroxide, a nickel hydroxide particles, or a composite nickel hydroxide particles where zinc and/or cobalt and the nickel hydroxide form an eutectic compound may be employed. It is possible, with the employment of the positive electrode containing the aforementioned composite nickel hydroxide particles, to further improve the charging efficiency under a high temperature condition.

In view of improving the charging/discharging efficiency of the alkaline secondary battery, the nickel hydroxide should preferably have a value of 0.8°/2θ (Cu—Kα) or more, more preferably 0.9 to 1.1°/2θ (Cu—Kα) in the half-width of a peak in the (101) plane thereof as measured by X-ray powder diffraction.

As for the cobalt-based particles, it can be manufactured from cobalt hydroxide, cobalt monoxide, dicobalt trioxide, etc. Among them, particles consisting mainly of cobalt hydroxide and meeting at least one of the conditions: 0.3 to 2.5 μm in average particle diameter, 0.4 to 1.15 g/cm³ in tap density and 2.5 to 30 m²/g in specific surface area are more preferable for use.

As for the cobalt compound for forming the aforementioned covering layer, dicobalt trioxide ($Co_2O_3$), cobalt monoxide (CoO), cobalt hydroxide {$Co(OH)_2$} may be employed. These cobalt compounds can be used individually or in combination of two or more kinds.

The reason for limiting the weight of the at least one of a first material is as follows.

The smaller the weight of the at least one of a first material in the positive electrode is, the more increased improvement in recovering time of voltage can be expected at the initial stage of recharging after being left for a long period of time. Thus, if the weight of the at least one of a first material is more than 6% by weight, the aforementioned improvement in recovering time of voltage can be hardly obtained. However, if the weight of the at least one of a first material is too little, the utilization at the initial stage of the positive electrode would be deteriorated, thus decreasing the discharge capacity at the initial stage of charge/discharge cycle. Therefore, the weight of the at least one of a first material should preferably be at least 1% by weight. More preferable weight of the first material is 1 to 5% by weight.

The specific surface area of the composite particle should preferably be confined to 50 m²/g or less. The lower limit of the specific surface in this case should preferably be 3 m²/g. More preferably, this specific surface area should be confined to 3 to 25 m²/g.

As for the binder and the conductive substrate, the same materials as illustrated with reference to the first alkaline secondary battery may be employed.

(A Second Step)

The battery unit thus assembled is then subjected to an initial charging at a temperature of 40 to 100° C.

The initial charging may be performed while maintaining the aforementioned range of temperature from the beginning to the end. Alternatively, the initial charging may be performed at first at a temperature of the aforementioned range until the charging of aforementioned first material is finished, and thereafter the charging may be continued at a desired temperature.

If the temperature for the initial charging falls outside the aforementioned range, it may become difficult, particularly when the quantity of the first material to be charged is relatively little, to uniformly form the conductive matrix (conductive mesh) in the positive electrode, thus deteriorating the utilization at the initial stage of the positive electrode. Moreover, it may be difficult to enhance the anti-reducing property of the conductive matrix, to inhibit the lowering of voltage when the battery is left unused, and to effectively shorten the time for recovering the voltage up to an aimed degree. More preferable temperature for the initial charging is in the range of 60 to 90° C.

As explained above, since a conductive matrix can be uniformly formed throughout the positive electrode according to the sixth method of manufacturing an alkaline secondary battery of this invention even if the content of the at least one of a first material is as little as 1% by weight, it is possible to assure a high utilization of the secondary battery. Further, since it is possible according to this secondary battery to improve the start-up property in voltage at the occasion of re-charging the battery after being left for a long period of time or under a high temperature condition, this secondary battery can be quickly charged even after it has been left unused. The mechanism which enable the quick charging property to be improved at the occasion of re-charging the battery after being left unused may be explained as follows.

Namely, the cause for the phenomenon of the decrease in voltage of the alkaline secondary battery after being left for a long period of time or under a high temperature condition may be ascribed to the self-discharge of the secondary battery and also to the vanishment of conductivity of high-conductive cobalt oxyhydroxide (CoOOH) constituting the conductive matrix resulting from the reduction thereof. The cobalt oxyhydroxide thus reduced can be converted again when it is re-charged after being left unused. As a result, a charged voltage by this re-oxidation reaction can be obtained. When the re-charging is continued, a charged voltage by the oxidation reaction of nickel hydroxide can be obtained, thus recovering the battery voltage. If the weight of the at least one of a first material added to the positive electrode is relatively large, the quantity of the cobalt oxyhydroxide that can be produced by the initial charging would become large. However, the quantity of the cobalt oxyhydroxide that will be reduced when the secondary battery is left unused would become also large, thus taking a lot of charging time for the regeneration of cobalt oxyhydroxide, i.e. taking a lot of time for recovering the voltage up to the aimed degree. As a result, the secondary battery may be erroneously determined as being abnormal in the voltage test in the quick charging, i.e. the quick charging is no more possible in such a secondary battery.

In this invention however, the weight of the at least one of a first material to be added to the positive electrode is limited to 6% or less, so that the quantity of the cobalt oxyhydroxide that will be reduced when the secondary battery is left unused would be minimized, thus making it possible to shorten the reaction time for the re-oxidation and to quickly recover the voltage up to the aimed degree in the re-charging of the secondary battery. As a result, it is possible according to this invention to perform the quick charging even after the secondary battery is left unused.

Further, when the temperature of the initial charging is confined to the range of 40 to 100° C., it is possible to render the reaction of producing a conductive cobalt compound such as cobalt oxyhydroxide to take place uniformly throughout the positive electrode even if the weight of the at least one of a first material is relatively small. So that an alkaline secondary battery can be assured of high utilization and high discharge capacity. Furthermore, since the cobalt oxyhydroxide which has been produced through the aforementioned initial charging is hardly reduced even if it is left unused for a long period of time or under a high temperature condition, the lowering of voltage due to the aforementioned unused conditions can be inhibited. As a result, it is possible to shorten the time required for the re-oxidation reaction at the occasion of re-charging the secondary battery after being left unused.

The aforementioned second and third alkaline secondary batteries as well as the first to sixth method for manufacturing the alkaline secondary battery can be applied not only to a cylindrical alkaline secondary battery provided with a bottomed cylindrical case as shown in FIG. 1, but also to a rectangular alkaline secondary battery provided with a bottomed rectangular box-like case.

EXAMPLE 1

<Preparation of Positive Electrode>

First of all, particles consisting of an eutectic compound formed by nickel hydroxide, cobalt and zinc were prepared. The nickel hydroxide exhibited a value of 1.0° in the half-width of a peak in the (101) plane thereof as measured by X-ray powder diffraction (2θ) using Cu—Kα ray. The weight of the cobalt in the particles was 1% by weight based on the nickel hydroxide. The weight of the zinc in the particles was 4% by weight of zinc based on the nickel hydroxide. The particles thus obtained were spherical in shape, 10 μm in average particle diameter, 2.2 g/cm³ in tap density, and 10.0 m²/g in specific surface area.

The aforementioned half-width was determined by obtaining a diffraction diagram of X-ray powder diffraction (2θ) by means of an X-ray powder diffraction analyzer (Cu—Kα ray tube) (trade name: XD-3A; Shimazu Seisakusho Co., Ltd.) and then by measuring the half-width of the peak near 38.7° corresponding to the (101) plane in the diffraction diagram. The average particle diameter was determined by measuring the particle size distribution of the particles by means of laser method and then by determining a value from 50% of the accumulation. The tap density was determined by making use of a tap denser (trade name: Seishin tap denser, KYT-3000; Seishin Co., Ltd.), wherein the nickel hydroxide particles were charged into a vessel having capacity of 20 cm³, and then, tapping was repeated 200 times. The specific surface area was determined by means of nitrogen BET method.

Then, 91% by weight of the particles was mixed with 5% by weight of cobalt monoxide particles and 4% by weight of binders consisting of carboxymethyl cellulose and PTFE (polytetrafluoroethylene) to obtain a mixture, to which pure water was further added and the resultant mixture was kneaded to prepare a paste. Then, this paste was filled in a nickel-plated porous metallic substrate having a porosity of 96% and an average pore size of 200 μm. Then, after being dried, the porous substrate was press-molded to manufacture a nickel positive electrode having a theoretical capacity of 2600 mAh.

<Preparation of a Negative Electrode>

Mm (misch metal: a mixture of rare earth elements) which was available in the market, Ni, Co, Mn and Al were weighed so as to make the ratios of these components adjusted to 4.0:0.4:0.3:0.3 (weight ratio). Thereafter, these components were mixed together and melted in a high frequency furnace to obtain a melt, which was then cooled to obtain an alloy ingot having a composition of MmNi$_{4.0}$Co$_{0.4}$Mn$_{0.3}$Al$_{0.3}$. This alloy ingot was then pulverized by a mechanical means and sieved to obtain a hydrogen-absorbing alloy powder having a particle diameter of 50 μm or less. Then, 97% by weight of the hydrogen-absorbing alloy powder was mixed with 3% by weight of binders consisting of carboxymethyl cellulose, and PTFE (polytetrafluoroethylene), carbon and water thereby preparing a paste. This paste was coated on the surface of a punched metal, and after being dried, press-molded to form a negative electrode having a theoretical capacity 1.6 times higher than that of the positive electrode.

A separator formed of polypropylene nonwoven fabric treated hydrophilic was disposed between the negative electrode and the positive electrode, and the resultant composite was spirally wound to prepare an electrode group. This electrode group was housed in a metallic case together with an alkali electrolyte having a composition of 5 mol/L pottasium hydroxide, 0.5 mol/L lithium hydroxide and 2.5 mol/L sodium hydroxide, the quantity of the alkali electrolyte being adjusted such that the ratio of the alkali electrolyte to the theoretical capacity of the positive electrode at 25° C. became 0.8 cm$^3$/Ah. Thereafter, constituent members such as a metallic cap were assembled to obtain a battery unit having a structure shown in FIG. 1 and a size of 4/3A.

EXAMPLE 2

A battery unit was assembled following the same procedures as explained in Example 1, except that ratio of the alkali electrolyte to the theoretical capacity at 25° C. became 1.0 cm$^3$/Ah.

EXAMPLE 3

A battery unit was assembled following the same procedures as explained in Example 1, except that ratio of the alkali electrolyte to the theoretical capacity at 25° C. became 1.5 cm$^3$/Ah.

EXAMPLE 4

A battery unit was assembled following the same procedures as explained in Example 1, except that ratio of the alkali electrolyte to the theoretical capacity at 25° C. became 2.0 cm$^3$/Ah.

Comparative Example 1

A battery unit was assembled following the same procedures as explained in Example 1, except that ratio of the alkali electrolyte to the theoretical capacity at 25° C. became 0.5 cm$^3$/Ah.

EXAMPLE 5

A battery unit was assembled following the same procedures as explained in Example 1, except that the positive electrode was constructed as explained below.

<Preparation of Positive Electrode>

First of all, particles consisting of an eutectic compound formed by nickel hydroxide, cobalt and zinc were prepared. The nickel hydroxide exhibited a value of 1.0° in the half-width of a peak in the (101) plane thereof as measured by X-ray powder diffraction (Cu—Kα, 2θ). The weight of the cobalt in the particles was 1% by weight based on the nickel hydroxide. The weight of the zinc in the particles 8% by weight based on the nickel hydroxide. The particles thus obtained were spherical in shape, 10 μm in average particle diameter, 2.2 g/cm$^3$ in tap density, and 10.0 m$^2$/g in specific surface area.

Then, 91% by weight of the particles was mixed with 5% by weight of cobalt monoxide particles and 4% by weight of binders consisting of carboxymethyl cellulose and PTFE to obtain a mixture, to which pure water was further added and the resultant mixture was kneaded to prepare a paste. Then, this paste was filled in a nickel-plated porous metallic substrate of the same kind as employed in Example 1. Then, after being dried, the porous substrate was press-molded to manufacture a nickel positive electrode having a theoretical capacity of 2600 mAh.

EXAMPLE 6

A battery unit was assembled following the same procedures as explained in Example 5, except that ratio of the alkali electrolyte at to the theoretical capacity 25° C. became 1.0 cm$^3$/Ah.

EXAMPLE 7

A battery unit was assembled following the same procedures as explained in Example 5, except that ratio of the alkali electrolyte to the theoretical capacity at 25° C. became 1.5 cm$^3$/Ah.

EXAMPLE 8

A battery unit was assembled following the same procedures as explained in Example 5, except that ratio of the alkali electrolyte to the theoretical capacity at 25° C. became 2.0 cm$^3$/Ah.

Comparative Example 2

A battery unit was assembled following the same procedures as explained in Example 5, except that ratio of the alkali electrolyte to the theoretical capacity at 25° C. became 0.5 cm$^3$/Ah.

EXAMPLE 9

A battery unit was assembled following the same procedures as explained in Example 1, except that the positive electrode was constructed as explained below.

<Preparation of Positive Electrode>

First of all, particles consisting of an eutectic compound formed by nickel hydroxide, cobalt and zinc were prepared. The nickel hydroxide exhibited a value of 1.0° in the half-width of a peak in the (101) plane thereof as measured by X-ray powder diffraction (Cu—Kα, 2θ). The weight of the cobalt in the particles was 1% by weight based on the nickel hydroxide. The weight of the zinc in the particles was 12% by weight based on the nickel hydroxide. The particles thus obtained were spherical in shape, 10 μm in average particle diameter, 2.2 g/cm$^3$ in tap density, and 10.0 m$^2$/g in specific surface area.

Then, 91% by weight of the particles was mixed with 5% by weight of cobalt monoxide particles and 4% by weight of binders consisting of carboxymethyl cellulose and PTFE to obtain a mixture, to which pure water was further added and the resultant mixture was kneaded to prepare a paste. Then, this paste was filled in a nickel-plated porous metallic substrate of the same kind as employed in Example 1. Then, after being dried, the porous substrate was press-molded to manufacture a nickel positive electrode having a theoretical capacity of 2600 mAh.

EXAMPLE 10

A battery unit was assembled following the same procedures as explained in Example 9, except that ratio of the alkali electrolyte to the theoretical capacity at 25° C. became 1.0 cm$^3$/Ah.

EXAMPLE 11

A battery unit was assembled following the same procedures as explained in Example 9, except that ratio of the alkali electrolyte to the theoretical capacity at 25° C. became 1.5 cm$^3$/Ah.

EXAMPLE 12

A battery unit was assembled following the same procedures as explained in Example 9, except that ratio of the alkali electrolyte to the theoretical capacity at 25° C. became 2.0 cm$^3$/Ah.

Comparative Example 3

A battery unit was assembled following the same procedures as explained in Example 9, except that ratio of the alkali electrolyte to the theoretical capacity at 25° C. became 0.5 cm$^3$/Ah.

Comparative Example 4

A battery unit was assembled following the same procedures as explained in Example 1, except that the positive electrode was constructed as explained below.

<Preparation of Positive Electrode>

First of all, particles consisting of an eutectic compound formed by nickel hydroxide and cobalt were prepared. The nickel hydroxide exhibited a value of 1.0° in the half-width of a peak in the (101) plane thereof as measured by X-ray powder diffraction (Cu—Kα, 2θ). The weight of the cobalt in the particles was 1% by weight based on the nickel hydroxide. The particles thus obtained were spherical in shape, 10 μm in average particle diameter, 2.2 g/cm$^3$ in tap density, and 10.0 m$^2$/g in specific surface area.

Then, 91% by weight of the particles was mixed with 5% by weight of cobalt monoxide particles and 4% by weight of binders consisting of carboxymethyl cellulose and PTFE to obtain a mixture, to which pure water was further added and the resultant mixture was kneaded to prepare a paste. Then, this paste was filled in a nickel-plated porous metallic substrate of the same kind as employed in Example 1. Then, after being dried, the porous substrate was press-molded to manufacture a nickel positive electrode having a theoretical capacity of 2600 mAh.

Comparative Example 5

A battery unit was assembled following the same procedures as explained in Comparative Example 4, except that ratio of the alkali electrolyte to the theoretical capacity at 25° C. became 1.0 cm$^3$/Ah.

Comparative Example 6

A battery unit was assembled following the same procedures as explained in Comparative Example 4, except that ratio of the alkali electrolyte to the theoretical capacity at 25° C. became 1.5 cm$^3$/Ah.

Comparative Example 7

A battery unit was assembled following the same procedures as explained in Comparative Example 4, except that ratio of the alkali electrolyte to the theoretical capacity at 25° C. became 2.0 cm$^3$/Ah.

Comparative Example 8

A battery unit was assembled following the same procedures as explained in Comparative Example 4, except that ratio of the alkali electrolyte to the theoretical capacity at 25° C. became 0.5 cm$^3$/Ah.

Each of the battery units obtained from Examples 1 to 12 and Comparative Examples 1 to 8 was subjected an aging for 15 hours at a temperature of 25° C., charged for 15 hours with an electric quantity of 0.1 CmA, and, after a 30 minute cut-off, discharged with an electric quantity of 1.0 CmA until the battery voltage was decreased down to 1.0V thereby performing the initial charging to prepare a cylindrical nickel hydrogen secondary battery.

Each of the battery obtained from Examples 1 to 12 and Comparative Examples 1 to 8 was charged to a depth of 150% with 1.0 CmA at a temperature of 25° C., and then discharged with 0.2 CmA until the voltage was lowered down to 1.0V. The utilization (discharge capacity/theoretical capacity) was measured from the discharge capacity obtained from the above experiment, the results being shown in FIG. 3 wherein the relationships among the content of zinc in a positive electrode, the ratio of electrolyte and the utilization of active materials for the positive electrode are illustrated.

Figure 3:
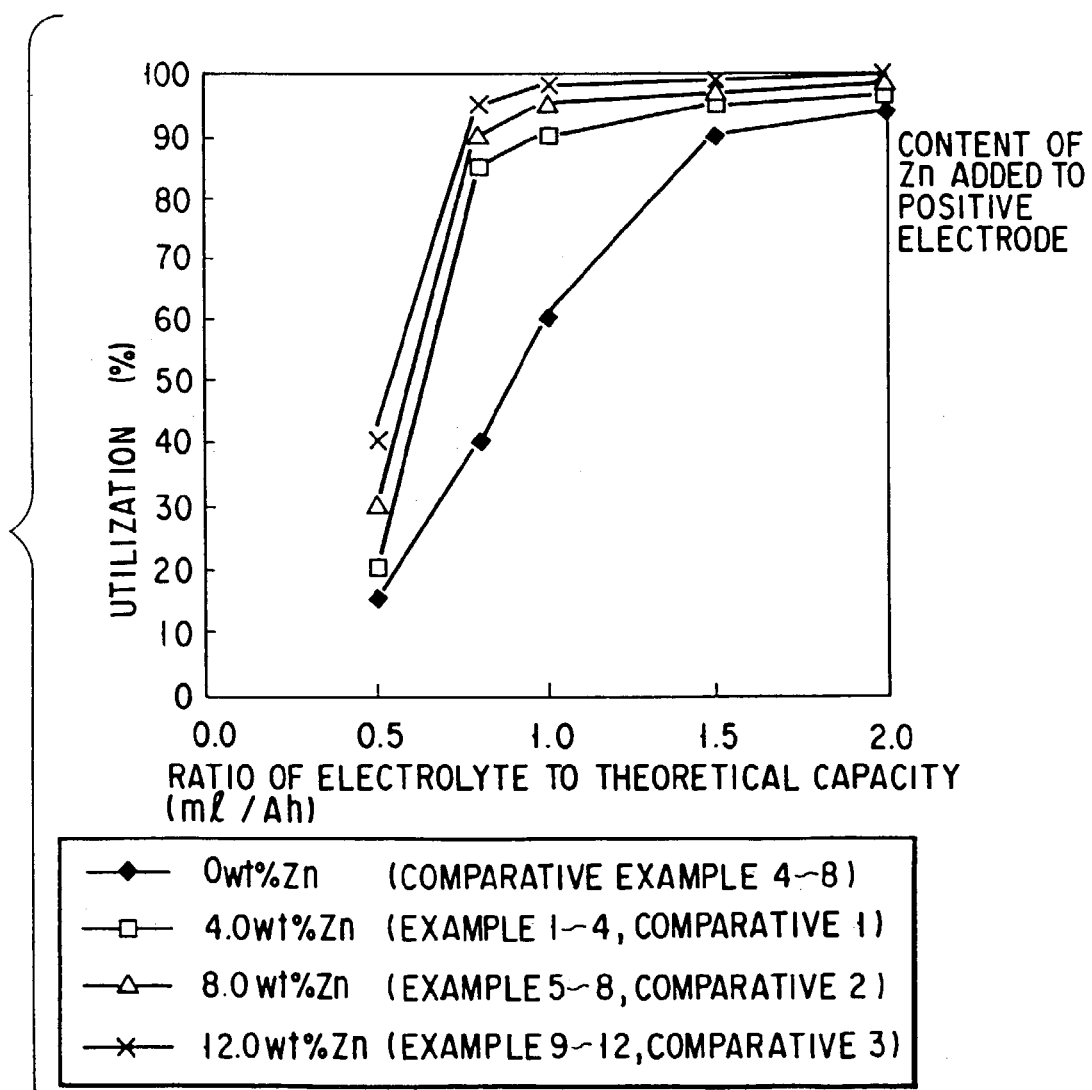
FIG. 3 is a graph showing the relationship among the content of zinc in a positive electrode, the ratio of electrolyte at 25° C. and the utilization in the secondary batteries of Examples 1 to 12 and of Comparative Examples 1 to 8.

As apparent from FIG. 3, the secondary batteries of Examples 1 to 12 which were provided with a positive electrode containing nickel hydroxide having a value of 0.8° or more in the half-width of a peak in the (101) plane thereof as measured by X-ray powder diffraction (Cu—Kα, 2θ) and 4.0 to 15% by weight of zinc; and with an alkali electrolyte whose ratio to theoretical capacity of the positive electrode being 0.7 to 2.0 cm$^3$/Ah were high in utilization of the active material for the positive electrode as compared with those of Comparative Examples 1 to 8. In particular, it will be seen that in the region where the ratio of the electrolyte is relatively low, the presence of zinc gives great influence to the difference of the utilization. It will be seen further that when the ratio of the electrolyte is decreased down to 0.5 cm$^3$/Ah, it will lead to a prominent decrease in the utilization.

The secondary batteries obtained from Example 5 and Comparative Example 4 were subjected to the aforementioned initial charging and then charged to a depth of 150% with 1.0 CmA at a temperature of 25° C., and discharged with 0.2 CmA until the voltage was lowered down to 1.0V to measure the change in battery voltage, the results being shown in FIG. 4.

As shown in FIG. 4, the operating voltage of the secondary battery obtained from Example 5 is higher than that of the secondary battery obtained from Comparative Example 4, suggesting that when the secondary battery is provided with an electrolyte in a ratio falling within the aforementioned range, the addition of predetermined amount of zinc to the positive electrode is effective in inhibiting or avoiding the deterioration of operating voltage, and hence improving the utilization.

EXAMPLE 13

A battery unit as illustrated in Example 1 was assembled following the same procedures as explained in Example 1, except that the positive electrode was constructed as explained below.

<Preparation of Positive Electrode>

First of all, spherical particles consisting of an eutectic compound formed by nickel hydroxide, cobalt and zinc were prepared. The nickel hydroxide exhibited a value of 0.8° in the half-width of a peak in the (101) plane thereof as measured by X-ray powder diffraction (Cu—K$\alpha$, 2$\theta$). The weight of the cobalt in the particles was 1% by weight based on the nickel hydroxide. The weight of the zinc in the particles was 8% by weight based on the nickel hydroxide. The particles thus obtained were spherical in shape, 10 μm in average particle diameter, 2.2 g/cm$^3$ in tap density, and 10.0 m$^2$/g in specific surface area.

Then, 91% by weight of the particles was mixed with 5% by weight of cobalt monoxide particles and 4% by weight of binders consisting of carboxymethyl cellulose and PTFE to obtain a mixture, to which pure water was further added and the resultant mixture was kneaded to prepare a paste. Then, this paste was filled in a nickel-plated porous metallic substrate of the same kind as employed in Example 1. Then, after being dried, the porous substrate was press-molded to manufacture a nickel positive electrode having a theoretical capacity of 2600 mAh.

Comparative Example 9

A battery unit was assembled following the same procedures as explained in Example 13, except that a nickel hydroxide exhibiting a value of 0.6° in the half-width of a peak in the (101) plane thereof as measured by X-ray powder diffraction (Cu—K$\alpha$, 2$\theta$) was employed.

The battery units obtained from Example 13 and Comparative Example 9 were subjected to an aging for 15 hours at a temperature of 25° C., charged for 15 hours with an electric quantity of 0.1 CmA, and, after a 30 minute cut-off, discharged with an electric quantity of 1.0 CmA until the battery voltage was decreased down to 1.0V thereby performing the initial charging to prepare a cylindrical nickel hydrogen secondary battery.

The battery units obtained from Example 13 and Comparative Example 9 were charged to a depth of 150% with 1.0 CmA at a temperature of 25° C., and then discharged with 0.2 CmA until the voltage was lowered down to 1.0V. The utilization (discharge capacity/theoretical capacity) was measured from the discharge capacity obtained from the above experiment, the results being shown in FIG. 5 wherein the relationships relationship between the half-width of a peak in the (101) plane and the utilization of the active material are illustrated. FIG. 5 also shows the utilization of the active material in Example 7.

As apparent from FIG. 5, the secondary batteries of Examples 7 and 13 indicated a higher utilization as compared with that of Comparative Example 9.

This can be ascribed to the fact that the nickel hydroxide exhibiting a value of 0.8° or more in the half-width of a peak in the (101) plane as measured by X-ray powder diffraction (Cu—K$\alpha$, 2$\theta$) was employed in each of Examples 7 and 13.

EXAMPLE 13-1

A battery unit was assembled following the same procedures as explained in Example 1, except that the positive electrode was constructed as explained below.

<Preparation of Positive Electrode>

First of all, particles consisting of an eutectic compound formed by nickel hydroxide, cobalt and zinc were prepared. The nickel hydroxide exhibited a value of 1.0° in the half-width of a peak in the (101) plane thereof as measured by X-ray powder diffraction (Cu—K$\alpha$, 2$\theta$). The weight of the cobalt in the particles was 1% by weight based on the nickel hydroxide. The weight of the zinc in the particles was 4% by weight based on the nickel hydroxide. The particles thus obtained were spherical in shape, 10 μm in average particle diameter, 2.2 g/cm$^3$ in tap density, and 60 m$^2$/g in specific surface area.

Then, 91% by weight of the particles was mixed with 5% by weight of cobalt monoxide particles and 4% by weight of binders consisting of carboxymethyl cellulose and PTFE to obtain a mixture, to which pure water was further added and the resultant mixture was kneaded to prepare a paste. Then, this paste was filled in a nickel-plated porous metallic substrate of the same kind as employed in Example 1. Then, after being dried, the porous substrate was press-molded to manufacture a nickel positive electrode having a theoretical capacity of 2600 mAh.

This battery unit was then subjected to the initial charging in the same manner as explained in Example 1 to prepare a cylindrical nickel hydrogen secondary battery.

Then, the utilization of this battery obtained from Example 13-1 was calculated in the same manner as in the cases of Example 1. The utilization was 70%.

EXAMPLE 14

<Preparation of Positive Electrode>

91% by weight of the nickel hydroxide containing-particles of the same kind as employed in Example 1 was mixed with 5% by weight of cobalt hydroxide particles (4.5 μm in average particle diameter, 1.2 g/cm$^3$ in tap density, and 2.4 m$^2$/g in specific surface area) and 4% by weight of binders (carboxymethyl cellulose and PTFE (polytetrafluoroethylene)) to obtain a mixture, to which pure water was further added and the resultant mixture was kneaded to prepare a paste. Then, this paste was filled in a nickel-plated porous metallic substrate of the same structure as illustrated in Example 1. Then, after being dried, the porous substrate was press-molded to manufacture a nickel positive electrode having a theoretical capacity of 2600 mAh.

Then, a battery unit was assembled in the same manner as illustrated in Example 1 except that the positive electrode prepared as described above was employed.

This battery unit was then subjected an aging for 15 hours at a temperature of 25° C., charged for 15 hours with an electric quantity of 0.1 CmA at 75° C., and, after a 30 minute cut-off, discharged with an electric quantity of 0.5 CmA until the battery voltage was decreased down to 1.0V thereby performing the initial charging to prepare a cylindrical nickel hydrogen secondary battery.

EXAMPLE 15

The battery unit was assembled in the same manner as illustrated in Example 14 was subjected an aging for 15 hours at a temperature of 25° C., charged for 15 hours with an electric quantity of 0.1 CmA at 25° C., and, after a 30 minute cut-off, discharged with an electric quantity of 1.0 CmA until the battery voltage was decreased down to 1.0V thereby performing the initial charging to prepare a cylindrical nickel hydrogen secondary battery.

EXAMPLE 16

<Preparation of Positive Electrode>

91% by weight of the nickel hydroxide containing-particles of the same kind as employed in Example 1 was mixed with 5% by weight of cobalt hydroxide particles (1.5 μm in average particle diameter, 1.2 g/cm$^3$ in tap density, and 2.4 m$^2$/g in specific surface area) and 4% by weight of binders (carboxymethyl cellulose and PTFE (polytetrafluoroethylene)) to obtain a mixture, to which pure water was further added and the resultant mixture was kneaded to prepare a paste. Then, this paste was filled in a nickel-plated porous metallic substrate of the same structure as illustrated in Example 1. Then, after being dried, the porous substrate was press-molded to manufacture a nickel positive electrode having a theoretical capacity of 2600 mAh.

Then, a battery unit was assembled in the same manner as illustrated in Example 1 except that the positive electrode prepared as described above was employed.

This battery unit was then subjected to the initial charging in the same manner as explained in Example 14 to prepare a cylindrical nickel hydrogen secondary battery.

EXAMPLE 17

<Preparation of Positive Electrode>

91% by weight of the nickel hydroxide particles of the same kind as employed in Example 1 was mixed with 5% by weight of cobalt hydroxide particles (4.5 μm in average particle diameter, 1.0 g/cm$^3$ in tap density, and 2.4 m$^2$/g in specific surface area) and 4% by weight of binders (carboxymethyl cellulose and PTFE (polytetrafluoroethylene)) to obtain a mixture, to which pure water was further added and the resultant mixture was kneaded to prepare a paste. Then, this paste was filled in a nickel-plated porous metallic substrate of the same structure as illustrated in Example 1. Then, after being dried, the porous substrate was press-molded to manufacture a nickel positive electrode having a theoretical capacity of 2600 mAh.

Then, a battery unit was assembled in the same manner as illustrated in Example 1 except that the positive electrode prepared as described above was employed.

This battery unit was then subjected to the initial charging in the same manner as explained in Example 14 to prepare a cylindrical nickel hydrogen secondary battery.

EXAMPLE 18

<Preparation of Positive Electrode>

91% by weight of the nickel hydroxide particles of the same kind as employed in Example 1 was mixed with 5% by weight of cobalt hydroxide particles (4.5 μm in average particle diameter, 1.2 g/cm$^3$ in tap density, and 10 m$^2$/g in specific surface area) and 4% by weight of binders (carboxymethyl cellulose and PTFE (polytetrafluoroethylene)) to obtain a mixture, to which pure water was further added and the resultant mixture was kneaded to prepare a paste. Then, this paste was filled in a nickel-plated porous metallic substrate of the same structure as illustrated in Example 1. Then, after being dried, the porous substrate was press-molded to manufacture a nickel positive electrode having a theoretical capacity of 2600 mAh.

Then, a battery unit was assembled in the same manner as illustrated in Example 1 except that the positive electrode prepared as described above was employed.

This battery unit was then subjected to the initial charging in the same manner as explained in Example 14 to prepare a cylindrical nickel hydrogen secondary battery.

EXAMPLE 19

A cobalt hydroxide layer was formed on the surface of the nickel hydroxide containing-particles of the same kind as explained in Example 1 to prepare composite particles having a specific surface area of 15 m$^2$/g. The weight of the cobalt hydroxide layer was 5% by weight based on the nickel hydroxide containing-particles. The weight was calculated as cobalt element.

Then, 96% by weight of the composite particles was mixed with 4% by weight of binders (carboxymethyl cellulose and PTFE (polytetrafluoroethylene)) to obtain a mixture, to which pure water was further added and the resultant mixture was kneaded to prepare a paste. Then, this paste was filled in a nickel-plated porous metallic substrate of the same structure as illustrated in Example 1. Then, after being dried, the porous substrate was press-molded to manufacture a nickel positive electrode having a theoretical capacity of 2600 mAh.

Then, a battery unit was assembled in the same manner as illustrated in Example 1 except that the positive electrode prepared as described above was employed.

This battery unit was then subjected to the initial charging in the same manner as explained in Example 14 to prepare a cylindrical nickel hydrogen secondary battery.

The secondary batteries obtained from Examples 14 to 19 were charged to a depth of 150% with 1.0 CmA at a temperature of 25° C., and then discharged with 0.2 CmA until the voltage was lowered down to 1.0V. The utilization was measured from the discharge capacity obtained from the above experiment, the results being shown in the following Table 1.

The secondary batteries obtained from Examples 14 to 19 were charged for 16 hours with an electric quantity of 0.1 CmA, and then discharged with an electric quantity of 1.0 CmA until the terminal voltage was decreased down to 1.0V thereby to measure the initial capacity from the discharge retention time. These secondary batteries were then stored for one month at a temperature of 65° C. Thereafter, these secondary batteries were charged again for 16 hours with an electric quantity of 0.1 CmA, and then discharged with an electric quantity of 1.0 CmA until the terminal voltage was decreased down to 1.0V. This charge/discharge cycle was repeated 3 times, and the discharge capacity at end of the third cycle was measured to determine the recovery capacity thereof. In this case, the recovery ratio R(%) was calculated according to the following formula, the result being shown in the following Table 1.

$$R(\%)=(C_1/C_0)\times 100 \quad (1)$$

wherein $C_0$ denotes the initial capacity (mAh) and $C_1$ represents the recovery capacity (mAh).

TABLE 1

| | Physical properties of Co(OH)$_2$ | | | | | |
|---|---|---|---|---|---|---|
| | Average particles size (μm) | Tap density (g/cm$^3$) | Specific surface area (m$^2$/g) | Initial charging method | Utilization (%) | Recovery ratio (%) |
| Example 14 | 4.5 | 1.2 | 2.4 | High temperature initial charging | 94 | 99 |
| Example 15 | 4.5 | 1.2 | 2.4 | Normal temperature initial charging | 75 | 99 |
| Example 16 | 1.5 | 1.2 | 2.4 | High temperature initial charging | 97 | 100 |
| Example 17 | 4.5 | 1.0 | 2.4 | High temperature initial charging | 97 | 100 |
| Example 18 | 4.5 | 1.2 | 10 | High temperature initial charging | 97 | 100 |
| Example 19 | Composite particle | | | High temperature initial charging | 97 | 100 |

It is clear from the comparison between Example 14 and Example 15 shown in Table 1 that when the initial charging is performed at a temperature of 40 to 100° C., the utilization would be improved. It is also clear from the comparison between Example 14 and Examples 16 to 19 that when the particles consisting mainly of cobalt hydroxide meet at least one of the conditions: 0.3 to 2.5 μm in average particle diameter, 0.4 to 1.15 g/cm$^3$ in tap density and 2.5 to 30 m$^2$/g in specific surface area, or when the composite particles have a specific surface area of 50 m$^2$/g or less, and added to the positive electrode, the utilization and the recovery ratio can be improved.

EXAMPLE 20

91% by weight of the nickel hydroxide containing-particles of the same kind as employed in Example 1 was mixed with 5% by weight of cobalt hydroxide particles (4.5 μm in average particle diameter, 1.2 g/cm$^3$ in tap density, and 2.4 m$^2$/g in specific surface area) and 4% by weight of binders (carboxymethyl cellulose and PTFE (polytetrafluoroethylene)) to obtain a mixture, to which pure water was further added and the resultant mixture was kneaded to prepare a paste. Then, this paste was filled in a nickel-plated porous metallic substrate of the same structure as illustrated in Example 1. Then, after being dried, the porous substrate was press-molded to manufacture a nickel positive electrode having a theoretical capacity of 2600 mAh.

Then, a battery unit was assembled in the same manner as illustrated in Example 1 except that the positive electrode prepared as described above was employed.

EXAMPLE 21

<Preparation of Positive Electrode>

91% by weight of the nickel hydroxide containing-particles of the same kind as employed in Example 1 was mixed with 5% by weight of cobalt hydroxide particles (1.5 μm in average particle diameter, 1.2 g/cm$^3$ in tap density, and 2.4 m$^2$/g in specific surface area) and 4% by weight of binders (carboxymethyl cellulose and PTFE (polytetrafluoroethylene)) to obtain a mixture, to which pure water was further added and the resultant mixture was kneaded to prepare a paste. Then, this paste was filled in a nickel-plated porous metallic substrate of the same structure as illustrated in Example 1. Then, after being dried, the porous substrate was press-molded to manufacture a nickel positive electrode having a theoretical capacity of 2600 mAh.

Then, a battery unit was assembled in the same manner as illustrated in Example 1 except that the positive electrode prepared as described above was employed.

EXAMPLE 22

<Preparation of Positive Electrode>

91% by weight of the nickel hydroxide containing-particles of the same kind as employed in Example 1 was mixed with 5% by weight of cobalt hydroxide particles (4.5 μm in average particle diameter, 1.0 g/cm$^3$ in tap density, and 2.4 m$^2$/g in specific surface area) and 4% by weight of binders (carboxymethyl cellulose and PTFE (polytetrafluoroethylene)) to obtain a mixture, to which pure water was further added and the resultant mixture was kneaded to prepare a paste. Then, this paste was filled in a nickel-plated porous metallic substrate of the same structure as illustrated in Example 1. Then, after being dried, the porous substrate was press-molded to manufacture a nickel positive electrode having a theoretical capacity of 2600 mAh.

Then, a battery unit was assembled in the same manner as illustrated in Example 1 except that the positive electrode prepared as described above was employed.

EXAMPLE 23

<Preparation of Positive Electrode>

91% by weight of the nickel hydroxide containing-particles of the same kind as employed in Example 1 was mixed with 5% by weight of cobalt hydroxide particles (4.5 μm in average particle diameter, 1.2 g/cm$^3$ in tap density, and 10 m$^2$/g in specific surface area) and 4% by weight of binders (carboxymethyl cellulose and PTFE (polytetrafluoroethylene)) to obtain a mixture, to which pure water was further added and the resultant mixture was kneaded to prepare a paste. Then, this paste was filled in a nickel-plated porous metallic substrate of the same structure as illustrated in Example 1. Then, after being dried, the porous substrate was press-molded to manufacture a nickel positive electrode having a theoretical capacity of 2600 mAh.

Then, a battery unit was assembled in the same manner as illustrated in Example 1 except that the positive electrode prepared as described above was employed.

EXAMPLE 24

A cobalt hydroxide layer was formed on the surface of the nickel hydroxide containing-particles of the same kind as explained in Example 1 to prepare composite particles having a specific surface area of 15 m$^2$/g. The weight of the cobalt hydroxide layer was 5% by weight based on the nickel containing-hydroxide particles. The weight was calculated as cobalt element.

Then, 96% by weight of the composite particles was mixed with 4% by weight of binders (carboxymethyl cellulose and PTFE (polytetrafluoroethylene)) to obtain a mixture, to which pure water was further added and the resultant mixture was kneaded to prepare a paste. Then, this paste was filled in a nickel-plated porous metallic substrate of the same structure as illustrated in Example 1. Then, after being dried, the porous substrate was press-molded to manufacture a nickel positive electrode having a theoretical capacity of 2600 mAh.

Then, a battery unit was assembled in the same manner as illustrated in Example 1 except that the positive electrode prepared as described above was employed.

The battery units obtained from Examples 20 to 24 were subjected at room temperature to a partial charging which is 10% of the full charging with a charging rate of 0.1 C to the nominal capacity (theoretical capacity). Then, the battery units were subjected to an aging at a temperature of 70° C. Thereafter, these battery units were charged for 15 hours with a charging rate of 0.1 C at room temperature, and then discharged with 0.2 C until the voltage was decreased down to 1.0V. The charge/discharge cycle of charging with 1 C for 15 hours and discharging with 1 C until the voltage was decreased to 1V was repeated 5 times to prepare a cylindrical nickel hydrogen secondary battery.

Then, the utilization and recovery ratio R(%) after storage at a temperature of 65° C. of these battery obtained from Examples 20 to 24 were calculated in the same manner as in the cases of Examples 14 to 19, the results being shown in the following Table 2. Table 2 also shows the results of Example 15.

conditions: 0.3 to 2.5 μm in average particle diameter, 0.4 to 1.15 g/cm$^3$ in tap density and 2.5 to 30 m$^2$/g in specific surface area, or when the composite particles have a specific surface area of 50 m$^2$/g or less, and added to the positive electrode, the utilization can be improved.

In the above Examples, particles consisting of an eutectic compound formed by the nickel hydroxide and zinc was employed for incorporating it into the positive electrode. However, it was also possible to obtain almost the same effects even if a zinc compound such as zinc oxide was added in the form of powder to the paste instead of the particles. Further, even if zinc or zinc compounds are charged into an alkali electrolyte, almost the same effects would be obtained.

EXAMPLE 25

<Preparation of Positive Electrode>

First of all, particles made mainly of nickel hydroxide exhibiting a value of 0.95° in the half-width of a peak in the (101) plane as measured by X-ray powder diffraction (Cu—Kα, 2θ) and cobalt monoxide particles were mixed together at a ratio of 90:10 (parts by weight) to obtain a mixture, which was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode. The particles made mainly of the nickel hydroxide were 15 m$^2$/g in specific surface area.

<Preparation of Negative Electrode>

To 95 parts by weight of hydrogen-absorbing alloy powder having the composition of LaNi$_{4.0}$Co$_{0.4}$Mn$_{0.3}$Al$_{0.3}$ were added 3 parts by weight of polytetrafluoroethylene, 1 part by weight of carbon black powder, 1 part by weight of carboxymethyl cellulose (binder) and 50 parts by weight of

TABLE 2

| | Physical properties of Co(OH)$_2$ | | | | | |
|---|---|---|---|---|---|---|
| | Average particles size (μm) | Tap density (g/cm$^3$) | Specific surface area (m$^2$/g) | Initial charging method | Utilization (%) | Recovery ratio (%) |
| Example 20 | 4.5 | 1.2 | 2.4 | Partial charging · aging | 93 | 97 |
| Example 15 | 4.5 | 1.2 | 2.4 | Normal temperature initial charging | 75 | 99 |
| Example 21 | 1.5 | 1.2 | 2.4 | Partial charging · aging | 95 | 98 |
| Example 22 | 4.5 | 1.0 | 2.4 | Partial charging · aging | 95 | 98 |
| Example 23 | 4.5 | 1.2 | 10 | Partial charging · aging | 95 | 98 |
| Example 24 | Composite particle | | | Partial charging · aging | 95 | 98 |

It is clear from the comparison between Example 20 and Example 15 shown in Table 2 that when the aging is performed after the partial charging, the utilization would be improved. It is also clear from the comparison between Example 20 and Examples 21 to 24 that when the particles consisting mainly of cobalt hydroxide meet at least one of the water to obtain a mixture, which was then mixed to prepare a paste. This paste was then filled into a nickel net and, after being dried, press-molded to manufacture a negative electrode comprising a hydrogen-absorbing alloy.

Then, a separator formed of polypropylene nonwoven fabric was disposed between the negative electrode and the positive electrode, and the resultant composite was spirally wound to prepare an electrode group. This electrode group was housed in a cylindrical bottomed case together with an alkali electrolyte comprising 7.0 mol/L KOH and 1.0 mol/L, thereby assembling a cylindrical nickel hydrogen secondary battery having a structure shown in FIG. 1 and a size of 4/3A. Theoretical capacity of the battery was 3,500 mAh. The ratio of alkali electrolyte to the theoretical capacity of the positive electrode at 25° C. was found as being 1.1 $cm^3$/Ah.

EXAMPLE 26

A cylindrical nickel hydrogen secondary battery of the same construction as that of Example 25 was assembled following the same procedures as explained in Example 25, except that an aqueous rubidium hydroxide solution was substituted for the aqueous cesium hydroxide solution for the preparation of the positive electrode.

EXAMPLE 27

A cylindrical nickel hydrogen secondary battery of the same construction as that of Example 25 was assembled following the same procedures as explained in Example 25, except that an aqueous pottasium hydroxide solution was substituted for the aqueous cesium hydroxide solution for the preparation of the positive electrode.

Comparative Example 10

A cylindrical nickel hydrogen secondary battery of the same construction as that of Example 25 was assembled following the same procedures as explained in Example 25, except that the positive electrode was constructed as explained below.

<Preparation of Positive Electrode>

First of all, particles made mainly of nickel hydroxide particles exhibiting a value of 0.95° in the half-width of a peak in the (101) plane as measured by X-ray powder diffraction (Cu—Kα, 2θ) and cobalt monoxide particles were mixed together at a ratio of 90:10 (parts by weight) to obtain a mixture, which was then mixed with 0.3% by weight of carboxymethyl cellulose, and 0.5% by weight of polytetrafluoroethylene. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode. The particles made mainly of the nickel hydroxide were 15 $m^2$/g in specific surface area.

Comparative Example 11

A cylindrical nickel hydrogen secondary battery of the same construction as that of Example 25 was assembled following the same procedures as explained in Example 25, except that an aqueous sodium hydroxide solution was substituted for the aqueous cesium hydroxide solution for the preparation of the positive electrode.

Comparative Example 12

A cylindrical nickel hydrogen secondary battery of the same construction as that of Example 25 was assembled following the same procedures as explained in Example 25, except that an aqueous lithium hydroxide solution was substituted for the aqueous cesium hydroxide solution for the preparation of the positive electrode.

Each secondary battery obtained from Examples 25 to 27 and Comparative Examples 10 to 12 was subjected to 400 cycles of charge/discharge: charging with 1 C at 25° C. and −ΔV (a cut-off voltage of 10 mV), and discharging with 1 C at 25° C. and 1V cut, so as to measure the change in capacity resulting from the repetition of charge/discharge cycle, and to measure the change in impedance resulting from the repetition of charge/discharge cycle, the results being shown in FIG. 6 and FIG. 7, respectively.

The kinds of alkali metal compounds added to the positive electrodes of the secondary batteries obtained by Examples 25 to 27 and Comparative Examples 10 to 12 are shown in the following Table 3.

TABLE 3

|  | Kinds of alkali metal compound in positive electrode |
| --- | --- |
| Example 25 | CsOH |
| Example 26 | RbOH |
| Example 27 | KOH |
| Comparative example 10 | Not added |
| Comparative example 11 | NaOH |
| Comparative example 12 | LiOH |

As seen from Table 3, FIGS. 6 and 7, the secondary batteries of Examples 25 to 27 where cesium element, rubidium element or pottasium element was included in the positive electrode were capable of more effectively inhibiting an increase of impedance resulting from the repetition of charge/discharge cycle as compared with those of Comparative Examples 10 to 12, thus making it possible to improve the capacity retention during the charge/discharge cycle.

EXAMPLE 28

A cylindrical nickel hydrogen secondary battery of the same construction as that of Example 25 was assembled following the same procedures as explained in Example 25, except that an alkali electrolyte comprising 5.0 mol/L KOH, 1.0 mol/L LiOH and 2.0 mol/L CsOH was employed.

EXAMPLE 29

A cylindrical nickel hydrogen secondary battery of the same construction as that of Example 25 was assembled following the same procedures as explained in Example 25, except that an alkali electrolyte comprising 7.0 mol/L KOH, 1.0 mol/L LiOH and 2.0 mol/L CsOH was employed.

Comparative Example 13

A cylindrical nickel hydrogen secondary battery of the same construction as that of Example 25 was assembled following the same procedures as explained in Comparative Example 10, except that an alkali electrolyte comprising 5.0 mol/L KOH, 1.0 mol/L LiOH and 2.0 mol/L CsOH was employed.

Comparative Example 14

A cylindrical nickel hydrogen secondary battery of the same construction as that of Example 25 was assembled following the same procedures as explained in Comparative Example 10, except that an alkali electrolyte comprising 7.0 mol/L KOH, 1.0 mol/L LiOH and 2.0 mol/L CsOH was employed.

Figure 8:
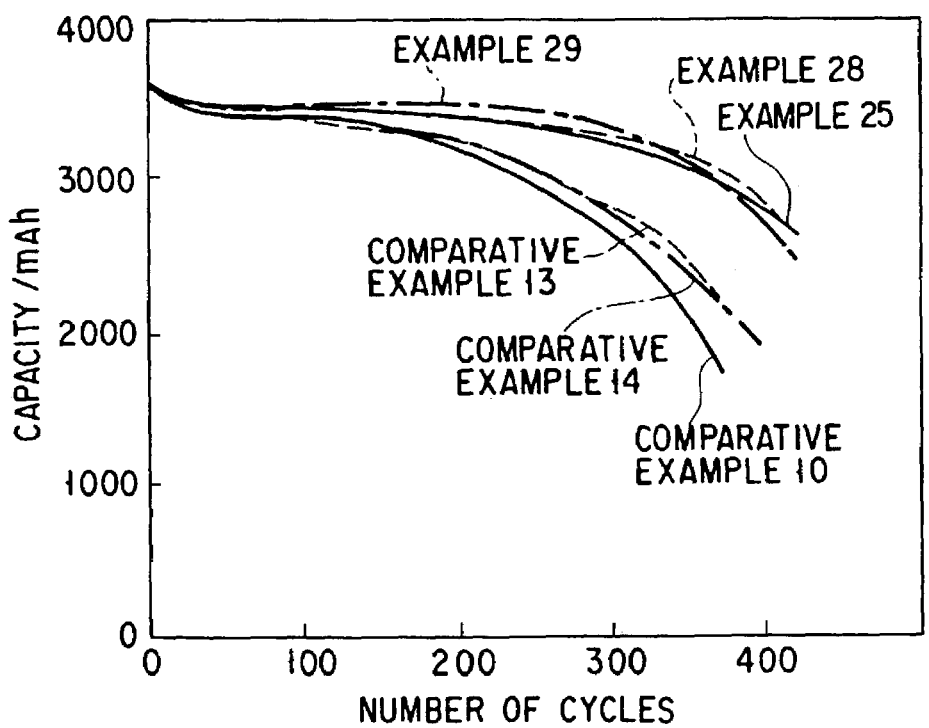
FIG. 8 is a graph showing the relationship between the kinds of the material to which alkali metal hydrate is added and the cycle life in the secondary batteries of Examples 25, 28 and 29 and of Comparative Examples 10, 13 and 14.

Each secondary battery obtained from Examples 28 and 29 and Comparative Examples 13 and 14 was subjected to 400 cycles of charge/discharge: charging with 1 C at 25° C. and −ΔV (a cut-off voltage of 10 mV), and discharging with 1 C at 25° C. and 1V cut, so as to measure the change in capacity resulting from the repetition of charge/discharge cycle, the results being shown in FIG. 8. The results of Example 25 and Comparative Example 10 are also shown in FIG. 8.

The compositions of alkali electrolyte added to the secondary batteries of Examples 25, 28, 29 and Comparative Examples 10, 13 and 14 are shown in the following Table 4.

TABLE 4

| | Composition of alkaline electrolyte | | | Alkali metal compounds in positive electrode |
|---|---|---|---|---|
| | KOH (M) | LiOH (M) | CsOH (M) | |
| Example 25 | 7.0 | 1.0 | — | CsOH |
| Example 28 | 5.0 | 1.0 | 2.0 | CsOH |
| Example 29 | 7.0 | 1.0 | 2.0 | CsOH |
| Comparative example 10 | 7.0 | 1.0 | — | Not added |
| Comparative example 13 | 5.0 | 1.0 | 2.0 | Not added |
| Comparative example 14 | 7.0 | 1.0 | 2.0 | Not added |

As seen from Table 4, FIG. 8, the secondary batteries of Examples 25, 28, 29 where cesium hydroxide was included in the positive electrode were capable of improving the capacity retention during the charge/discharge cycle as compared with that of Comparative Example 10 where cesium hydroxide was not included in the positive electrode, or as compared with those of Comparative Examples 13 and 14 where cesium hydroxide was included not in the positive electrode but in the alkali electrolyte.

Comparative Example 15

A cylindrical nickel hydrogen secondary battery of the same construction as that of Example 25 was assembled following the same procedures as explained in Example 25, except that nickel hydroxide exhibiting a value of 0.6° in the half-width of a peak in the (101) plane as measured by X-ray powder diffraction (Cu—Kα, 2θ) was employed.

Figure 9:
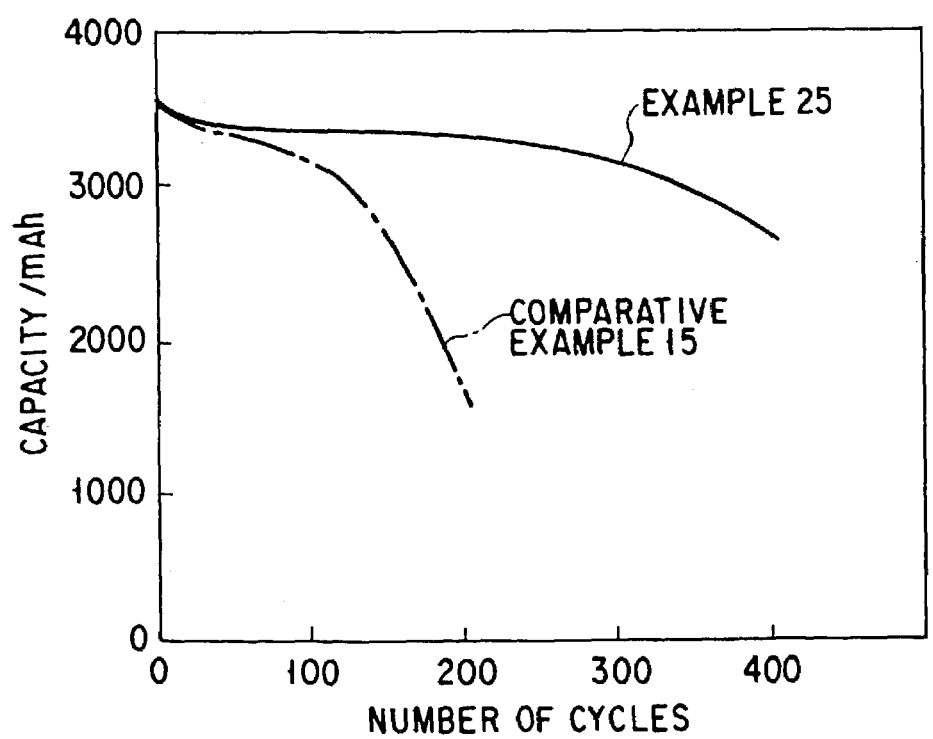
FIG. 9 is a graph showing the relationship between the half-width of nickel hydroxide included in the positive electrode and the cycle life in the secondary batteries of Example 25 and Comparative Example 15.

The secondary battery obtained from Comparative Example 15 was subjected to 400 cycles of charge/discharge: charging with 1 C at 25° C. and −ΔV (a cut-off voltage of 10 mV), and discharging with 1 C at 25° C. and 1V cut, so as to measure the change in capacity resulting from the repetition of charge/discharge cycle, the results being shown in FIG. 9. The results of Example 25 are also shown in FIG. 9.

As seen from FIG. 9, the secondary batteries of Example 25, where nickel hydroxide exhibiting a value of 0.8° or more in the half-width of a peak in the (101) plane as measured by X-ray powder diffraction (Cu—Kα, 2θ) was employed in the positive electrode, was capable of improving the capacity retention during the charge/discharge cycle as compared with that of Comparative Example 15 where the half-width of peak was less than 0.8°/2θ.

EXAMPLE 30

The separator similar to that of Example 25 was disposed between the negative electrode similar to that of Example 25 and the positive electrode similar to that of Example 25, and the resultant composite was spirally wound to prepare an electrode group. This electrode group was housed in a cylindrical bottomed case together with an alkali electrolyte comprising 7.0 mol/L KOH and 1.0 mol/L LiOH, thereby assembling a cylindrical nickel hydrogen secondary battery having a structure shown in FIG. 1, a size of 4/3A and theoretical capacity of 3,500 mAh. The ratio of alkali electrolyte to the theoretical capacity of the positive electrode at 25° C. was 1.0 cm$^3$/Ah.

EXAMPLE 31

A cylindrical nickel hydrogen secondary battery of the same construction as that of Example 30 was assembled following the same procedures as explained in Example 30, except that the ratio of alkali electrolyte to the theoretical capacity at 25° C. was altered to 1.1 cm$^3$/Ah.

EXAMPLE 32

A cylindrical nickel hydrogen secondary battery of the same construction as that of Example 30 was assembled following the same procedures as explained in Example 30, except that the ratio of alkali electrolyte to the theoretical capacity at 25° C. was altered to 1.2 cm$^3$/Ah.

EXAMPLE 33

A cylindrical nickel hydrogen secondary battery of the same construction as that of Example 30 was assembled following the same procedures as explained in Example 30, except that the ratio of alkali electrolyte to the theoretical capacity at 25° C. was altered to 1.3 cm$^3$/Ah.

EXAMPLE 34

A cylindrical nickel hydrogen secondary battery of the same construction as that of Example 30 was assembled following the same procedures as explained in Example 30, except that the ratio of alkali electrolyte to the theoretical capacity at 25° C. was altered to 1.4 cm$^3$/Ah.

Comparative Example 16

The separator similar to that of Example 25 was disposed between the negative electrode similar to that of Example 25 and the positive electrode similar to that of Comparative Example 10, and the resultant composite was spirally wound to prepare an electrode group. This electrode group was housed in a cylindrical bottomed case together with an alkali electrolyte comprising 7.0 mol/L KOH and 1.0 mol/L LiOH, thereby assembling a cylindrical nickel hydrogen secondary battery having a structure shown in FIG. 1, a size of 4/3A and theoretical capacity of 3,500 mAh. The ratio of alkali electrolyte to the theoretical capacity of the positive electrode at 25° C. was 1.0 cm$^3$/Ah.

Comparative Example 17

A cylindrical nickel hydrogen secondary battery of the same construction as that of Comparative Example 16 was assembled following the same procedures as explained in Comparative Example 16, except that the ratio of alkali electrolyte to the theoretical capacity at 25° C. was altered to 1.1 cm$^3$/Ah.

Comparative Example 18

A cylindrical nickel hydrogen secondary battery of the same construction as that of Comparative Example 16 was assembled following the same procedures as explained in Comparative Example 16, except that the ratio of alkali electrolyte to the theoretical capacity at 25° C. was altered to 1.2 cm$^3$/Ah.

Comparative Example 19

A cylindrical nickel hydrogen secondary battery of the same construction as that of Comparative Example 16 was assembled following the same procedures as explained in Comparative Example 16, except that the ratio of alkali electrolyte to the theoretical capacity at 25° C. was altered to 1.3 cm$^3$/Ah.

Comparative Example 20

A cylindrical nickel hydrogen secondary battery of the same construction as that of Comparative Example 16 was assembled following the same procedures as explained in Comparative Example 16, except that the ratio of alkali electrolyte to the theoretical capacity at 25° C. was altered to 1.4 cm$^3$/Ah.

Figure 10:
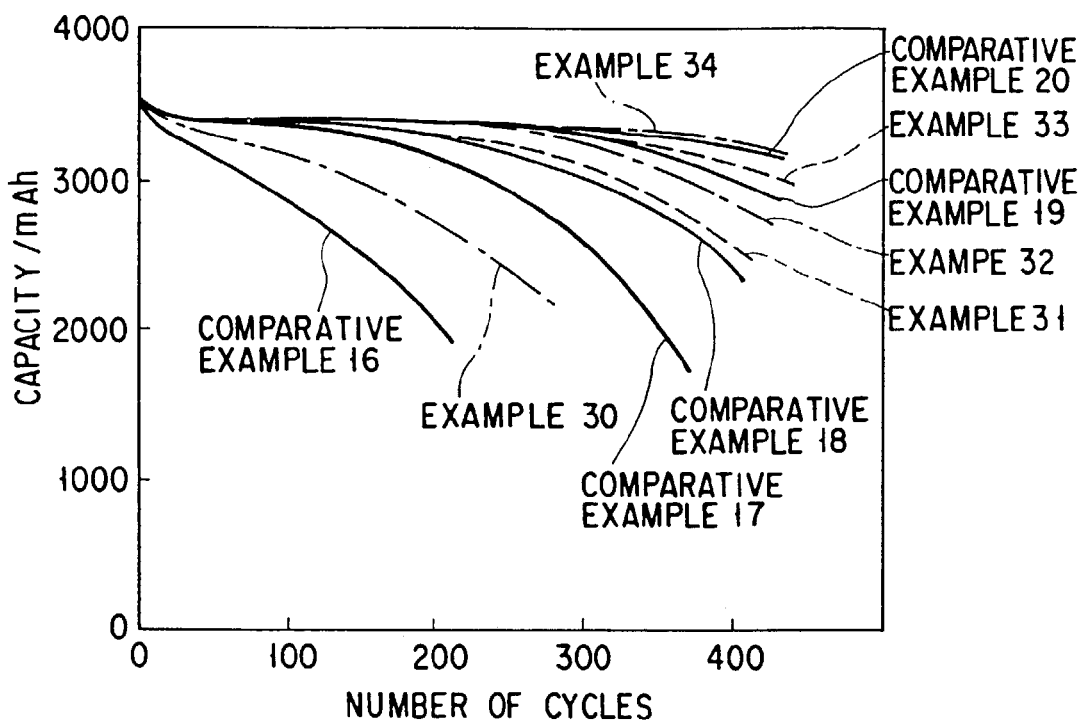
FIG. 10 is a graph showing the relationship among the presence or absence of alkali metal hydrate in the positive electrode, the ratio of electrolyte to theoretical capacity and the cycle life in the secondary batteries of Examples 30 to 34 and of Comparative Examples 16 to 20.
Figure 11:
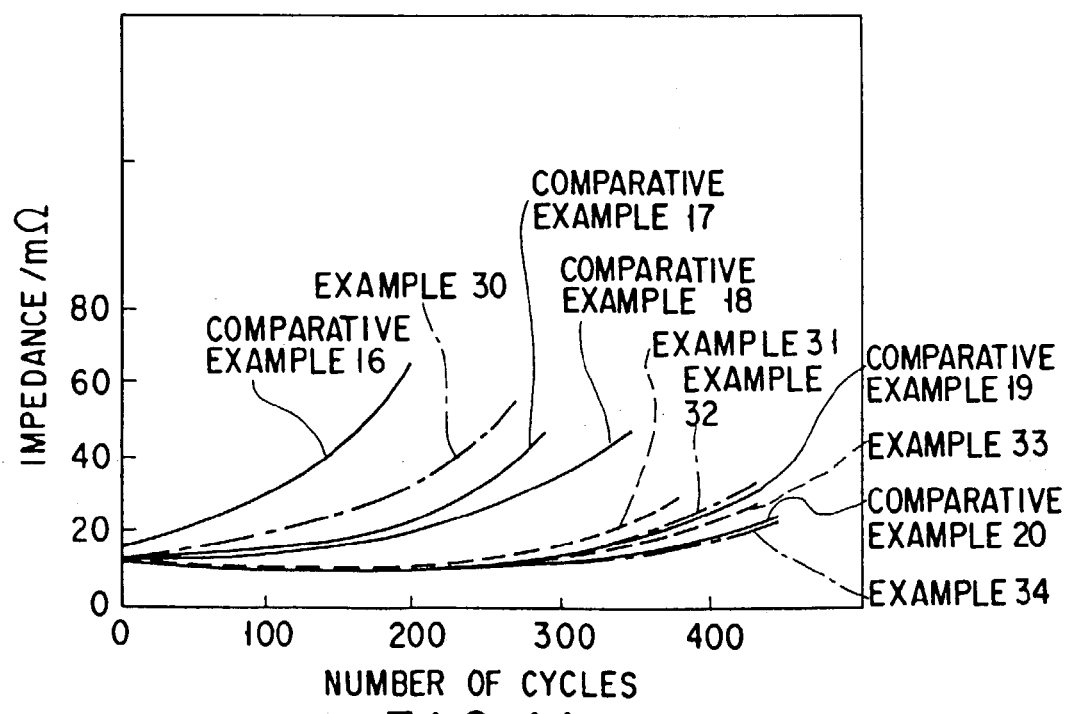
FIG. 11 is a graph showing the relationship among the presence or absence of alkali metal hydrate in the positive electrode, the ratio of electrolyte to theoretical capacity and the impedance in the secondary batteries of Examples 30 to 34 and of Comparative Examples 16 to 20.

Each secondary battery obtained from Examples 30 to 34 and Comparative Examples 16 to 20 was subjected to 400 cycles of charge/discharge: charging with 1 C at 25° C. and −ΔV (a cut-off voltage of 10 mV), and discharging with 1 C at 25° C. and 1V cut, so as to measure the change in capacity resulting from the repetition of charge/discharge cycle, and to measure the change in impedance resulting from the repetition of charge/discharge cycle, the results being shown in FIG. 10 and FIG. 11, respectively.

The ratio of electrolyte to the theoretical capacity at 25° C. and the kinds of alkali metal compounds added to the positive electrodes of the secondary batteries of Examples 30 to 34 and Comparative Examples 16 to 20 are shown in the following Table 5.

TABLE 5

|  | Ratio of electrolyte to theoretical capacity (25° C., cm$^3$/Ah) | Alkali metal compounds in positive electrode |
|---|---|---|
| Example 30 | 1.0 | CsOH |
| Example 31 | 1.1 | CsOH |
| Example 32 | 1.2 | CsOH |
| Example 33 | 1.3 | CsOH |
| Example 34 | 1.4 | CsOH |
| Comparative example 16 | 1.0 | Not added |
| Comparative example 17 | 1.1 | Not added |
| Comparative example 18 | 1.2 | Not added |
| Comparative example 19 | 1.3 | Not added |
| Comparative example 20 | 1.4 | Not added |

As seen from Table 5, FIGS. 10 and 11, the secondary batteries of Examples 30 to 33 where the ratio of electrolyte to the theoretical capacity at 25° C. was within the range of 1.0 cm$^3$/Ah to 1.3 cm$^3$/Ah were capable of more effectively inhibiting an increase of impedance resulting from the repetition of charge/discharge cycle by the addition of cesium hydroxide to the positive electrode as compared with those of Example 34 where the ratio of electrolyte to the theoretical capacity at 25° C. was more than 1.3 cm$^3$/Ah, thus making it possible to improve the capacity retention during the charge/discharge cycle.

EXAMPLE 35

90 parts by weight of the nickel hydroxide containing-particles of the same kind as employed in Example 25 was mixed with 10 parts by weight of cobalt hydroxide particles (4.5 μm in average particle diameter, 1.2 g/cm$^3$ in tap density, and 2.4 m$^2$/g in specific surface area as measured by means of BET method) to obtain a powdery mixture. This powdery mixture was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

The separator similar to that of Example 25 was disposed between the negative electrode similar to that of Example 25 and the positive prepared as described above, and the resultant composite was spirally wound to prepare an electrode group. This electrode group was housed in a cylindrical bottomed case together with an alkali electrolyte comprising 7.0 mol/L KOH and 1.0 mol/L LiOH, thereby assembling a battery unit having a structure shown in FIG. 1, a size of 4/3A and theoretical capacity of 3,500 mAh. The ratio of alkali electrolyte to the theoretical capacity of the positive electrode at 25° C. was 1.2 cm$^3$/Ah.

The battery unit obtained was subjected an aging for 15 hours at a temperature of 25° C., charged for 15 hours with an electric quantity of 0.1 CmA at 75° C., and, after a 30 minute cut-off, discharged with an electric quantity of 0.5 CmA until the battery voltage was decreased down to 1.0V thereby performing the initial charging to prepare a cylindrical nickel hydrogen secondary battery.

EXAMPLE 36

The battery unit was assembled in the same manner as illustrated in Example 35 was subjected an aging for 15 hours at a temperature of 25° C., charged for 15 hours with an electric quantity of 0.1 CmA at 25° C., and, after a 30 minute cut-off, discharged with an electric quantity of 1.0 CmA until the battery voltage was decreased down to 1.0V thereby performing the initial charging to prepare a cylindrical nickel hydrogen secondary battery.

EXAMPLE 37

<Preparation of Positive Electrode>

90 parts by weight of the nickel hydroxide containing-particles of the same kind as employed in Example 25 was mixed with 10 parts by weight of cobalt hydroxide particles (1.5 μm in average particle diameter, 1.2 g/cm$^3$ in tap density, and 2.4 m$^2$/g in specific surface area as measured by means of BET method) to obtain a powdery mixture. This powdery mixture was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

Then, a battery unit was assembled in the same manner as illustrated in Example 35 except that the positive electrode prepared as described above was employed.

This battery unit was then subjected to the initial charging in the same manner as explained in Example 35 to prepare a cylindrical nickel hydrogen secondary battery.

EXAMPLE 38

<Preparation of Positive Electrode>

90 parts by weight of the nickel hydroxide containing-particles of the same kind as employed in Example 25 was mixed with 10 parts by weight of cobalt hydroxide particles (4.5 µm in average particle diameter, 1.0 g/cm$^3$ in tap density, and 2.4 m$^2$/g in specific surface area as measured by means of BET method) to obtain a powdery mixture. This powdery mixture was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

Then, a battery unit was assembled in the same manner as illustrated in Example 35 except that the positive electrode prepared as described above was employed.

This battery unit was then subjected to the initial charging in the same manner as explained in Example 35 to prepare a cylindrical nickel hydrogen secondary battery.

EXAMPLE 39

<Preparation of Positive Electrode>

90 parts by weight of the nickel hydroxide containing-particles of the same kind as employed in Example 25 was mixed with 10 parts by weight of cobalt hydroxide particles (4.5 µm in average particle diameter, 1.2 g/cm$^3$ in tap density, and 10 m$^2$/g in specific surface area as measured by means of BET method) to obtain a powdery mixture. This powdery mixture was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

Then, a battery unit was assembled in the same manner as illustrated in Example 35 except that the positive electrode prepared as described above was employed.

This battery unit was then subjected to the initial charging in the same manner as explained in Example 35 to prepare a cylindrical nickel hydrogen secondary battery.

EXAMPLE 40

A cobalt hydroxide layer was formed on the surface of the nickel hydroxide containing-particles of the same kind as explained in Example 25 to prepare composite particles having a specific surface area of 15 m$^2$/g. The weight of the cobalt hydroxide layer was 5% by weight based on the nickel hydroxide containing-particles. The weight was calculated as cobalt element.

Then, 90% by weight of the composite particles was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

Then, a battery unit was assembled in the same manner as illustrated in Example 35 except that the positive electrode prepared as described above was employed.

This battery unit was then subjected to the initial charging in the same manner as explained in Example 35 to prepare a cylindrical nickel hydrogen secondary battery.

Comparative Example 21

90 parts by weight of the nickel hydroxide containing-particles of the same kind as employed in Example 25 was mixed with 10 parts by weight of cobalt hydroxide particles (4.5 µm in average particle diameter, 1.2 g/cm$^3$ in tap density, and 2.4 m$^2$/g in specific surface area as measured by means of BET method) to obtain a powdery mixture. This powdery mixture was then mixed with 0.3% by weight of carboxymethyl cellulose and 0.5% by weight of polytetrafluoroethylene. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

Then, a battery unit was assembled in the same manner as illustrated in Example 35 except that the positive electrode prepared as described above was employed.

This battery unit was then subjected to the initial charging in the same manner as explained in Example 35 to prepare a cylindrical nickel hydrogen secondary battery.

Each secondary battery obtained from Examples 35 to 40 and Comparative Example 21 was subjected to 400 cycles of charge/discharge: charging with 1 C at 25° C. and −ΔV (a cut-off voltage of 10 mV), and discharging with 1 C at 25° C. and 1V cut, so as to measure the cycle number whose discharge capacity was 70% or less of the theoretical capacity, the results being shown in the following Table 6.

Further, the secondary batteries obtained from 35 to 40 and Comparative Example 21 were charged for 16 hours with an electric quantity of 0.1 CmA, and then discharged with an electric quantity of 1.0 CmA until the terminal voltage was decreased down to 1.0V thereby to measure the initial capacity from the discharge retention time. These secondary batteries were then stored for one month at a temperature of 65° C. Thereafter, these secondary batteries were charged again for 16 hours with an electric quantity of 0.1 CmA, and then discharged with an electric quantity of 1.0 CmA until the terminal voltage was decreased down to 1.0V. This charge/discharge cycle was repeated 3 times, and the discharge capacity at end of the third cycle was measured to determine the recovery capacity thereof. In this case, the recovery ratio R(%) was calculated according to the aforementioned formula (1), the result being shown in the following Table 6.

Furthermore, each secondary battery obtained from Examples 35 to 40 and Comparative Example 21 was subjected to a charge/discharge cycle: charging with 1 C at 25° C. and −ΔV (a cut-off voltage of 10 mV), and then discharging with 1 C at 25° C. and 1V cut, thereby to measure the initial capacity from the discharge retention time. Thereafter, these secondary batteries were again subjected to a charge/discharge cycle: charging with 1 C at 25° C. and −ΔV (a cut-off voltage of 10 mV), and then discharging with 3 C at 25° C. and 1V cut, thereby to measure the discharge capacity from the discharge retention time. Then, the ratio of the discharge capacity to the initial capacity was calculated, thus defining it as a large current-discharge ratio, the result being shown in the following Table 6.

TABLE 6

| | Physical properties of Co(OH)$_2$ | | | | Discharge | |
|---|---|---|---|---|---|---|
| | Average particles size (μm) | Tap density (g/cm$^3$) | Specific surface area (m$^2$/g) | Initial charging method | Cycle life | Recovery ratio (%) | ratio of large current (%) |
| Example 35 | 4.5 | 1.2 | 2.4 | High temperature initial charging | 450 | 95 | 87 |
| Example 36 | 4.5 | 1.2 | 2.4 | Normal temperature initial charging | 430 | 94 | 85 |
| Example 37 | 1.5 | 1.2 | 2.4 | High temperature initial charging | 500 | 95 | 87 |
| Example 38 | 4.5 | 1.0 | 2.4 | High temperature initial charging | 500 | 95 | 87 |
| Example 39 | 4.5 | 1.2 | 10 | High temperature initial charging | 500 | 95 | 87 |
| Example 40 | Composite particle | | | High temperature initial charging | 500 | 95 | 87 |
| Comparative example 21 | 4.5 | 1.2 | 2.4 | High temperature initial charging | 370 | 94 | 84 |

As seen from Table 6, the secondary batteries according to Examples of 35 to 40 were excellent in cycle life and in large current-discharge property as compared with that of Comparative Example 21. It would be also clear from the comparison between Example 35 and Example 36 that when the initial charging is performed at a temperature ranging from 40 to 100° C., the cycle life can be improved. It is also clear from the comparison between Example 35 and Examples 37 to 40 that when the particles consisting mainly of cobalt hydroxide and meeting at least one of the conditions: 0.3 to 2.5 μm in average particle diameter, 0.4 to 1.15 g/cm$^3$ in tap density and 2.5 to 30 m$^2$/g in specific surface area, or when the composite particles having a specific surface area of 50 m$^2$/g or less, and added to the positive electrode, the cycle life can be prominently improved.

EXAMPLE 41

First of all, particles consisting of an eutectic compound formed by nickel hydroxide, cobalt and zinc were prepared. The nickel hydroxide exhibited a value of 0.95° in the half-width of a peak in the (101) plane thereof as measured by X-ray powder diffraction (Cu—Kα, 2θ). The weight of the cobalt in the particles was 1.0% by weight based on the nickel hydroxide. The weight of the zinc in the particles was 6.0% by weight based on the nickel hydroxide. The particles were 15 m$^2$/g in specific surface area.

90 parts by weight of the nickel hydroxide containing-particles obtained as described above was mixed with 10 parts by weight of cobalt hydroxide particles (4.5 μm in average particle diameter, 1.2 g/cm$^3$ in tap density, and 2.4 m$^2$/g in specific surface area as measured by means of BET method) to obtain a powdery mixture. This powdery mixture was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

Then, a battery unit was assembled in the same manner as illustrated in Example 35 except that the positive electrode prepared as described above was employed.

This battery unit was then subjected to the initial charging in the same manner as explained in Example 35 to prepare a cylindrical nickel hydrogen secondary battery.

The cycle life, recovery ratio and large current-discharge property of the secondary battery of Example 41 were measured in the same manner as in Examples 35 to 40, finding that the cycle life thereof was 430, the recovery ratio was 95% and the large current discharge ratio was 89%.

EXAMPLE 42

90 parts by weight of the nickel hydroxide containing-particles of the same kind as obtained in Example 41 was mixed with 10 parts by weight of cobalt hydroxide particles of the same kind as obtained in Example 37 to obtain a powdery mixture. This powdery mixture was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

Then, a battery unit was assembled in the same manner as illustrated in Example 35 except that the positive electrode prepared as described above was employed.

This battery unit was then subjected to the initial charging in the same manner as explained in Example 35 to prepare a cylindrical nickel hydrogen secondary battery.

The cycle life, recovery ratio and large current-discharge property of the secondary battery of Example 42 were measured in the same manner as in Examples 35 to 40, finding that the cycle life thereof was 510, the recovery ratio was 96% and the large current discharge ratio was 89%.

EXAMPLE 43

90 parts by weight of the nickel hydroxide containing-particles of the same kind as obtained in Example 25 was mixed with 10 parts by weight of cobalt hydroxide particles (4.5 μm in average particle diameter, 1.2 g/cm$^3$ in tap density, and 2.4 m$^2$/g in specific surface area as measured by means of BET method) to obtain a powdery mixture. This powdery mixture was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

The separator similar to that of Example 25 was disposed between the negative electrode similar to that of Example 25 and the positive prepared as described above, and the resultant composite was spirally wound to prepare an electrode group. This electrode group was housed in a cylindrical bottomed case together with an alkali electrolyte comprising 7.0 mol/L KOH and 1.0 mol/L LiOH, thereby assembling a battery unit having a structure shown in FIG. 1, a size of 4/3A and theoretical capacity of 3,500 mAh. The ratio of alkali electrolyte to the theoretical capacity of the positive electrode at 25° C. was 1.2 cm$^3$/Ah.

EXAMPLE 44

<Preparation of Positive Electrode>

90 parts by weight of the nickel hydroxide containing-particles of the same kind as obtained in Example 25 was mixed with 10 parts by weight of cobalt hydroxide particles (1.5 μm in average particle diameter, 1.2 g/cm$^3$ in tap density, and 2.4 m$^2$/g in specific surface area as measured by means of BET method) to obtain a powdery mixture. This powdery mixture was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

Then, a battery unit was assembled in the same manner as illustrated in Example 43 except that the positive electrode prepared as described above was employed.

EXAMPLE 45

<Preparation of Positive Electrode>

90 parts by weight of the nickel hydroxide containing-particles of the same kind as obtained in Example 25 was mixed with 10 parts by weight of cobalt hydroxide particles (4.5 μm in average particle diameter, 1.0 g/cm$^3$ in tap density, and 2.4 m$^2$/g in specific surface area as measured by means of BET method) to obtain a powdery mixture. This powdery mixture was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

Then, a battery unit was assembled in the same manner as illustrated in Example 43 except that the positive electrode prepared as described above was employed.

EXAMPLE 46

<Preparation of Positive Electrode>

90 parts by weight of the nickel hydroxide containing-particles of the same kind as obtained in Example 25 was mixed with 10 parts by weight of cobalt hydroxide particles (4.5 μm in average particle diameter, 1.2 g/cm$^3$ in tap density, and 10 m$^2$/g in specific surface area as measured by means of BET method) to obtain a powdery mixture. This powdery mixture was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

Then, a battery unit was assembled in the same manner as illustrated in Example 43 except that the positive electrode prepared as described above was employed.

EXAMPLE 47

A cobalt hydroxide layer was formed on the surface of the nickel hydroxide containing-particles of the same kind as explained in Example 25 to prepare composite particles having a specific surface area of 15 m$^2$/g. The weight of the cobalt hydroxide layer was 5% by weight based on the nickel hydroxide containing-particles. The weight was calculated as cobalt element.

Then, 90% by weight of the composite particles was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

Then, a battery unit was assembled in the same manner as illustrated in Example 43 except that the positive electrode prepared as described above was employed.

Comparative Example 22

90 parts by weight of the nickel hydroxide containing-particles of the same kind as employed in Example 25 was mixed with 10 parts by weight of cobalt hydroxide particles (4.5 μm in average particle diameter, 1.2 g/cm³ in tap density, and 2.4 m²/g in specific surface area as measured by means of BET method) to obtain a powdery mixture. This powdery mixture was then mixed with 0.3% by weight of carboxymethyl cellulose and 0.5% by weight of polytetrafluoroethylene. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

Then, a battery unit was assembled in the same manner as illustrated in Example 43 except that the positive electrode prepared as described above was employed.

The battery units obtained from Examples 43 to 47 and Comparative Example 22 were subjected at room temperature to a partial charging which was 10% of the full charging with a charging rate of 0.1 C to the nominal capacity (theoretical capacity). Then, the battery units were subjected to an aging at a temperature of 70° C. Thereafter, these battery units were charged for 15 hours with a charging rate of 0.1 C at room temperature, and then discharged with a discharge rate of 0.2 C until the voltage was decreased down to 1.0V. The charge/discharge cycle of charging with 1 C for 15 hours and discharging with 1 C until the voltage was decreased to 1V was repeated 5 times to prepare a cylindrical nickel hydrogen secondary battery.

Then, the cycle life, recovery ratio and large current-discharge property of these battery units obtained from Examples 43 to 47 and Comparative Example 22 were measured in the same manner as in the cases of Examples 35 to 40, the results being shown in the following Table 7. Table 7 also shows the results of Example 36.

one of the conditions: 0.3 to 2.5 μm in average particle diameter, 0.4 to 1.15 g/cm³ in tap density and 2.5 to 30 m²/g in specific surface area, or when the composite particles are selected from those having a specific surface area of 50 m²/g or less, and added to the positive electrode, the cycle life can be improved.

EXAMPLE 48

First of all, particles consisting of an eutectic compound formed by nickel hydroxide, cobalt and zinc were prepared. The nickel hydroxide exhibited a value of 0.95° in the half-width of a peak in the (101) plane thereof as measured by X-ray powder diffraction (Cu—Kα, 2θ). The weight of the cobalt in the particles was 1.0% by weight based on the nickel hydroxide. The weight of the zinc in the particles was 6.0% by weight based on the nickel hydroxide. The particles were 15 m²/g in specific surface area.

90 parts by weight of the nickel hydroxide containing-particles obtained as described above was mixed with 10 parts by weight of cobalt hydroxide particles (4.5 μm in average particle diameter, 1.2 g/cm³ in tap density, and 2.4 m²/g in specific surface area as measured by means of BET method) to obtain a powdery mixture. This powdery mixture was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

TABLE 7

| | Physical properties of Co(OH)₂ | | | | | | Discharge ratio of large current (%) |
|---|---|---|---|---|---|---|---|
| | Average particles size (μm) | Tap density (g/cm³) | Specific surface area (m²/g) | Initial charging method | Cycle life | Recovery ratio (%) | |
| Example 43 | 4.5 | 1.2 | 2.4 | Partial charging · aging | 440 | 96 | 86 |
| Example 36 | 4.5 | 1.2 | 2.4 | Normal temperature initial charging | 430 | 94 | 85 |
| Example 44 | 1.5 | 1.2 | 2.4 | Partial charging · aging | 450 | 97 | 86 |
| Example 45 | 4.5 | 1.0 | 2.4 | Partial charging · aging | 450 | 97 | 86 |
| Example 46 | 4.5 | 1.2 | 10 | Partial charging · aging | 450 | 97 | 86 |
| Example 47 | Composite particle | | | Partial charging · aging | 450 | 97 | 86 |
| Comparative example 22 | 4.5 | 1.2 | 2.4 | Partial charging · aging | 350 | 96 | 84 |

As seen from Table 7, the secondary batteries according to Examples 36, 43 to 47 were more excellent in cycle life, recovery ratio and large current-discharge property as compared with that of Comparative Example 22. It is also clear from the comparison between Example 43 and Example 36 that when the aging is performed after the partial charging, the cycle life as well as the recovery ratio would be improved. It is also clear from the comparison between Example 43 and Examples 44 to 47 that when the particles consisting mainly of cobalt hydroxide are selected from those meeting at least Then, a battery unit was assembled in the same manner as illustrated in Example 43 except that the positive electrode prepared as described above was employed.

This battery unit was then subjected to the initial charging, aging and charge/discharge cycle in the same manner as explained in Example 43 to prepare a cylindrical nickel hydrogen secondary battery.

The cycle life, recovery ratio and large current-discharge property of the secondary battery of Example 48 were measured in the same manner as in Examples 35 to 40, finding that the cycle life thereof was 420, the recovery ratio was 96% and the large current discharge ratio was 87%.

EXAMPLE 49

90 parts by weight of the nickel hydroxide containing-particles of the same kind as obtained in Example 48 was mixed with 10 parts by weight of cobalt hydroxide particles of the same kind as obtained in Example 44 to obtain a powdery mixture. This powdery mixture was then mixed with 0.3% by weight of carboxymethyl cellulose, 0.5% by weight of polytetrafluoroethylene and 3 mol % (based on the nickel hydroxide) of aqueous cesium hydroxide solution. Subsequently, 35% by weight of water was further added to the above mixed solution and the resultant mixture was kneaded to prepare a paste. Then, this paste was filled in a three-dimensional nickel substrate and, after being dried, the substrate was press-molded to manufacture a nickel positive electrode.

Then, a battery unit was assembled in the same manner as illustrated in Example 43 except that the positive electrode prepared as described above was employed.

This battery unit was then subjected to the partial charging, aging and charge/discharge cycle in the same manner as explained in Example 43 to prepare a cylindrical nickel hydrogen secondary battery.

The cycle life, recovery ratio and large current-discharge property of the secondary battery of Example 49 were measured in the same manner as in Examples 35 to 40, finding that the cycle life thereof was 480, the recovery ratio was 97% and the large current discharge ratio was 87%.

EXAMPLE 50

<Preparation of Positive Electrode>

A composite nickel hydroxide particle as in FIG. 2 was prepared. On the surface of the nickel hydroxide particle was adhered fine nickel particles having a smaller diameter than the nickel hydroxide particle. On the surface of the nickel hydroxide particle is formed a cobalt oxyhydroxide layer. The upper portion of the fine nickel particle is protruded out of the cobalt oxyhydroxide layer. The quantity of the cobalt oxyhydroxide layer adhered onto the surface of the nickel hydroxide particle was 3.5% by weight based on the nickel hydroxide particle. The content of the fine nickel particles in the cobalt oxyhydroxide layer was calculated based on the number of nickel atom. The content was 5% based on the total number of cobalt atom included in the cobalt oxyhydroxide layer.

Then, 98% by weight of this composite nickel hydroxide particle was mixed with 2% by weight in total of carboxymethyl cellulose, sodium polyacrylate and polytetrafluoroethylene to prepare a mixture. Subsequently, water was added to this mixture and the resultant mixture was then kneaded to prepare a paste. Then, this paste was filled in a nickel-plated fibrous substrate and, after being dried, the substrate was press-molded to manufacture a nickel positive electrode.

<Preparation of Negative Electrode>

To 95% by weight of hydrogen-absorbing alloy powder having the composition of $LaNi_{3.8}Co_{0.5}Mn_{0.35}Al_{0.35}$ were added 1.5% by weight of carbon black powder, and 3.5% by weight of binder (polytetrafluoroethylene and carboxymethyl cellulose) to prepare a mixture, which was then added with water kneaded to prepare a paste. This paste was then filled into a nickel net and, after being dried, press-molded to manufacture a negative electrode comprising a hydrogen-absorbing alloy.

Then, a separator formed mainly of polypropylene non-woven fabric was disposed between the negative electrode and the positive electrode, and the resultant composite was spirally wound to prepare an electrode group. This electrode group was housed in a cylindrical bottomed case together with an alkali electrolyte comprising 7.5 mol/L KOH and 0.5 mol/L LiOH, thereby assembling a cylindrical nickel hydrogen secondary battery having a structure shown in FIG. 1 and theoretical capacity of 2,900 mAh.

Comparative Example 23

A cylindrical nickel hydrogen secondary battery of the same construction as that of Example 50 was assembled following the same procedures as explained in Example 50, except that the positive electrode was constructed as explained below.

<Preparation of Positive Electrode>

A nickel hydroxide particle covered entirely by a cobalt oxyhydroxide layer was prepared. The quantity of the cobalt oxyhydroxide layer was 5% by weight based on the nickel hydroxide particle.

Then, 98% by weight of this nickel hydroxide particle was mixed with 2% by weight in total of carboxymethyl cellulose, sodium polyacrylate and polytetrafluoroethylene to prepare a mixture. Subsequently, water was added to this mixture and the resultant mixture was then kneaded to prepare a paste. Then, this paste was filled in a nickel-plated fibrous substrate and, after being dried, the substrate was press-molded to manufacture a nickel positive electrode.

Each secondary battery obtained from Example 50 and Comparative Example 23 was subjected to an aging at room temperature for 10 hours, and then subjected to 5 cycles of charge/discharge: charging with 0.2C for 5 hours, and discharging with 0.2 C until the voltage decreases to 1V. Thereafter, Each secondary battery was again subjected to 5 cycles of charge/discharge: charging with 1 C for 1 hours, and discharging with 1 C until the voltage decreases to 1V. Then, the discharge capacity at the end of the fifth cycle was measured. The results of this experiment are shown in the following Table 8.

Thereafter, the secondary batteries obtained from Example 50 and Comparative Example 23 which had been subjected to the aforementioned charge/discharge cycle were stored for one week at 60° C. while keeping these secondary batteries in a state of short circuit. Subsequently, secondary battery was again subjected to 3 cycles of charge/discharge: charging with 1 C for 1 hours, and discharging with 1 C until the voltage decreases to 1V. Then, the discharge capacity at the end of the third cycle was measured. The results of this experiment are shown in the following Table 8.

TABLE 8

|  | Discharge capacity before storage | Discharge capacity after storage |
| --- | --- | --- |
| Example 50 | 2915 mAh | 2900 mAh |
| Comparative example 23 | 2000 mAh | 1830 mAh |

As seen from Table 8, the secondary battery of Example 50 indicated a higher initial capacity as compared with that of Comparative Example 23, thus suggesting that the secondary battery of Example 50 was capable of inhibiting the deterioration of discharge capacity even after the storage thereof for one week under severe conditions. The reason for this can be ascribed to the fact that the conductive layer formed on the surface of nickel hydroxide particles has a conductive region in which free electrons can function as an electric charge carrier.

EXAMPLE 51

<Preparation of Nickel Hydroxide Positive Electrode>

Cobalt hydroxide particles 1.5 µm in average particle diameter, 1.0 g/cm$^3$ in tap density, and 15 m$^2$/g in specific surface area as measured by means of BET method were prepared.

Then, 90 parts by weight of the nickel hydroxide particles were mixed with 10 parts by weight of the above cobalt hydroxide particles, 0.25 part by weight of carboxymethyl cellulose (binder), 0.25 part by weight of sodium polyacrylate (binder), 3 parts by weight of polytetrafluoroethylene (binder) and 30 parts by weight of water to obtain a mixed solution, which was then kneaded to prepare a paste. Then, this paste was filled in a nickel fiber substrate having a thickness of 1.1 mm and a porosity of 95%. After being dried, the substrate was press-molded into a nickel positive electrode.

<Preparation of Negative Electrode>

To 95 parts by weight of hydrogen-absorbing alloy powder having the composition of $LaNi_{4.0}Co_{0.4}Mn_{0.3}Al_{0.3}$ were added 3 parts by weight of polytetrafluoroethylene, 1 part by weight of carbon black powder, 1 part by weight of carboxymethyl cellulose (binder) and 50 parts by weight of water to obtain a mixture, which was then mixed to prepare a paste. This paste was then filled into a nickel net and, after being dried, press-molded to manufacture a negative electrode comprising a hydrogen-absorbing alloy.

Then, a separator formed of polypropylene nonwoven fabric was disposed between the negative electrode and the positive electrode, and the resultant composite was spirally wound to prepare an electrode group. This electrode group was housed in a cylindrical bottomed case together with an alkali electrolyte comprising 8.0M KOH, thereby assembling a battery unit (closed type) having a structure shown in FIG. 1, a size of 4/3A and nominal capacity (theoretical capacity) of 2800 mAh.

The battery unit obtained from Example 51 was subjected at room temperature to a partial charging which is 10% of the full charging with a charging rate of 0.1 C to the nominal capacity (theoretical capacity). Then, the battery units were subjected to an aging at a temperature of 70° C. Thereafter, these battery units were charged for 15 hours with a charging rate of 0.1 C, and then discharged with 0.2 C until the voltage was decreased down to 1.0V. The charge/discharge cycle of charging with 1 C for 1.5 hours and discharging with 1 C until the voltage was decreased to 1V was repeated 5 times to prepare a nickel hydrogen secondary battery.

EXAMPLE 52

A nickel hydrogen secondary battery was assembled following the same procedures as explained in Example 51, except that cobalt hydroxide particles 4.5 µm in average particle diameter, 0.95 g/cm$^3$ in tap density, and 2.4 m$^2$/g in specific surface area as measured by means of BET method were employed.

EXAMPLE 53

A nickel hydrogen secondary battery was assembled following the same procedures as explained in Example 51, except that cobalt hydroxide particles. 4.5 µm in average particle diameter, 1.2 g/cm$^3$ in tap density, and 3 m$^2$/g in specific surface area as measured by means of BET method were employed.

EXAMPLE 54

A nickel hydrogen secondary battery was assembled following the same procedures as explained in Example 51, except that cobalt hydroxide particles 4.5 µm in average particle diameter, 1.0 g/cm$^3$ in tap density, and 3 m$^2$/g in specific surface area as measured by means of BET method were employed.

EXAMPLE 55

A nickel hydrogen secondary battery was assembled following the same procedures as explained in Example 51, except that cobalt hydroxide particles 1.5 µm in average particle diameter, 1.2 g/cm$^3$ in tap density, and 10 m$^2$/g in specific surface area as measured by means of BET method were employed.

EXAMPLE 56

A nickel hydrogen secondary battery was assembled following the same procedures as explained in Example 51, except that cobalt hydroxide particles 1.5 µm in average particle diameter, 1.0 g/cm$^3$ in tap density, and 2.4 m$^2$/g in specific surface area as measured by means of BET method were employed.

Comparative Example 24

A nickel hydrogen secondary battery was assembled following the same procedures as explained in Example 51, except that cobalt hydroxide particles 4.5 µm in average particle diameter, 1.2 g/cm$^3$ in tap density, and 2.4 m$^2$/g in specific surface area as measured by means of BET method were employed.

The secondary batteries obtained from Examples 51 to 56 and Comparative Example 24 were charged for 16 hours with an electric quantity of 0.1 CmA, and then discharged with an electric quantity of 1.0 CmA until the terminal voltage was decreased down to 1.0V thereby to measure the initial capacity from the discharge retention time, thus calculating the initial utilization. These secondary batteries were then stored for one month at a temperature of 65° C. Thereafter, these secondary batteries were charged again for 16 hours with an electric quantity of 0.1 CmA, and then discharged with an electric quantity of 1.0 CmA until the terminal voltage was decreased down to 1.0V. This charge/discharge cycle was repeated 3 times, and the discharge capacity was measured defining it as a recovery capacity. In this case, the recovery ratio R(%) was calculated according to the aforementioned formula (1), the result being shown together with the utilization in the following Table 9.

TABLE 9

| | Physical properties of Co(OH)$_2$ | | | | |
|---|---|---|---|---|---|
| | Average particles size (μm) | Tap density (g/cm$^3$) | Specific surface area (m$^2$/g) | Initial utilization (%) | Recovery ratio (%) |
| Example 51 | 1.5 | 1.0 | 15 | 93 | 94 |
| Example 52 | 4.5 | 0.95 | 2.4 | 90 | 92 |
| Example 53 | 4.5 | 1.2 | 3 | 90 | 93 |
| Example 54 | 4.5 | 1.0 | 3 | 93 | 94 |
| Example 55 | 1.5 | 1.2 | 10 | 92 | 90 |
| Example 56 | 1.5 | 1.0 | 2.4 | 90 | 89 |
| Comparative example 24 | 4.5 | 1.2 | 2.4 | 75 | 80 |

As seen from Table 9, the secondary batteries of Examples 51 to 56 which were prepared by making use of a positive electrode containing the cobalt hydroxide particles meeting at least one of the conditions in terms of the average particle diameter, tap density and specific surface area indicated improved initial utilization and the recovery ratio after the storage under severe conditions as compared with the secondary battery of Comparative Example 24 which was prepared by making use of a positive electrode containing the cobalt hydroxide particles not meeting any of the conditions in terms of the average particle diameter, tap density and specific surface area.

EXAMPLE 57

A battery unit of the same construction as that of Example 51 was assembled following the same procedures as explained in Example 51, except that cobalt hydroxide particles 1.5 μm in average particle diameter, 1.0 g/cm$^3$ in tap density, and 10 m$^2$/g in specific surface area as measured by means of BET method were employed.

The battery unit thus obtained was subjected at room temperature to a partial charging which is 5% of the full charging with a charging rate of 0.1 C to the nominal capacity (theoretical capacity). Then, the battery unit was subjected to an aging at a temperature of 70° C. Thereafter, the battery unit was charged for 15 hours with a charging rate of 0.1 C at room temperature, and then discharged with 0.2 C until the voltage was decreased down to 1.0V. The charge/discharge cycle of charging with 1 C for 1.5 hours and discharging with 1 C until the voltage was decreased to 1V was repeated 5 times to prepare a nickel hydrogen secondary battery.

EXAMPLE 58

A nickel hydrogen secondary battery was assembled following the same procedures as explained in Example 57, except that the partial charging being 10% of the full charging with a charging rate of 0.1 C to the nominal capacity was performed.

EXAMPLE 59

A nickel hydrogen secondary battery was assembled following the same procedures as explained in Example 57, except that the partial charging being 20% of the full charging with a charging rate of 0.1 C to the nominal capacity was performed.

EXAMPLE 60

A nickel hydrogen secondary battery was assembled following the same procedures as explained in Example 57, except that the partial charging being 50% of the full charging with a charging rate of 0.1 C to the nominal capacity was performed.

EXAMPLE 61

A battery unit was assembled in the same manner as illustrate in Example 57. This battery unit was then subjected at room temperature to the full charging with a charging rate of 0.1 C to the nominal capacity. Thereafter, the battery unit was charged for 15 hours with a charging rate of 0.1 C at room temperature, and then discharged with 0.2 C until the voltage was decreased down to 1.0V. The charge/discharge cycle of charging with 1 C for 1.5 hours and discharging with 1 C until the voltage was decreased to 1V was repeated 5 times to prepare a nickel hydrogen secondary battery.

The secondary batteries obtained from Examples 57 to 61 were tested in the same manner as in Examples 51 to 56 to measure the initial utilization and the recovery capacity after the storage thereof at a temperature of 65° C. for one month, the result being shown together with the results of Comparative Example 24 in the following Table 10.

TABLE 10

| | Partial charging | Temperature for aging (° C.) | Initial utilization (%) | Recovery ratio (%) |
|---|---|---|---|---|
| Example 57 | 0.1 C × 5% | 70 | 92 | 97 |
| Example 58 | 0.1 C × 10% | 70 | 95 | 100 |
| Example 59 | 0.1 C × 20% | 70 | 93 | 99 |
| Example 60 | 0.1 C × 50% | 70 | 88 | 95 |
| Example 61 | 0.1 C × 100% | — | 85 | 90 |
| Comparative example 24 | 0.1 C × 100% | — | 75 | 80 |

As seen from Table 10, the secondary batteries of Examples 57 to 61 indicated improved initial utilization and the recovery ratio as compared with the secondary battery of Comparative Example 24. In particular, the secondary batteries of Examples 57 to 59 indicated more improved initial utilization and the recovery ratio as compared with the secondary battery of Example 60 which was obtained by a partial charging being 50% of the full charge, or with the secondary battery of Example 61 wherein the partial charging and aging were omitted.

EXAMPLE 62

A battery unit was assembled following the same procedures as explained in Example 57.

The battery unit thus obtained was subjected at room temperature to a partial charging which is 10% of the full charging with a charging rate of 0.1 C to the nominal capacity. Then, the battery unit was subjected to an aging at a temperature of 25° C. Thereafter, the battery unit was charged at room temperature for 15 hours with a charging rate of 0.1 C, and then discharged with 0.2 C until the voltage was decreased down to 1.0V. The charge/discharge cycle of charging with 1 C for 1.5 hours and discharging with 1 C until the voltage was decreased to 1V was repeated 5 times to prepare a nickel hydrogen secondary battery.

EXAMPLE 63

A nickel hydrogen secondary battery was assembled following the same procedures as explained in Example 62, except that the aging was performed at a temperature of 40° C.

EXAMPLE 64

A nickel hydrogen secondary battery was assembled following the same procedures as explained in Example 62, except that the aging was performed at a temperature of 60° C.

EXAMPLE 65

A nickel hydrogen secondary battery was assembled following the same procedures as explained in Example 62, except that the aging was performed at a temperature of 90° C.

The secondary batteries obtained from Examples 62 to 65 were tested in the same manner as in Examples 51 to 56 to measure the initial utilization and the recovery capacity after the storage thereof at a temperature of 65° C. for one month, the result being shown together with the results of Example 58 in the following Table 11.

TABLE 11

| | Partial charging | Temperature for aging (° C.) | Initial utilization (%) | Recovery ratio (%) |
|---|---|---|---|---|
| Example 62 | 0.1 C × 10% | 25 | 75 | 93 |
| Example 63 | 0.1 C × 10% | 40 | 80 | 93 |
| Example 64 | 0.1 C × 10% | 60 | 92 | 92 |
| Example 58 | 0.1 C × 10% | 70 | 95 | 100 |
| Example 65 | 0.1 C × 10% | 90 | 94 | 100 |

As seen from Table 11, the secondary batteries of Examples 58, 63 to 65 wherein the aging was performed at a temperature of 40 to 90° C. indicated improved initial utilization and the recovery ratio after the storage thereof under a severe condition as compared with the secondary battery of Example 62 wherein the aging was performed at a temperature of less than 40° C. In particular, the secondary batteries of Examples 58 and 65 wherein the aging was performed at a temperature of 70 to 90° C. indicated further improved initial utilization and recovery ratio as compared with the secondary batteries of Examples 63 and 64 wherein the aging was performed at a temperature of less than 70° C.

EXAMPLE 66

A battery unit was assembled following the same procedures as explained in Example 57.

The battery unit thus obtained was subjected at room temperature to a partial charging which is 20% of the full charging with a charging rate of 0.1 C to the nominal capacity (theoretical capacity). Then, the battery unit was subjected to an aging at a temperature of 25° C. Thereafter, the battery unit was charged for 15 hours with a charging rate of 0.1 C at room temperature, and then discharged with 0.2 C until the voltage was decreased down to 1.0V. The charge/discharge cycle of charging with 1 C for 1.5 hours and discharging with 1 C until the voltage was decreased to 1V was repeated 5 times to prepare a nickel hydrogen secondary battery.

EXAMPLE 67

A nickel hydrogen secondary battery was assembled following the same procedures as explained in Example 66, except that the aging was performed at a temperature of 70° C.

The secondary batteries obtained from Examples 66 and 67 were tested in the same manner as mentioned above to measure the initial utilization and the recovery capacity after the storage thereof at a temperature of 65° C. for one month, the result being shown in the following Table 12.

TABLE 12

| | Partial charging | Temperature for aging (° C.) | Initial utilization (%) | Recovery ratio (%) |
|---|---|---|---|---|
| Example 66 | 1 C × 20% | 25 | 70 | 93 |
| Example 67 | 1 C × 20% | 70 | 88 | 93 |

EXAMPLE 68

<Preparation of Nickel Hydroxide Positive Electrode>

90% by weight of the nickel hydroxide particles were mixed with 6.0% by weight of the cobalt monoxide particles, a binder (0.25% by weight of carboxymethyl cellulose, 0.25% by weight of sodium polyacrylate and 3.0% by weight of polytetrafluoroethylene) and 30 parts by weight of water to obtain a mixed solution, which was then kneaded to prepare a paste. Then, this paste was filled in a nickel-plated fiber substrate having a thickness of 1.1 mm and a porosity of 95%. After being dried, the substrate was press-molded into a nickel positive electrode. The weight of the cobalt monoxide particles was calculated as cobalt element and based on the weight of the nickel hydroxide particles.

<Preparation of Negative Electrode>

To 95 parts by weight of hydrogen-absorbing alloy powder having the composition of $LaNi_{4.0}Co_{0.4}Mn_{0.3}Al_{0.3}$ were added 3 parts by weight of polytetrafluoroethylene, 1 part by weight of carbon black powder, 1 part by weight of carboxymethyl cellulose (binder) and 50 parts by weight of water to obtain a mixture, which was then mixed to prepare a paste. This paste was then filled into a nickel net and, after being dried, press-molded to manufacture a negative electrode comprising a hydrogen-absorbing alloy.

Then, a separator formed of polypropylene nonwoven fabric was disposed between the negative electrode and the positive electrode, and the resultant composite was spirally wound to prepare an electrode group. This electrode group was housed in a cylindrical bottomed case together with an alkali electrolyte comprising 8.0M KOH, thereby assembling a battery unit having a structure shown in FIG. 1, a size of AA and theoretical capacity of 1100 mAh.

EXAMPLE 69

A battery unit was assembled following the same procedures as explained in Example 68, except that the content of cobalt monoxide powder in the positive electrode was changed to 3.0% by weight.

EXAMPLE 70

A battery unit was assembled following the same procedures as explained in Example 68, except that the content of cobalt monoxide powder in the positive electrode was changed to 1.0% by weight.

Comparative Example 25

A battery unit was assembled following the same procedures as explained in Example 68, except that the content of cobalt monoxide powder in the positive electrode was changed to 8.0% by weight.

Comparative Example 26

A battery unit was assembled following the same procedures as explained in Example 68, except that cobalt monoxide powder was not added to the positive electrode.

<The Initial Charging>

The initial charging of the battery units obtained from Examples 68 to 70 and Comparative Examples 25 to 26 were performed at a temperature of 90° C. with 0.1 C for 15 hours, thereby obtaining cylindrical nickel hydrogen secondary batteries.

Comparative Example 27

The initial charging of the battery unit which was assembled in the same manner as in Example 68 was performed at room temperature with 0.1 C for 12 hours, thereby obtaining cylindrical nickel hydrogen secondary batteries.

Comparative Example 28

The initial charging of the battery unit which was assembled in the same manner as in Example 70 was performed at room temperature with 0.1 C for 12 hours, thereby obtaining cylindrical nickel hydrogen secondary batteries.

The secondary batteries obtained from Examples 68 to 70 and Comparative Examples 25 to 28 were discharged with 0.2 C until the voltage was decreased down to 1.0V thereby to measure the utilization of the active material of the positive electrode. These secondary batteries were then stored for one month at a temperature of 45° C. Thereafter, these secondary batteries were charged again for 90 minutes with 50 mA to measure the time required for increasing the battery voltage up to 0.6V. Table 13 shows the start-up time measured in this manner and the initial utilization of the positive electrode thus measured.

TABLE 13

|  | CoO content (wt. %) | Initial utilization (%) | Voltage recovery time (min.) |
| --- | --- | --- | --- |
| Example 68 | 6.0 | 99 | 8.2 |
| Example 69 | 3.0 | 97 | 4.8 |
| Example 70 | 1.0 | 93 | 2.9 |
| Comparative example 25 | 8.0 | 99 | 11.9 |
| Comparative example 26 | 0 | 70 | 2.2 |
| Comparative example 27 | 6.0 | 100 | 13.2 |
| Comparative example 28 | 1.0 | 80 | 4.9 |

As seen from Table 13, the secondary batteries of Examples 68 to 70 where the content of the cobalt monoxide particles in the positive electrode was 6.0% by weight or less required shorter time in recovering the voltage up to 0.6V as compared with the secondary battery of Comparative Example 25 where the content of the cobalt monoxide particles exceeded over 6.0% by weight. Moreover, it was possible with the secondary batteries of Examples 68 to 70 to recover the voltage up to 0.6V within 10% of re-charging, i.e. within 9 minutes.

On the other hand, the secondary battery of Comparative Example 26 where the cobalt monoxide particles was not added to the positive electrode indicated very low utilization, but it indicated also that the smaller the content of cobalt is, the shorter the time required for recovering the voltage at the occasion of recharging.

In the case of the secondary battery of Comparative Example 27, the utilization was as high as 100%, but required 13.2 minutes for recovering the voltage up to 0.6V, which was longer than the secondary battery of Comparative Example 25. It would be quite clear from the comparison between the utilization of Example 70 and the utilization of Comparative Example 28 that it is possible with the employment of the secondary battery of Example 70 to further improve the utilization over the secondary battery of Comparative Example 28. Namely, if the initial charging is performed at a temperature of 40 to 100° C. as proposed by this invention, the decrease of voltage during the storage of long period of time or under a high temperature can be inhibited, so that the recovery time for an aimed voltage can be shortened, and, at the same time, it is possible to ensure a high utilization even if the quantity of cobalt is relatively small.

Therefore, it is possible according to this invention to provide an alkaline secondary battery as well as the method of manufacturing the battery, which makes it possible to assure a high utilization of the positive electrode even if the ratio of electrolyte is as small as 0.7 to 2.0 $cm^3$/Ah.

It is also possible according to this invention to provide an electrode, an alkaline secondary battery and a method of manufacturing the battery, which make it possible to improve the distribution of electrolyte, and hence to realize a uniform reaction throughout the battery and to inhibit the generation of $\gamma$-NiOOH, thus improving the charge/discharge cycle property and suppressing the increase of impedance.

It is also possible according to this invention to provide an alkaline secondary battery which is capable of improving the initial property with small amount of cobalt, and capable of inhibiting a decrease of capacity during the storage of long period of time or under severe condition such as high temperature conditions. At the same time, according to this alkaline secondary battery, it is possible to improve the large current discharge property thereof.

It is also possible, according to this invention to provide an electrode, an alkaline secondary battery and a manufacturing method thereof, which make it possible to realize the improvement of the utilization of the positive electrode without increasing the content of cobalt, and to inhibit the deterioration of capacity during a storage of long period of time.

It is also possible according to this invention to provide a method of manufacturing an alkaline secondary battery, which makes it possible to shorten the voltage recovery time at the occasion of recharging after storage for a long period of time or under high temperature conditions, while maintaining a high utilization in the charge/discharge cycle, thus making it possible to perform a quick charging after storage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

The invention claimed is:

1. A method of manufacturing an alkaline secondary battery, the method comprising
   assembling a battery unit comprising an alkali electrolyte and a positive electrode;
   partial charging the battery unit with a partial charge in a range of from 5 to 20% of a full charge of the battery unit; and
   aging the battery unit, wherein
   a ratio of the volume of the alkali electrolyte to a theoretical capacity of the positive electrode is in a range of from 0.7 cm$^3$/Ah to 2.0 cm$^3$/Ah;
   the positive electrode contains first particles, a coating around the first particles, and second particles in the coating that have a smaller diameter than the first particles, that are adhered directly to the first particles, and that protrude from the coating or are exposed at the same level as the coating;
   the first particles comprise
      nickel hydroxide exhibiting a peak corresponding to a (101) plane and having a half-width of 0.8° or more as measured by X-ray powder diffraction (2θ) using Cu—Kα rays, and
      at least one selected from the group consisting of zinc and zinc compounds in an amount of 4 to 15% by weight calculated as zinc and based on the nickel hydroxide;
   the second particles are plated with nickel and comprise iron; and
   the coating comprises a conductive material comprising at least one selected from the group consisting of cobalt and cobalt compounds.

2. The method according to claim 1, wherein the partial charge is in a range of from 10 to 15% of the full charge.

3. The method according to claim 1, wherein the partial charging is at a charging rate in a range of from 0.05 C to 0.5 C.

4. The method according to claim 1, wherein the partial charging is at a charging rate in a range of from 0.05 C to 0.2 C.

5. The method according to claim 1, wherein the aging is at a temperature in a range of from 40° C. to 90° C.

6. The method according to claim 1, wherein the aging is at a temperature in a range of from 60° C. to 90° C.

7. The method according to claim 1, wherein the cobalt compounds are particles containing cobalt hydroxide having an average particle diameter of 0.3 μm to 2.5 μm, a tap density of 0.4 g/ml to 1.15 g/ml, and a specific surface area of 2.5 m$^2$/g to 30 m$^2$/g.

8. The method according to claim 1, wherein the half-width is in a range of 0.8° to 1.1°.

9. The method according to claim 1, wherein the first particles comprising nickel hydroxide further comprise 0.1 to 3% by weight, based on the nickel hydroxide, of at least one selected from the group consisting of cobalt and cobalt compounds.

10. The method according to claim 1, wherein the conductive material covers at least part of the surface of the particles comprising nickel hydroxide.

11. The method according to claim 1, wherein the conductive material consists of the at least one selected from the group consisting of cobalt and cobalt compounds;
   the coating consists of the conductive material; and
   the coating covers the entire surface of the first particles.

12. The method according to claim 1, wherein the second particles protrude from the coating.

* * * * *